United States Patent [19]
Watanabe et al.

[11] Patent Number: 5,854,479
[45] Date of Patent: Dec. 29, 1998

[54] BAR-CODE READER AND BAR-CODE READING METHOD FOR DETECTING VARIOUS POSSIBLE REPRODUCIBLE BAR CODE COMBINATIONS AND SYNTHESIZING INFORMATION THEREFROM

[75] Inventors: Mitsuo Watanabe; Ichiro Shinoda; Shinichi Sato; Isao Iwaguchi; Hiroaki Kawai; Motohiko Itoh, all of Kawasaki, Japan

[73] Assignee: Fujitsu Limited, Kawasaki, Japan

[21] Appl. No.: 980,012

[22] Filed: Nov. 26, 1997

Related U.S. Application Data

[63] Continuation of Ser. No. 504,191, Jul. 19, 1995, abandoned.

[30] Foreign Application Priority Data

| Jul. 21, 1994 | [JP] | Japan | 6-169742 |
| Dec. 21, 1994 | [JP] | Japan | 6-318747 |

[51] Int. Cl.⁶ .................................................. G06K 7/10
[52] U.S. Cl. .................................... 235/462; 235/463
[58] Field of Search .................... 235/462, 463, 235/472, 467

[56] References Cited

U.S. PATENT DOCUMENTS

| 4,879,456 | 11/1989 | Cherry et al. | 235/463 X |
| 5,028,772 | 7/1991 | Lapinski et al. | 235/463 |
| 5,124,538 | 6/1992 | Lapinski et al. | 235/463 X |
| 5,296,691 | 3/1994 | Waldron et al. | 235/462 |
| 5,387,797 | 2/1995 | Waldron et al. | 235/463 X |
| 5,466,921 | 11/1995 | Lapinski et al. | 235/463 X |

FOREIGN PATENT DOCUMENTS

| 0 250 778 A2 | 1/1988 | European Pat. Off. |
| 0 498 678 A2 | 8/1992 | European Pat. Off. |
| 0 502 440 A2 | 9/1992 | European Pat. Off. |
| 2284917 | 6/1995 | United Kingdom |
| 92/05516 A1 | 4/1992 | WIPO |

*Primary Examiner*—David P. Porta
*Assistant Examiner*—Michael G. Lee
*Attorney, Agent, or Firm*—Armstrong, Westerman, Hattori, McLeland & Naughton

[57] ABSTRACT

A bar-co reader and a bar-code reading method each of which can perform an accurate, quick reading operation. The bar-code reader scans a bar-code with electromagnetic radioactive rays and then extracts data regarding a bar-width thereof based on the reflected rays; demodulates the bar-width data and creates the demodulated data; judges the presence or absence of a bar-code reproducible combination in the demodulated data and judges. the type of combination when the reproducible combination exists; and synthesizes the demodulated data or the character forming the demodulated data according to the type of combination. The bar-code reader and bar-code reading method can be applicable to scanners such as POS systems used in supermarkets, distribution industries, and the like.

2 Claims, 61 Drawing Sheets

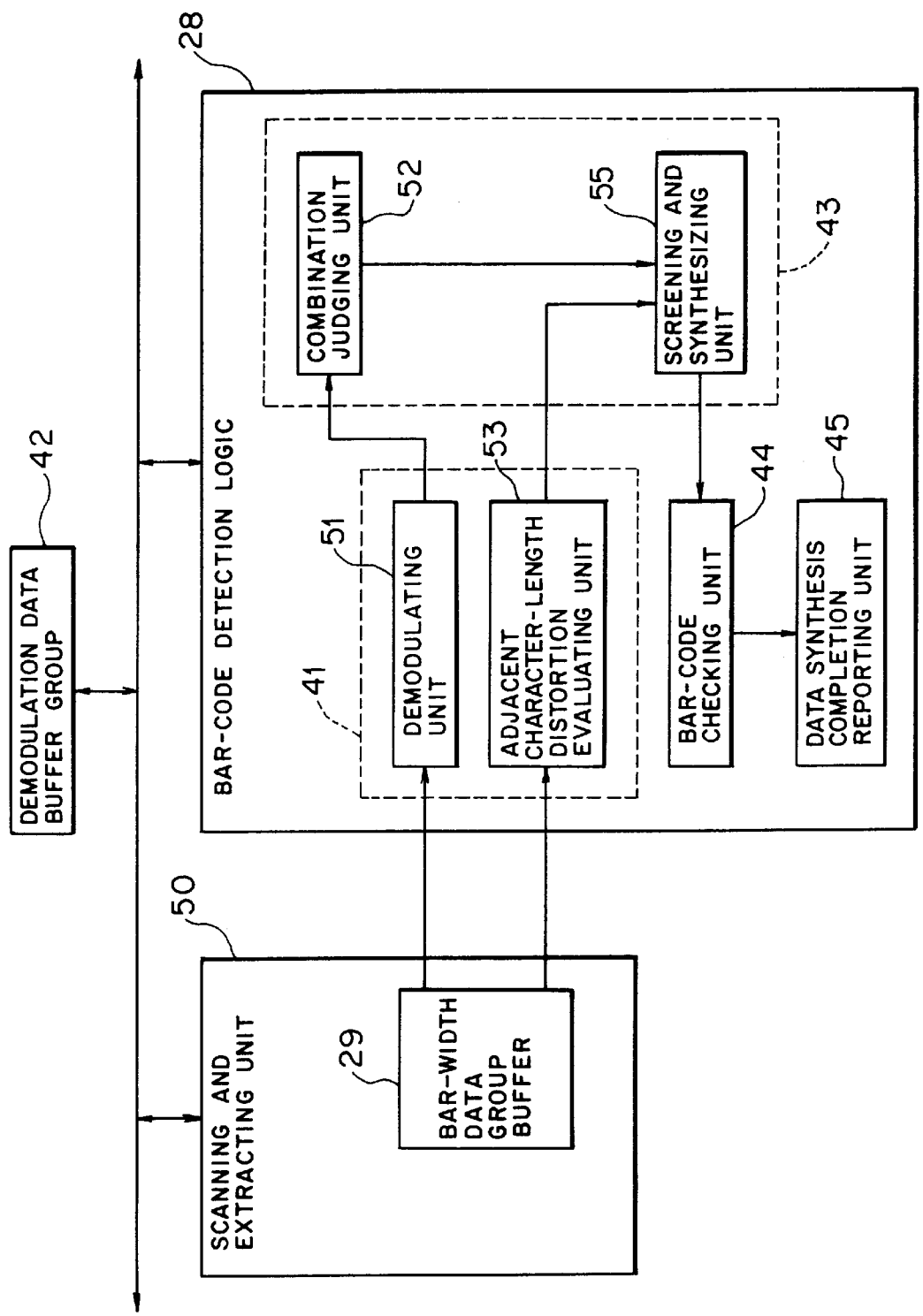

LENGTH OF C2

MODULE DISCRIMINATION

EXAMPLE OF 4 MODULE

| T1\T2 | 2 | 3 | 4 | 5 |
|---|---|---|---|---|
| 2 | E6 | 00 | E4 | 03 |
| 3 | 09 | E2 / E8 | 01 / 07 | E5 |
| 4 | E9 | 02 / 08 | E1 / E7 | 05 |
| 5 | 06 | E0 | 04 | E3 |

| B1\B3 | 1 | 2 | 3 |
|---|---|---|---|
| 1 | E7 / E8 | 01 | — |
| 2 | 02 | E1 / E2 | 07 |
| 3 | — | 08 | — |

| STORAGE INFORMATION ||
|---|---|
| b7 ~ b4 | b3 ~ b0 |
| ⋮ | ⋮ |
| | |

STORAGE BUFFER 1

| STORAGE INFORMATION ||
|---|---|
| 3 | A |
| 3 | B |
| 3 | C |
| 2 | D |
| 1 | E |
| | |

STORAGE BUFFER 2

| STORAGE INFORMATION ||
|---|---|
| 3 | A |
| 3 | B |
| 3 | C |
| 1 | D' |
| | |
| | |

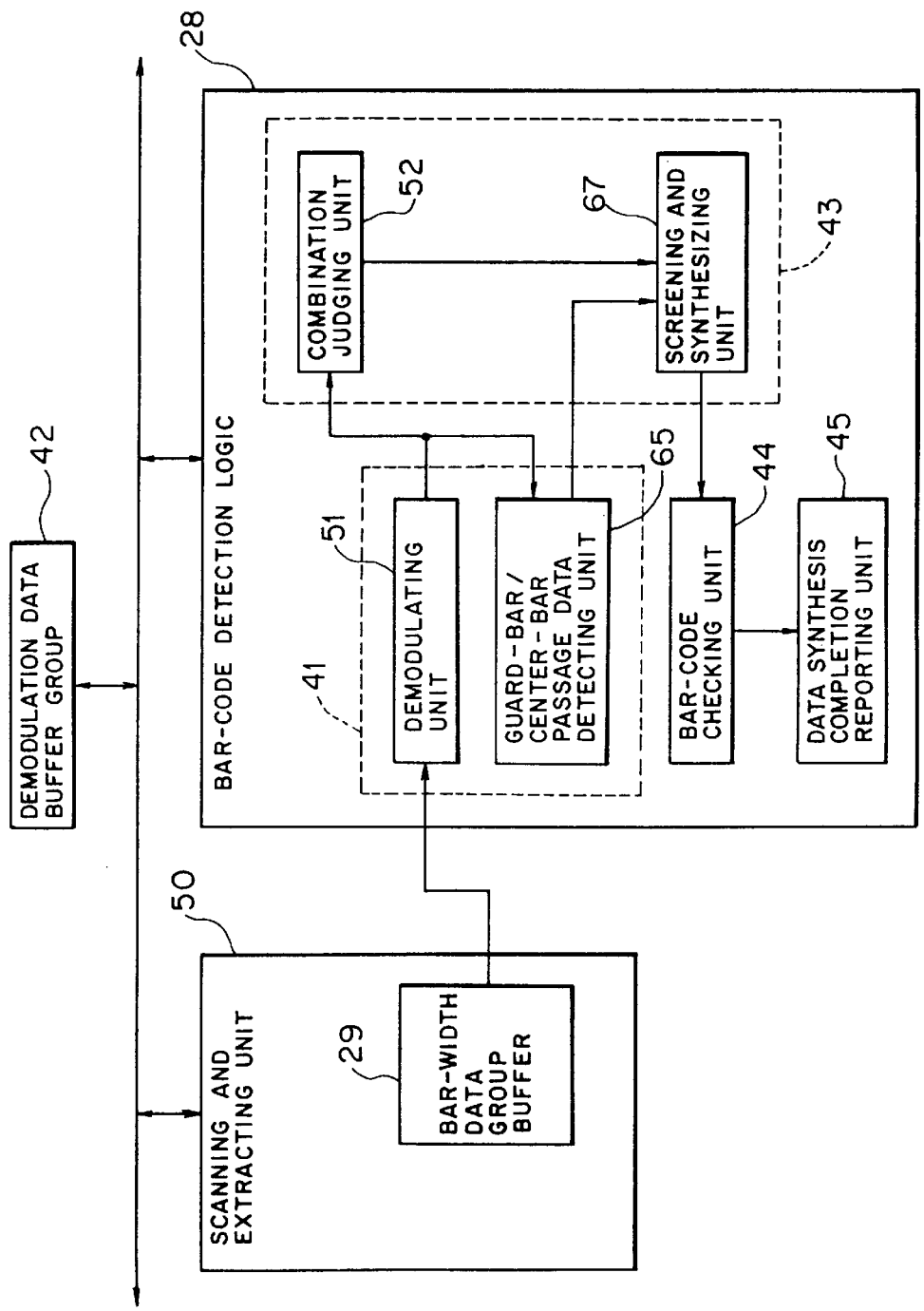

FIG. 24(a)
RAW WAVEFORM
FIG. 24(b)
WHITE EDGE SIGNAL WEG
FIG. 24(c)
BLACK EDGE SIGNAL BEG
FIG. 24(d)
REPRODUCTION BAR-CODE SIGNAL
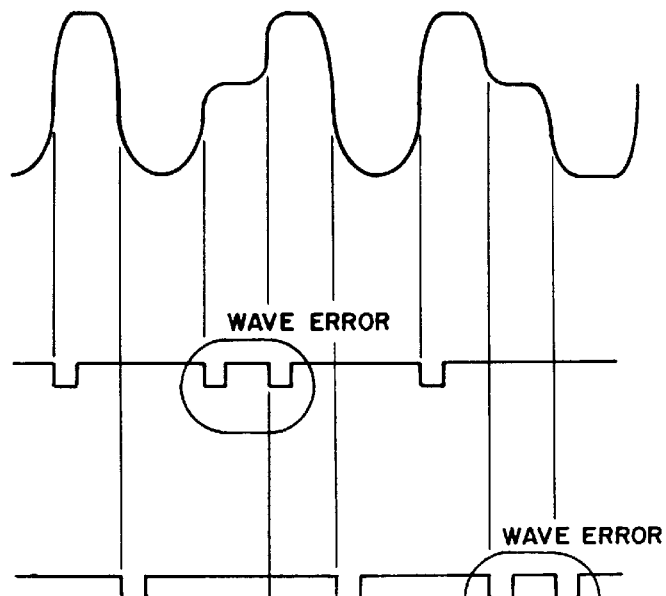
WAVE ERROR
WAVE ERROR
UNCLEAR WHICH WAVEFORM IS CORRECT
⇩
PREDICTED THAT ERROR RECOGNITION WILL OCCUR
FIG. 24(e)
WAVEFORM SPLIT DETECTION SIGNAL WER
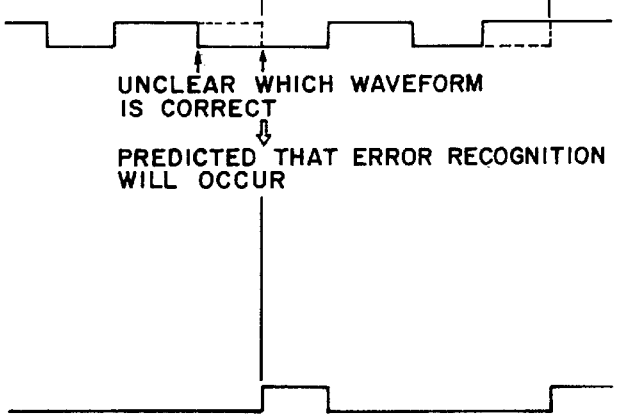

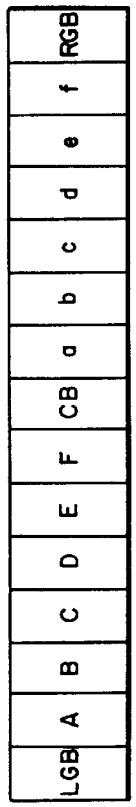
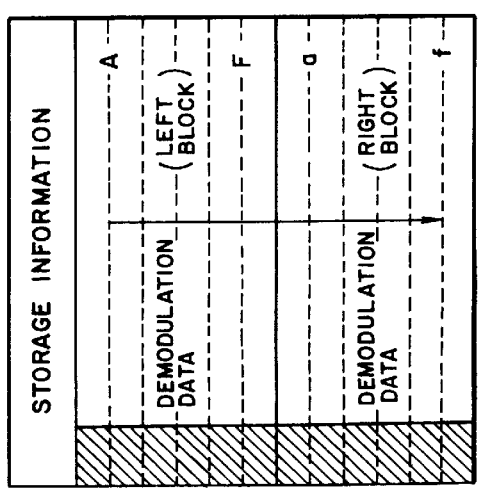
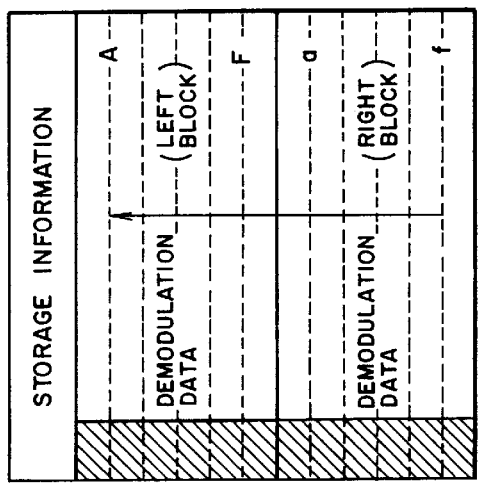
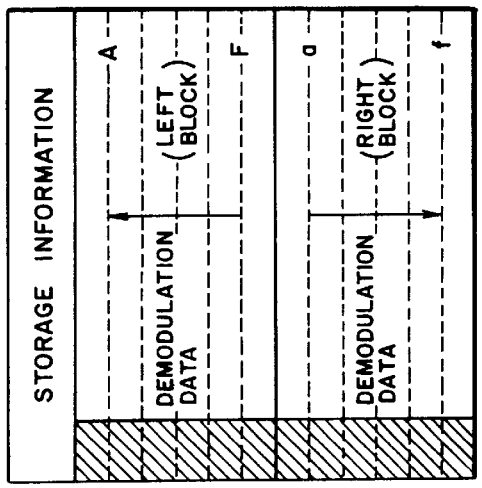
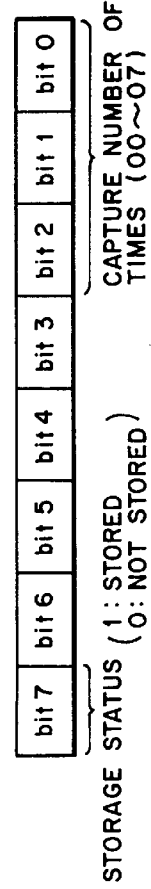

FIG. 30(b)

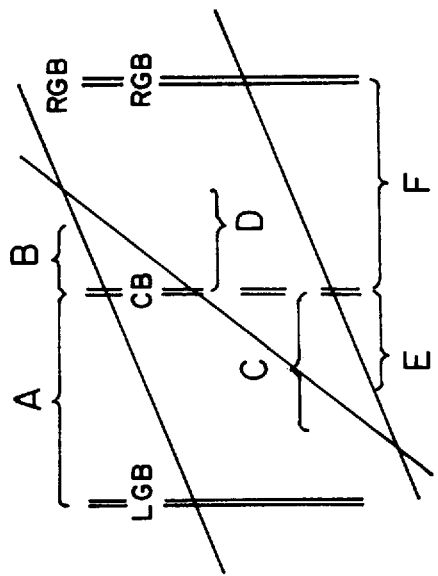

FIG. 30(a)

| PAIRING INFORMATION | FLAG CHARACTER (00~09) |
|---|---|
| NUMBER (A) OF DIGITS OF LEFT BLOCK OF LGBF01 | NUMBER (B) OF DIGITS OF RIGHT BLOCK OF LGBF01 |
| NUMBER (C) OF DIGITS OF LEFT BLOCK OF CBBF01 | NUMBER (D) OF DIGITS OF RIGHT BLOCK OF CBBF01 |
| NUMBER (E) OF DIGITS OF LEFT BLOCK OF RGBF01 | NUMBER (F) OF DIGITS OF RIGHT BLOCK OF RGBF01 |
| PAIRING INFORMATION | FLAG CHARACTER (00~09) |
| THE NUMBER OF DIGITS OF DUPLICATE PORTION IN LEFT BLOCK | THE NUMBER OF DIGITS OF DUPLICATE PORTION IN RIGHT BLOCK |
| LEFT BLOCK OF LGBF02 - NUMBER (A) OF DIGITS | LEFT BLOCK OF LGBF01 - NUMBER (B) OF DIGITS |

FIG.37

```
110: CPU
  ┌─────────────────────────────────────────────────────────────────┐
  │                                              134                │
  │                                       ┌──────────────┐ (RE-READING
  │                                       │     DATA     │ INSTRUCTION)
  │                                       │   COMPARING  │──────────→
  │                                    ┌─→│     UNIT     │
  │                                    │  │              │ DUPLICATE    137
  │                                    │  │              │ CHARACTER  ┌──────────┐
  │                                    │  └──────┬───────┘ NUMBER     │REFERENCE │
  │ 122                                │         │         ──────────→│  COUNT   │
  │  ┌─────────────┐   133             │         │                    │ VARYING  │
  │  │     RAM     │ ┌────────────┐    │         │                    │   UNIT   │
  │  │┌───────────┐│ │  BAR-CODE  │ 135│         │                136 └────┬─────┘
  │  ││DEMODULATION│├→│SYNTHESIZING├────┼→┌──────┴─────┐ ┌─────────────┐   │    138
  │  ││DATA STORAGE│ │    UNIT    │    │ │ MODULO-10  │ │ COINCIDENCE │   │ ┌──────────┐
  │  ││   UNIT    ││ └────────────┘    │ │  CHECKING  │→│    COUNT    │←──┘ │BAR-CODE  │
  │  │└───────────┘│                   │ │    UNIT    │ │  CHECKING   │────→│READ      │──→ 124: CONTROL UNIT CIRCUIT
  │  └──────┬──────┘                   │ └──────┬─────┘ │    UNIT     │     │COMPLETION│    123: INTERFACE UNIT
  │    122A │                          │        │       └──────┬──────┘     │REPORTING │
  │         │        132               │  (RE-READING          │            │   UNIT   │
  │         │   ┌────────────┐         │   INSTRUCTION)   (RE-READING       └──────────┘
  │         └───│  BAR-CODE  │         │    ─────────→     INSTRUCTION)
  │             │DEMODULATING│         │                    ─────────→
  │             │    UNIT    │         │
  │             └─────┬──────┘         │
  │              131  │                │
  │             ┌─────┴──────┐         │
  │             │  BAR-CODE  │         │
  │             │    DATA    │─────────┘
  │             │  DETECTING │ (RE-READING
  │             │    UNIT    │ INSTRUCTION)
  │             └─────┬──────┘  ─────────→
  │                   │                                              │
  └───────────────────┼──────────────────────────────────────────────┘
                      │
             109  ┌───┴────┐
              ┌──│ MEMORY │
              └──→│        │
                 └────────┘
```

FIG. 63
RELATED ART

| | TO1 MODULE NUMBER | | | |
|---|---|---|---|---|
| | 2 | 3 | 4 | 5 |
| TO2 MODULE NUMBER 2 | E6 | O0 | E4 | O3 |
| 3 | O9 | E2 | O1 | E5 |
| | | E8 | O7 | |
| 4 | E9 | O2 | E1 | O5 |
| | | O8 | E7 | |
| 5 | O6 | E0 | O4 | E3 |

BAR-CODE READER AND BAR-CODE READING METHOD FOR DETECTING VARIOUS POSSIBLE REPRODUCIBLE BAR CODE COMBINATIONS AND SYNTHESIZING INFORMATION THEREFROM

This is a continuation of application Ser. No. 08/504,191 filed Jul. 19, 1995, now abandoned.

BACKGROUND OF THE INVENTION

1. Field of the Invention

The present invention related to a bar-code reader and bar-code reading method, each of which scans a bar-code with electromagnetic radioactive rays such as a light beam and reads it by utilizing the reflection. More particularly, the present invention relates to a bar-code reader and a bar-code reading method each which is suitable for POS systems (Point of Sales systems) used in supermarkets, distribution industries, and like. The POS systems use scanners acting as bar-code readers. The present invention is directed toward improving the reading performance of a bar-code reader.

2. Description of the Related Art

FIG. 61 is a block diagram showing the configuration of a conventional bar-code reader. Referring to FIG. 61, numeral 101 is a bar-code printed on a surface of an article. The bar-code 101 which is formed of a plurality of black bars and a plurality of white bars arranged alternately represents predetermined data, based on the width of each black bar and the width of each white bar.

Numeral 102 represents an optical system that irradiates a laser beam L2 to the barcode 101 and receives a reflected light R1, or a laser beam L2 reflected on the bar-code 101. The optical system 102 is formed of a laser emitting unit 103, a scanning mechanism 104, and a photoelectric converter 105.

The laser emitting unit 103 includes a semiconductor laser that emits a laser beam L1 (electromagnetic radioactive rays).

The scanning mechanism 104 which is formed of a polygon mirror rotatable driven with, for example, a motor, reflects the laser beam L1 from the laser emitting unit 3, irradiates the laser beam L1 as a laser beam L2 to the plurality of black bars and the plurality of white bars of the bar-code 101, and then moves and scans at a constant rate in the direction perpendicular to the black and white bars of the bar-code 101.

The scanning mechanism 104 also brings the reflected light R1 moving with scanning of the laser beam L2 as the reflected light R2 to the photoelectric converter 105, by reflecting the reflected light R1 or the laser beam L2 reflected on the bar-code 101.

The photoelectric converter 105 is also formed of a photoelectric converting element such as a photodiode and converts the reflected light (photo input signal) R2 received via the scanning mechanism 104 into an electric signal (with an analog value) according to the light amount and then outputs the converted signal.

Referring to FIG. 61, numeral 106 represents an A\D converter that digitalized an electrical signal from the photoelectric converter 105 to convert it into a binary signal including a black level signal corresponding to a black bar portion in the bar-code 101 and a white level signal corresponding to a white bar portion in the bar-code 101. The binary signal includes a white level signal with a high level and a black level signal with a low level because the light amount of a reflected light R2 from each white bar portion is usually larger than that of a reflected light R2 from each black bar portion.

Numeral 107 represents a bar-width counter that counts clock signals from a clock generator 108. The bar-width counter 107 produces as clock signal count values the time width of a black level signal portion and the time width of a white level signal portion included in a binary signal from the A\D converter 106, or a value corresponding to the width of each black bar and a value corresponding to the width of each white bar of an actual bar-code 101.

Numeral 109 represents a memory that stores a bar-width count value from the bar-width counter 107, and 110 represents a CPU. The CPU 110 extracts and demodulates predetermined data of a bar-code 101, based on a bar-width count value (a value corresponding to the width of each black bar or white bar) stored in the memory 109.

In the above-mentioned configuration, the laser beam L1 emitted from the laser emitting unit 103 is irradiated as the laser beam L2 to black bars and white bars of the bar code 101 using said scanning mechanism 104, while it is moved and scanned at a constant rate in the direction perpendicular to the black and white bars of the bar-code 101.

The laser beam L2 sent from the scanning mechanism 104 is scattered and reflected on a surface of the bar-code 101 and it then reenters as the reflected light R1 to the scanning mechanism 104. The reflected light R1 moves with its varying reflection angle following the scanning movement of the laser beam L2. However, the reflected light R1 is reflected by the polygon mirror (a component of the scanning mechanism 104) and it then falls as the reflected light R2 into the photoelectric converting element in the photoelectric converter 105 arranged at a predetermined position.

The photoelectric converter 105 converts the reflected light R2 into an electrical signal according to the amount of light. The A\D converter 106 digitalized the electrical signal to convert into a binary signal including a black level signal corresponding to each black bar portion and a white level signal corresponding to each white bar portion in the bar-code 101.

Thereafter, the bar-width counter 107 counts clock signals from the clock generator 108. The time widths of black level signal portion and a white level signal portion of a binary signal from the A\D converter 106 (a value corresponding to the widths of each black bar and white bar of an actual bar-code 101) is measured as the count value of a clock signal. The count value is temporarily stored into the memory 109. The CPU 110 subjects a bar-width count value stored in the memory 109 to a predetermined demodulation process, and then extracts and demodulates predetermined data of the bar-code 101.

As described above regarding FIG. 61, the bar-code 101, as shown in FIG. 62, which is formed of a plurality of black bars 1B and a plurality of white bars 1W arranged alternately represents predetermined data based on the widths of each black bar 1B and each white bar 1W. The black bar 1B or white bar 1W has a width corresponding to a natural integer (e.g. 1 to 4 times: referred to as a module number) of times one module set as a predetermined reference length.

In more detail, the bar-code 101 shown in FIG. 62 has a guard bar GB formed of two black bars 1B corresponding to one module and one white bar 1W corresponding to one module formed between two black bars 1B on the left end and a special center bar SCB formed of three black bars 1B each corresponding to one module and three white bars 1W each corresponding to one module arranged alternately to the black bars on the right end in FIG. 62.

The guard bar GB and the special center bar SCB define both the ends of the bar-code 1. Character portions, for example, 1 CHR (character) to 6CHR representing 6 pieces of numerical data (portions showing as the time widths C1 to C6 in FIG. 62, respectively) between the guard bar GB and the special center bar SCB.

Each of the character portions 1 CHR to 6CHR is formed of two white bars 1W and two black bars 1B. The number of all the modules is 7. Predetermined numerical data is expressed to each of the character portions 1CHR and 6CHR by combining the number of modules (corresponding to time width T01) included from the left end of the left black bar 1B to the left end of right black bar 1B and the number of modules (Corresponding to time width T02) included from the left end of the left black bar 1B to the left end of the right black bar 1B and the number of modules (corresponding to time width T02) included from the right end of the left black bar 1B to the right end of the right black bar.

The relationship between the combined number of modules and the predetermined numerical data is well known as shown in FIG. 63 and are previously stored and held as a table (matrix). Referring to FIG. 63, letter E represents EVEN or that the sum of modules in the black bars 1B is an even number, and O represents ODD or that the sum of modules in the black bars is an odd number. For example, according to the UPC bar-code structure, the character portion 1CHR shown in FIG. 62 represents "ODD0(O0)", the character portion 2CHR represents "ODD1(01)", and the character portion 6CHR represents "ODD2(02)".

Hence, the CPU 110 determines the number modules of each of the time widths (δ distance length) T01 and T02 to each of the character portions 1CHR to 6CHR, based on a bar-width count value stored in the memory 109, reads out the numerical data corresponding to combination of two modules from the predetermined table previously stored, and then extracts and demodulates the data of the bar-code 101.

The reading operation of the bar-code 101 in which 6 character portions 1CHR to 6CHR are arranged between the guard bar GB and the special center bar SCB has been explained by referring to FIG. 62. However, as shown in FIG. 64, a conventional bar-code is the bar-code of type which includes the special center bar SCB on the right side of the bar-code 101 shown in FIG. 62 acting as the center bar CB formed of two black bars 1B of one module and two white bars 1W of one module, 6 character portions arranged on both sides with respect to the center bar CB, the left guard bar LGB formed of two black bars 1B of the module number 1 and two white bars 1W of the module number 1 arranged on the left end, and the right guard bar RGB formed of two black bars 1B of the module number 1 and two white bars 1W of the module number 1 arranged on the right end.

This type of bar-code belongs to the UPC (Universal Product Code) bar-code symbolic standard version. The case where the bar-code 101 of the type shown in FIG. 64 is read will be explained below according to the present invention. The reading operation of the bar-code 101 of the type shown in FIG. 64 is basically performed with the same procedure as that shown in FIG. 62.

In the data extracting and demodulating process for the bar-code 101 shown in FIG. 64, demodulation is normally carried out but he left black unit arranged between the left guard bar LGB and the center bar CB and the right block unit arranged between the right guard bar RGB and the center bar CB of the bar-code 101. The demodulation result is subjected to the general modulo-10 checking. Then if the check result is good, it is judged that one time reading (demodulating process) of the bar-code 101 has been completed.

In this case, the scanning mechanism 104 irradiates 1500 laser beams L2 per second on the bar-code 101. The one-time demodulating process is determined to have completed if any one beam of them crosses the bar-code 101. However, in order to avoid erroneous reading of the bar-code 101, the demodulation data is not judged as valid immediately after a completion of a series of demodulation. The demodulation process is repeated on the same bar-code 101 without completing the reading operation. When data in a black unit to which the modulo-10 checking is good and coincides continuously for a predetermined number of times (coincidence count checking), the reading operation is completed. For example, the method of capturing the demodulation data of a bar-code twice and completing the reading when the previous data agrees with the current data is called "twice coincidence checking".

According to the above-mentioned bar-code checking method, as shown in FIG. 65, the demodulation data becomes valid only when the left block unit arranged between the left guard bar LGB and the center bar CB and the right block unit arranged between the right guard bar RGB and the center bar CB in the bar-code 101 can be scanned with the scanning lines A1 and A2, respectively, or there are the guard bar LGB or RGB and the center bar CB on both ends of demodulation data along the scanning line A1 and the guard bar LGB or RGB and the center bar CB on both ends of demodulations data along the scanning line A2.

Recently, some optical systems irradiate light beams to the bar-code 101 in, for example, 16 scanning directions. In the case of using such an optical system, with a large angle made by the light beam scanning direction and the bar-code 101, as shown in FIG. 65, there is the case where a single scanning line cannot thoroughly can the left block unit arranged between the left guard bar LGB and the center bar CB and the right block unit arranged between the right guard bar RGB and the center bar CB.

For example, as shown in FIG. 66, when three scanning lines A1 to A3 split-scans three portions of the single bar-code 101, the above-mentioned bar-code reading method cannot obtain demodulation data. However, recently, even when a split scanning is performed as shown in FIG. 66, demodulation is performed with each of the scanning lines A1 to A3 as much as possible. Then data of the signal bar-code 101 is demodulated by combining the resultant plurality of (here, three) pieces of demodulated data in a considerable pattern.

However, where the guard bar or the center bar is included in the demodulated data obtained with each of the scanning lines A1 to A3, and the character of the end is overlapped with the character of the end of another adjacent demodulated data in the demodulated data obtained to each of the scanning lines A1 to A3 (character duplicate checking), the above-mentioned demodulated data becomes valid. In FIG. 66, the shaded portions show character duplicate portions.

The functional structure shown in FIG. 67, for example, has been proposed as a barcode reader (scanner) for reading the bar-code 101, as shown in FIG. 64. In FIG. 67, numeral 90 represents scanning and extracting means; 91 represents left\right block unit demodulating means, and 92 represents synthesizing means.

The scanning and extracting means 90 scans a bar-code with light rays (electromagnetic radioactive rays) and extracts bar-width data from the reflected light (corresponding to the portion of constituted of elements 102 to 108 in FIG. 61).

The left\right unit demodulating means 91 implements a demodulating process every left block unit or right block unit arranged between the guard bar and the center bar of a bar-code, based on the bar-width data extracted by the scanning and extracting means 90, and then obtains demodulated data. The synthesizing means 92 synthesizes demodulated data demodulated every left or right block unit. The left\right block unit demodulating means 91 and the synthesizing means 92 are arranged as the function of the CPU 110 in, for example, in FIG. 61.

In the device having the functional structure shown in FIG. 67, where there are demodulated data in left block unit and the demodulated data in right block unit each demodulated by the left\right block unit demodulating means 91, one including only a guard bar and the other including a guard bar and a center bar, the demodulated data in the left block data unit has a character duplicated at the most remote end and the demodulated data in the right block data unit has a character duplicated at the most remote end. If the demodulated data passes the modulo-10 checking, the synthesizing means 92 synthesizes demodulation data (bar-width data) in the left block unit and demodulation data (bar-width data) in the right block unit.

For example, as shown in FIG. 68(*a*), where the characters A, B, C, and D are obtained by scanning with the beam α from the scanning and extracting means 90 and demodulating with the left\right block unit demodulating means 91, and the characters D, E, F, a, b, c, d, e, and f are obtained by scanning with the beam β from the scanning and extracting means 90 and demodulating with the left\right block unit demodulating means 91, the character "D" is overlapped or duplicated. Hence when demodulation data along two beam scanning lines α and β clears the modulo-10 checking, the synthesizing means 92 can synthesize the characters A to F and a to f so the bar-code reading can be preformed.

Recently, bar-codes have been used extensively as represented by the POS systems used in distribution industries. However, bar-codes with low print quality are increasing. There is great possibility that the bar-code with low print quality may be erroneously read. The possibility that paper surface noises or characters are erroneously read as bar-code data is considerably strong.

Therefore it has been desirable that even bar-codes with low print quality can be read with high accuracy without being erroneously read. The bar-code erroneous reading may be caused by curvature of bar-code, wrinkles, and flaws on the reading glass window surface of the bar-code reader.

Paper surface noises or characters may be erroneously read and demodulated as characters of a bar-code after light beams sweep across the guard bar, center bar, and normal character. In this case, since the character duplicate checking is not approved, the demodulation result becomes invalid.

In the bar-code reader shown in FIG. 67, in the reading operation of the bar-code divided in two portions, if the guard bar and the center bar are detected on each scanning line, bar-code data is sampled as much as possible that they can be demodulated along each scanning line. When a combination of the demodulation data in the left block unit and the demodulation data in the right block unit to which an overlap (duplicate portion) can be considered in the bar-code passes the modulo-10 checking, the bar-width data is synthesized.

However, when the scanning and extracting means 90 scans the bar-code, paper surface noises or characters may be erroneously read as a bar-code or a bar-code is erroneously read due to curvature of paper surface or a fold in the paper.

For example, FIG. 68(*b*) shows the case where the characters A, B, C, D, and E' can be demodulated along the scanning line of the beam α, and the case where characters D, E, F, a, b, c, d, e, and f can be demodulated along the scanning line of the beam β. The character "E'" obtained by the beam α is dummy demodulation data obtained by erroneously demodulating the original character "E" which cannot be completely scanned due to paper surface noises or characters. In this case, the character "D" exists in common in the demodulation data in the left unit and the demodulation data in the right unit. However, the character "E" differs from the character "E'". Since the character at the most remote end of the demodulation data in the right block unit does not agree with the character at the most remote end of the demodulation data in the left block unit, the bar-width data cannot be synthesized. For that reason, the same process must be made again by discarding data of the characters A to E' and D to f already obtained by demodulation. Hence, the bar-code reader may have a poor efficiency, consumes a long processing time, continues to erroneously demodulate and read characters.

In order to avoid an erroneous reading, as described above, where the same data is demodulated continuously a predetermined fixed number of times, a process of validating the demodulation result is performed. However, in the coincidence count checking, the reference number of times being always constant may cause an erroneous reading in some bar-code reading states. It is considered to set the reference number of times to a large value from the beginning. In such a case, even when one-time scanning and demodulating process allows error-free reading, the demodulation result in not validated till the same data is demodulated by the reference number of times. Hence there is a disadvantage in that the bar-code reading process takes much time.

SUMMARY OF THE INVENTION

The present invention is directed toward overcoming the above mentioned problems. The first object of the present invention is to provide a bar-code reader and a bar-code reading method each of which can prevent and adverse effect due to paper surface (space) noises, characters, and the like, thus performing an accurate, quick reading.

To overcome the above-mentioned problems, another object of the present invention is to provide a bar-code reader and a bar-code reading method each of which performs a coincidence count checking according to the reading status of a bar-code when a plurality of divided portions of a single bar-code are scanned and demodulated, thus realizing an improved reading rate and reduced erroneous-reading rate in actual service without decreasing the reading efficiency.

In order to achieve the above-mentioned objects, according to the first aspect of the present invention, the bar-code reader includes scanning and extracting means for scanning a bar-code with electromagnetic radioactive rays and then extracting data regarding a bar-width thereof based on the reflected rays; demodulating means for demodulating the bar-width data extracted by the scanning and extracting means and creating the demodulated data; combination judging means for judging the presence of absence of a bar-code reproducible combination in the demodulated data created by the demodulating means and for judging the type of combination when the reproducible combination exists; and synthesizing means for synthesizing demodulated data or a character forming demodulated data according to the type of combination judged by the combination judging means.

According to the second aspect of the present invention, the bar-code reader further includes deviation evaluating means for evaluating a deviation from a predetermined standard of the bar-width data extracted by the scanning and extracting means; and screening and synthesizing means for screening demodulated data or a character forming demodulated data, based on the deviation evaluated by the deviation evaluating means and then synthesizing the demodulated data screened or the character screened according to the type of combination judged by the combination judging means in addition to the scanning and extracting means, the demodulating means, and the combination judging means described above.

According to the third aspect of present invention, the bar-code reader further includes demodulation status evaluating means for evaluating a demodulated status including the number of characters of demodulated data combined by the combination judging means or the positions thereof; and screening and synthesizing means for screening demodulated data or character forming demodulated data, based on the demodulated status evaluated by the demodulation status evaluating means and then synthesizing the demodulated data screened or the character screened according to the kind of combination judged by the combination judging means, in addition to the scanning and extracting means, the demodulating means, and the combination judging means described above.

According to the fourth aspect of the present invention the bar-code reader further includes screening and synthesizing means for screening demodulated data or a character forming demodulated data, based on the deviation evaluated by the deviation evaluating means and the demodulated status evaluated by the demodulation status evaluating means, and then synthesizing the demodulated data screened or the character screened according to the type of combination judged by the combination judging means, in addition to the scanning and extracting means, the demodulating means, the combination judging means, the deviation evaluating means, and the demodulation status evaluating means described above.

According to fifth aspect of the present invention, the bar-code reading method includes the steps of: scanning a bar-code with electromagnetic radioactive rays and then extracting data regarding a bar-width thereof based on the reflected rays; evaluating a deviation from a predetermined standard of the bar-width data and demodulating the bar-width data and creating demodulated data; judging the presence or absence of a bar-code reproducible combination in the demodulated data and judging the type of combination when the reproducible combination exists; and screening demodulated data or character forming demodulated data, based on the deviation and then synthesizing the demodulated data screened or the character screened according to the type of combination.

According to the sixth aspect of the present invention, the bar-code reading method includes the steps of scanning a bar-code with electromagnetic radioactive rays and then extracting data regarding a bar-width thereof based on the reflected rays; demodulating said bar-width data and creating demodulate data; judging the presence or absence of a bar-code reproducible combination in said demodulated data and judging the type of combination when the reproducible combination exists; evaluating the demodulating status including the number of characters forming a combined demodulated data or position thereof; and screening demodulated data or character, based on the demodulating status, and then synthesizing the demodulated data screened or the character screened according to the type of combination.

According to the seventh aspect of the present invention, the bar-code reading method includes the steps of scanning a bar-code with electromagnetic radioactive rays and then extracting data regarding a bar-width there of based on the reflected rays; demodulating the bar-width data and creating demodulated data; judging the presence or absence of a bar-code reproducible combination in the demodulated data and judging the type of combination when the reproducible combination exists; and synthesizing the demodulated data or a character forming the demodulated data according to the type of combination.

According to the eighth aspect of the present invention, the bar-code reading method includes the steps of irradiating plural electromagnetic radioactive rays on a bar-code and scanning the bar-code with each of the electromagnetic radioactive rays; demodulating data regarding plural portions of the bar-code scanned partially with the electromagnetic radioactive rays, based on the electromagnetic radioactive rays reflected from the bar-code; demodulating data of the bar-code by combining demodulated data regarding a plurality of portions of the bar-code; completing the bar-code reading operation by judging the data demodulated from the bar-code as effective data when the same data is demodulated continuously from the bar-code by a predetermined reference number of times; and varying the setting of the standard number times according to information regarding the reading status of the bar-code.

According to the ninth aspect of the present invention the bar-code reader includes a light source for emitting light beams as an electromagnetic radioactive rays; scanning means for irradiating a plurality of light beams from the light source to a bar-code and scanning the bar-code with the light beams; photoelectric converting means for receiving light beam reflected from the bar-code and converting the reflected light beams into an electrical signal according to the light amount; demodulating means for demodulating data regarding a plurality of portions of the bar-code partially scanned with the light beams, based on the electrical signal from the photoelectric converting means; combining means for combining the demodulated data regarding the plurality of portions of the bar-code demodulated by the demodulating means to demodulated data of the bar-code; coincidence count judging means for detecting the number of times that the demodulating means and the combining means have demodulated continuously the same data from the bar-code, for comparing the times with a predetermined reference count, and for completing the reading operation of the bar-code because data demodulated from the bar-code is valid when the elapsed times reach the predetermined reference count; read-status information capturing means for capturing reading status information of the bar-code; and reference count varying means for varying the setting of the reference count of the coincidence count judging means, according to the reading status information capturing means.

As described above, according to the bar-code reader of the first aspect of the present invention and the bar-code reading method of the seventh aspect of the present invention, the bar-code reader judges the presence or absence of a bar-code reproducible combination in a demodulation if the combination exists, and then synthesizes demodulating data according to the type of combination. Hence, compared with the immediate demodulation data synthesizing method, only a synthesizing operation with a high bar-code reproducibility are performed, whereby a bar-code can be read effectively and quickly.

According to the bar-code reader of the second and fourth aspects of the present invention and the bar-code reading method of the fifth aspect of the present invention, the bar-code reader judges the presence or absence of the a bar code reproducible combination in a demodulation data synthesizing operation, judges and type of combination if the combination exists, evaluates deviation of the bar-width data from a predetermined standard, and screens and synthesizes demodulation data or character forming demodulation data, based on the deviation. Hence the number of combinations of demodulated data used for data synthesis can be reduced, and the time by which a bar-code has been read can be reduced. As a result, the bar-code reading can be preformed simply, effectively, and quickly. Since only effective data with no possibility of an erroneous reading is selected by removing the character with a possibility of an erroneous reading, an accurate bar-code reading can be established.

According to the bar-code reader of the third and fourth aspects of the present invention and the bar-code reading method of the sixth aspect of the invention, the bar-code reader judges the presence or absence of a bar-code reproducible combination, judges the type of combination if the combination exist, evaluates the demodulation status including the number of characters of combined demodulation data and its position, and screens and synthesizes demodulation data or a character forming the demodulation data, based on the demodulation status. Hence since the number of combinations of demodulated data needed for data synthesis can be reduced, the time by which the bar-code reproduction has been completed ban be reduced, whereby bar-code reading can be performed effectively and quickly. Since only valid data with no possibility of an erroneous reading are screened by removing characters with a possibility of an erroneous reading, bar-code reading can be performed accurately and certainly.

According to the bar-code reader of the eighth aspect of the invention and the bar-code reading method of the ninth aspect of the present invention, the bar-code reader can set the reference count to a large value according to the bar-code reading status information when there is a strong possibility of an erroneous reading, and can set the reference count to a small value when there is a small possibility of an erroneous reading. Hence the reading rate is greatly increased on an actual operation without reducing the reading efficiency, thus largely reducing the erroneous reading rate.

BRIEF DESCRIPTION OF THE DRAWINGS

FIG. 11 is block diagram reacting to the first embodiment;

FIG. 20 is block diagram relating to the fifth embodiment;

FIG. 24(*a*) to 24(*e*) are timecharts each used for explaining a signal occurrence status at a wave error occurrence time;

FIG. 29(*a*) to 29(*e*) are diagrams each showing the buffer structure relating to the storing process according to the first to seventh embodiments;

FIG. 30 is a diagram showing the content of a pairing buffer relating to the first to seventh embodiments;

FIG. 37 is a block diagram showing the functional structure of a bar-code reader of the eighth embodiment according to the present invention;

FIG. 63 is a table showing the relationships between the combination of module numbers and numerical data;

Figure 1:
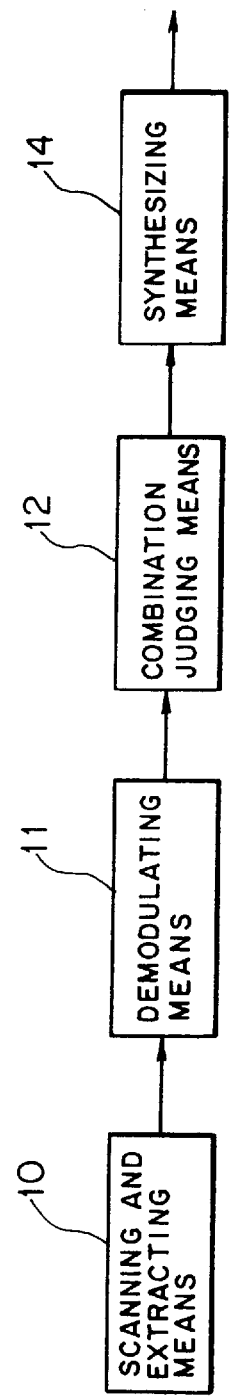
FIG. 1 is a block diagram showing a first aspect of the present invention.

DESCRIPTION OF THE PREFERRED EMBODIMENTS (a) Aspects of the Invention:

The bar-code reader according to the first aspect of the invention, as shown in FIG. 1, includes scanning and extracting means 10 for scanning a bar-code with electromagnetic radioactive rays and extracts bar-width data from the reflection; demodulating means 11 for demodulating the bar-width data extracted by the scanning and extracting means 10 and creating demodulated data; combination judging means 12 for judging the presence or absence of a bar-code reproducible combination in the demodulated data created by the demodulating means 11 and judging the type of combination if the combination exists; and synthesizing means 14 for synthesizing demodulated data or a character forming the demodulated data according to the type of combination judged by the combination judging means 12.

The "electromagnetic radioactive rays" consists of light (visual rays), infrared rays, ultraviolet rays, coherent rays such as a laser beam having coherence, or normal light lacking coherence.

The "bar-code reproducible combination" means a combination of demodulation data that can reproduce the meaning of a bar-code by synthesizing demodulated data obtained by various scanning lines crossing a bar-code, thus obtaining continuous demodulation data. In order to obtain such a combination, it is necessary that the scanning lines sweep all the bar-code forming bars and duplicate characters are included between a plurality of pieces of demodulated data obtained with the scanning lines.

The "judgment of the type of combination" means that the combination corresponding to which combination pattern (for example, "split-reading type" shown later in the first to seventh embodiments) of scanning lines crossing over a bar-code to reproduce bar-code is judged.

The "synthesis" means that a piece of bar-code data is reproduced using a fragment of plural pieces of bar-code data. The synthesis, as shown in the first to seventh embodiments to be described later, is made after data of a duplicate portion is checked for being the same according to the type of combination of demodulated data.

Figure 2:
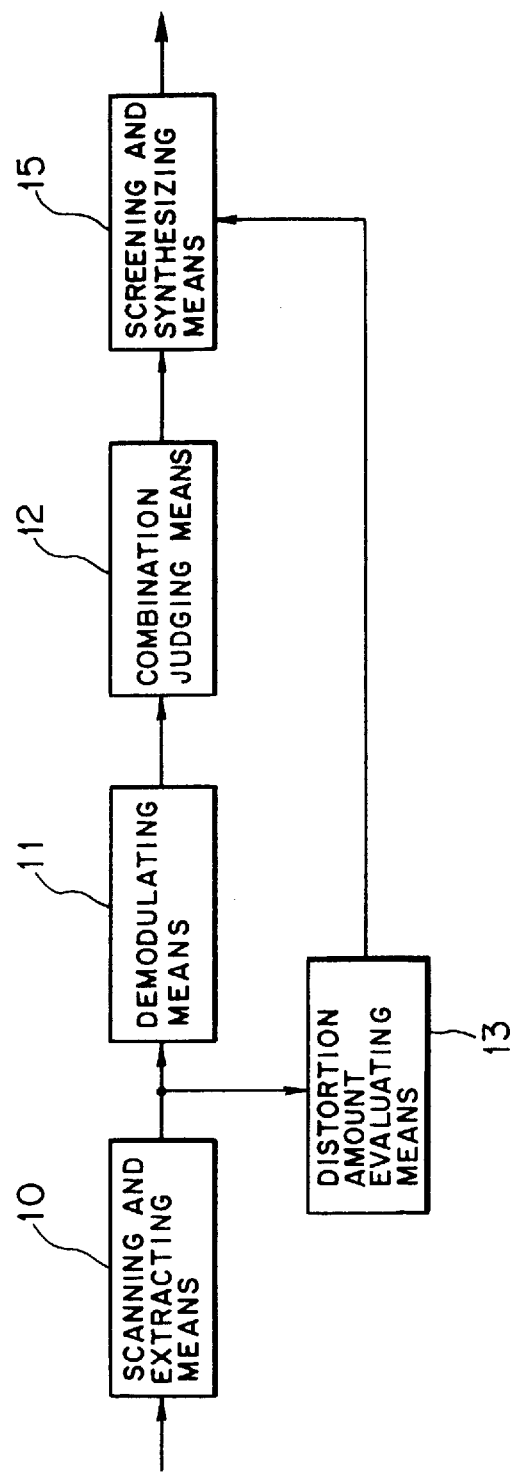
FIG. 2 is a block diagram showing a second aspect of the present invention.

According to the second aspect of the present invention, as shown in FIG. 2, the bar-code reader includes scanning and extracting means 10 for scanning a bar-code with electromagnetic radioactive rays and extracting bar-width data from the reflection; demodulating means 11 for demodulating the bar-width data extracted by the scanning and extracting means 10 and creating demodulated data; combination judging means 12 for judging the presence or absence of a bar-code reproducible combination in demodulated data created by the demodulating means 11 and judging the type of combination if the combination exists; deviation evaluating means 13 for evaluating a deviation from a predetermined standard of the bar-width data extracted from the scanning and extracting means 10; and screening and synthesizing means 15 for screening demodulated data or a character forming the demodulated data based on the deviation and synthesizing the screened demodulated data or character according to the type of combination.

The "deviation from a predetermined standard" means deviation within a tolerable range from the optimum value of a standard such as a standard version defined by the JIS (Japanese Industrial Standard).

For example, the following items are treated as "deviation from a predetermined standard":

(1) Distortion in the length of an adjacent character forming extracted bar-width data (first embodiment).

(2) Distortion in $\delta$ distance of a character (second embodiment).

(3) Distortion in the bar-width of a character.

(4) Priority is provided to distortion of an adjacent character length, distortion regarding $\delta$ distance of a character, distortion of a bar-width.

Figure 3:
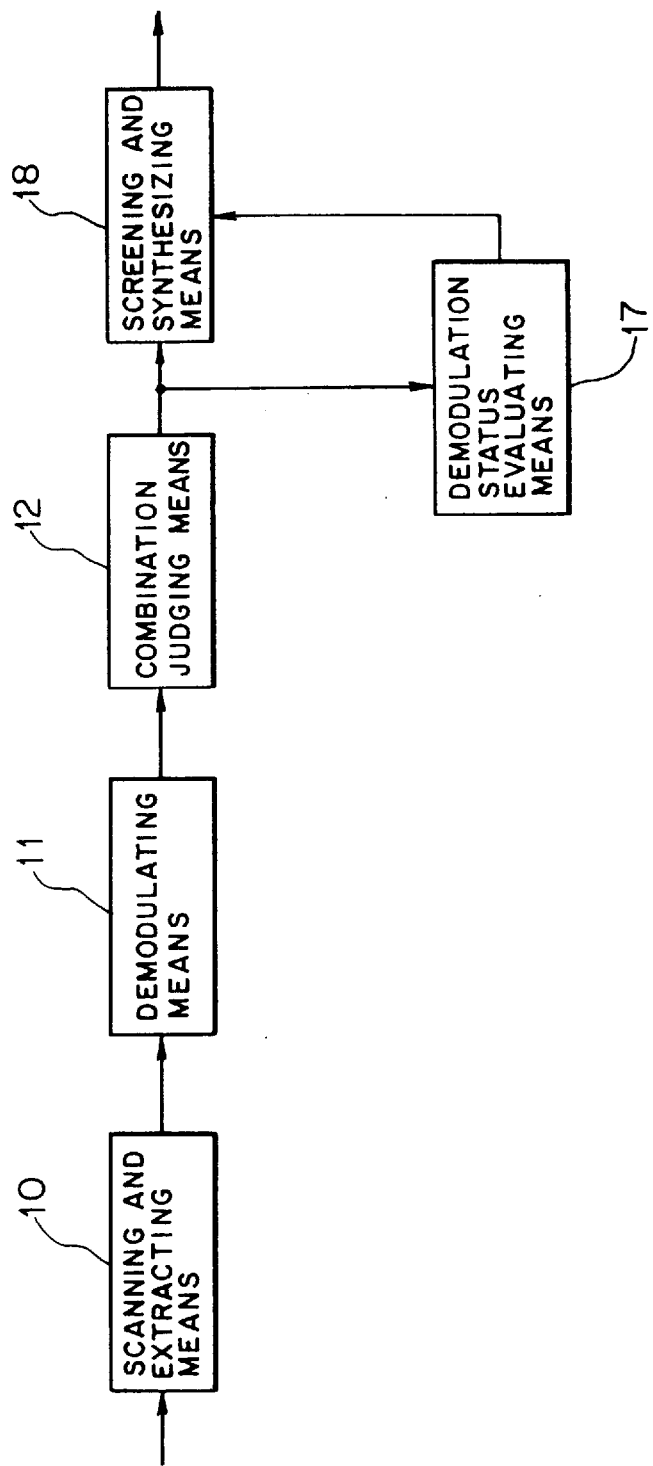
FIG. 3 diagram showing a third aspect of the present invention.

According to the third aspect of the invention, as shown in FIG. 3, the bar-code reader includes scanning and extracting means 10 for scanning a bar-code with electromagnetic radioactive rays and extracting bar-width data from the reflection; demodulating means 11 for demodulating the bar-width data extracted by the scanning and extracting means 10 and creating demodulated data; combination judging means 12 for judging the presence or absence of a bar-code reproducible combination in demodulated data created by the demodulating means 11 and judging the type of combination if the combination exists; demodulation status evaluating means 17 for evaluating demodulation status including the number of characters of demodulating data combined by the combination judging means 12 and the position thereof; and screening and synthesizing means 18 for screening demodulated data or a character forming demodulated data based on the demodulation status and synthesizing the screened demodulated data or the character according to the type of combination.

The "demodulation status" shows a state including the number of characters forming demodulated data and the positions thereof.

For example, the following items are listed as "demodulation status":

(1) Demodulating process is performed based on data of which one character at the remotest end is removed from characters forming demodulated data in regard to the combination of demodulated data which cannot be synthesized because of absence of common characters.

(2) Status on whether the demodulation data to be combined is the bar-width data obtained by passing from the guard bar to the center bar by several characters.

(3) Demodulation is performed based on the state where no wave error occurs.

Figure 4:
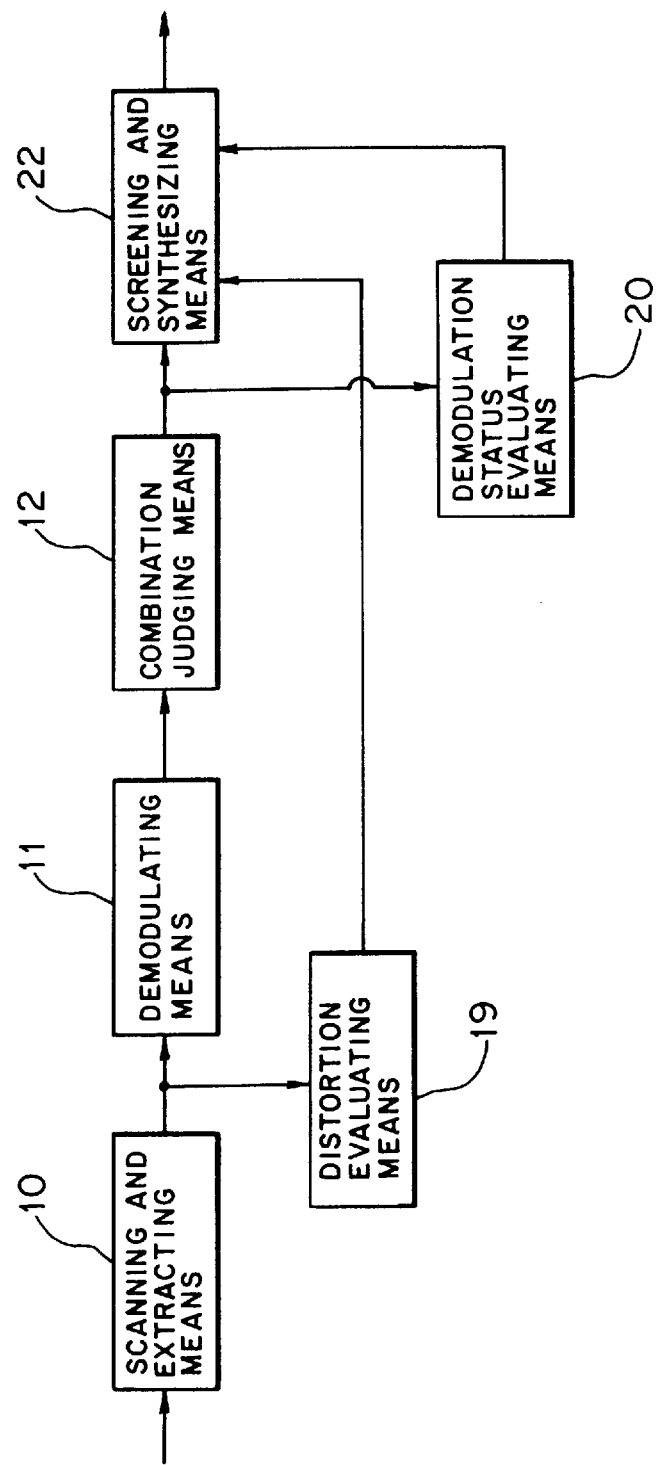
FIG. 4 is s block diagram showing a fourth aspect of the present invention.

According to the fourth aspect of the invention, as shown in FIG. 4, the bar-code reader includes scanning and extracting means 10 for scanning a bar-code with electromagnetic radioactive rays and extracting bar-width data from the reflection; demodulating means 11 for demodulating the bar-width data extracted by the scanning and extracting means 10 and creating demodulated data; combination judging means 12 for judging the presence or absence of a bar-code reproducible combination in demodulated data created by the demodulating means 11 and judging the type of combination if the combination exists; deviation evaluating means 19 for evaluating deviation from a predetermined standard of bar-width data extracted by the scanning and extracting means 10; demodulation status evaluating means 20 for evaluating a demodulating status including the number of characters of demodulation data combined by the combination judging means 12 and the position thereof, and screening and synthesizing means 22 for screening demodulated data or a character forming demodulated data based on the deviation and the demodulation status and synthesizing the screened demodulated data or the character according to the type of combination.

Figure 5:
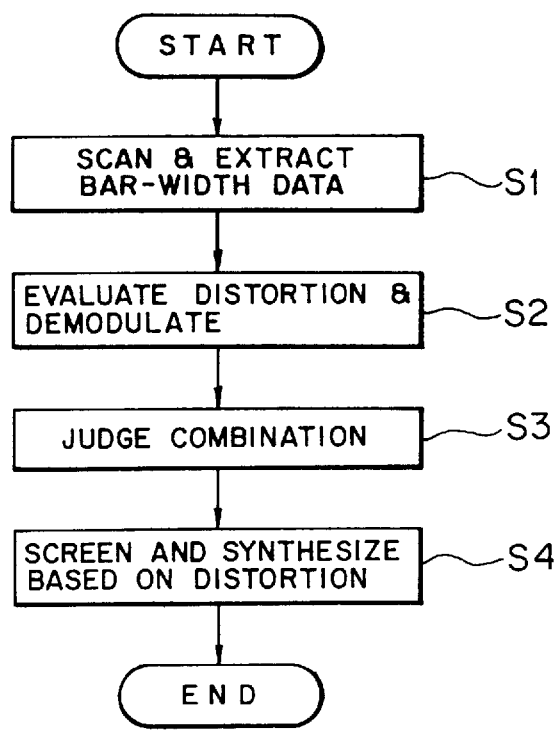
FIG. 5 is a flowchart used for explaining a fifth aspect of the present invention.

According to the fifth aspect of the invention, as shown in FIG. 5, the bar-code reading method includes scanning a bar-code with electromagnetic radioactive rays and extracting bar-width data from the reflection (step S1); evaluating deviation from a predetermined standard of bar-width data and creating demodulation data by demodulating the bar-width data (step S2); judging the presence or absence of a bar-code reproducible combination in demodulated data and judging the type of combination if the combination exists (step S3); and screening demodulated data or a character forming demodulated data based on the deviation and synthesizing the screened demodulated data or the character according to the type of combination (step S4).

Figure 6:
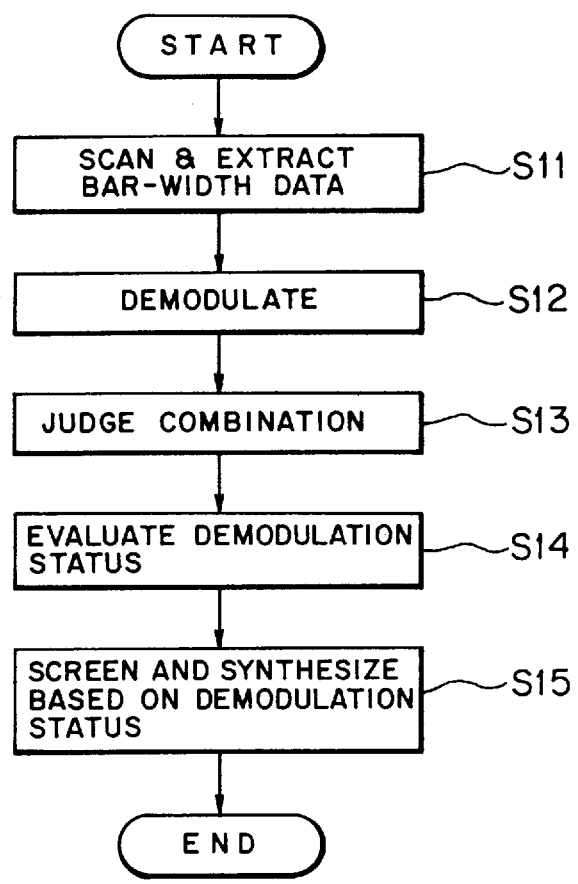
FIG. 6 is a flowchart used for explaining a sixth aspect of the present invention.

According to the sixth aspect of the invention, as shown in FIG. 6, the bar-code reading method includes scanning a bar-code with electromagnetic radioactive rays and extracting bar-width data from the reflection (step S11); demodulating the bar-width data and creating demodulation data (step S12); judging the presence or absence of a bar-code reproducible combination in demodulated data and judging the type of combination if the combination exists (step S13); evaluating a modulation status including the number of characters forming demodulated data and the positions thereof (step S14); and screening demodulated data or a character forming demodulated data based on the demodulation status and synthesizing the screened demodulated data or the character according to the type of combination (step S15).

Figure 7:
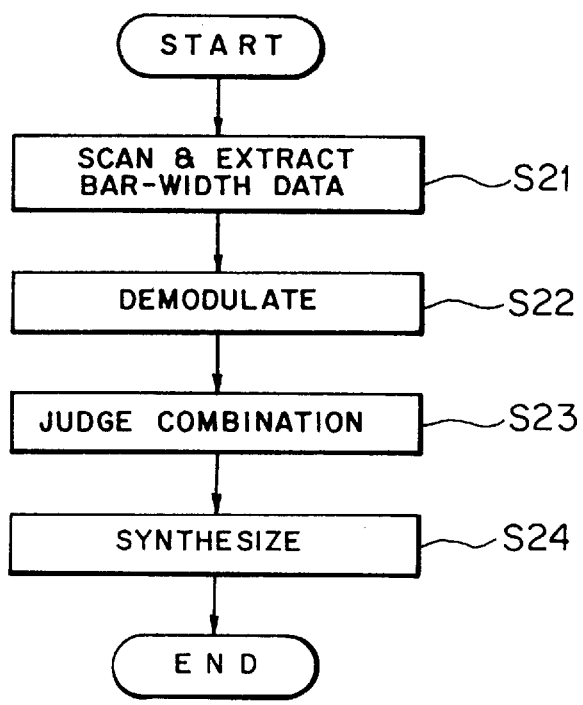
FIG. 7 is a flowchart used for explaining a seventh aspect of the present invention.

According to the seventh aspect of the invention, as shown in FIG. 7, the bar-code reading method includes scanning a bar-code with electromagnetic radioactive rays and extracting bar-width data from the reflection (step S21); demodulating the bar-width data and creating demodulation data (step S22); judging the presence or absence of a bar-code reproducible combination in demodulated data and judging the type of combination if the combination exists (step S23); and synthesizing the demodulated data or the character forming demodulated data according to the type of combination (step S24).

The processing operation according to the first aspect and seventh aspect of the present invention will now be explained.

In the step S21, the scanning and extracting means 10 scans a bar-code to be processed with electromagnetic radioactive rays such as light beams and then extracts bar-width data from the reflection. In the step S22, the demodulating means 11 demodulates a plurality of pieces of bar-width data extracted to create demodulated data.

In the step S23, the combination judging means 12 judges the presence or absence of a bar-code reproducible combination in the demodulation data obtained by the demodulating means 11 and then judges the type of combination when the combination exists.

Thereafter, in the step S24, while checking duplicate data, the synthesizing means 14 synthesizes demodulated data or a character forming demodulated data according to the type of combination.

The processing operation of the second and fifth aspects of the invention will be explained below.

In the step S1, the scanning and extracting means 10 scans a bar-code to be processed with electromagnetic radioactive rays such as light beams and then extracts bar-width data from the reflection. In the step S2, the deviation evaluating means 13 evaluates deviation from a predetermined standard of bar-width data extracted. At that time, the demodulating means 11 demodulates a plurality of pieces of bar-width data extracted to create demodulated data.

In the step S3, the combination judging means 12 judges the presence or absence of a bar-code reproducible combination in the demodulated data obtained by demodulating means 11, and judges the type of combination when the combination exists.

Thereafter, in the step S4, the screening and synthesizing means 15 screens valid data among demodulation data or characters forming demodulation data, based on the deviation evaluated by the deviation evaluating means 13 and synthesizes the screened data according to the type of combination.

The processing operation of the third and sixth aspects of the invention will be explained below.

In the step S11, the scanning and extracting means 10 scans a bar-code to be processed with electromagnetic radioactive rays such as light beams and then extracts bar-width data from the reflection. In the steps S12, the demodulating means 11 demodulates a plurality of pieces of bar-width data extracted to created demodulated data.

In the step S13, the combination judging means 12 judges the presence or absence of a bar-code reproducible combination in the demodulated data obtained by the demodulating means 11, and judges the type of combination when the combination exists. In the step S14, the demodulation status evaluating means 16 evaluates the demodulation status in the combination of the demodulation data.

For example, the state that although the bar-width data cannot be synthesized without any change since the duplicate portion of demodulation data is not the same, synthesis can be performed by removing one character at the front end or last end of the character, is evaluated.

Thereafter, in the step S15, the screening and synthesizing means 18 screens data as valid data in which, for example, the front end or last end of a character is removed from demodulation data according to the demodulation status, and then synthesizes the screened data according to the type of combination.

In the fourth aspect of the invention, the deviation evaluation relating to the second aspect of the invention (evaluation carried out by the deviation evaluating means 19 in the fourth aspect of the invention) and the demodulation status evaluation relating to the third aspect of the invention (evaluation carried out by the demodulation status evaluating means 20 in the fourth aspect of the invention) are performed. The screening and synthesizing means 22 screens demodulated data or a character forming demodulated data, based on the deviation and the demodulation status, and synthesizes the screened demodulated data or character according to the type of combination.

As described above, according to the bar-code reader of the first aspect of the invention and the bar-code reading method of the seventh aspect of the invention, the bar-code reader judges the presence or absence of the bar-code reproducible combination, judges the type of combination when the combination exists, and synthesizes demodulation data according to the type of combination. Hence compared with the immediate demodulation data synthesizing method, since only a synthesizing operation with strong reproduction possibility of the bar-code is performed, the bar-code reading can be performed effectively and quickly.

According to the bar-code reader of the second and fourth aspects of the present invention and the bar-code reading method of the fifth aspect of the invention, the demodulation data is synthesized by judging the presence or absence of the bar-code reproducible combination, judging the type of combination when the combination exists, evaluating deviation of bar-width data from a predetermined standard, and screening and synthesizing demodulation data or character forming demodulation data based on the deviation. Hence since the number of combinations of demodulation data needed for data synthesis can be reduced and the bar-code reproduction completing time can be shortened, the simple bar-code reading can be performed effective and quickly. Since only valid data with no possibility of erroneous reading is screened by removing characters with a possibility of erroneous reading, a bar-code can be read accurately.

Furthermore, according to the bar-code reader of the third and fourth aspects of the invention and the bar-code reading method of the sixth aspect of the invention, the demodulation data is synthesized by judging the presence or absence of the bar-code reproducible combination, judging the type of combination when the combination exists, evaluating the demodulation status including the number of combinations and positions of characters in the combined demodulation data, and screening and synthesizing demodulation data or character forming demodulation data according to the demodulation status. Hence since the number of combinations of demodulation data needed for data synthesis can be reduced and the bar-code reproduction completion time can be shortened, bar-code reading can be performed effectively and quickly. Since only valid data with no possibility of erroneous reading is screened by removing characters with a possibility of erroneous reading, a bar-code can be read accurately.

Figure 8:
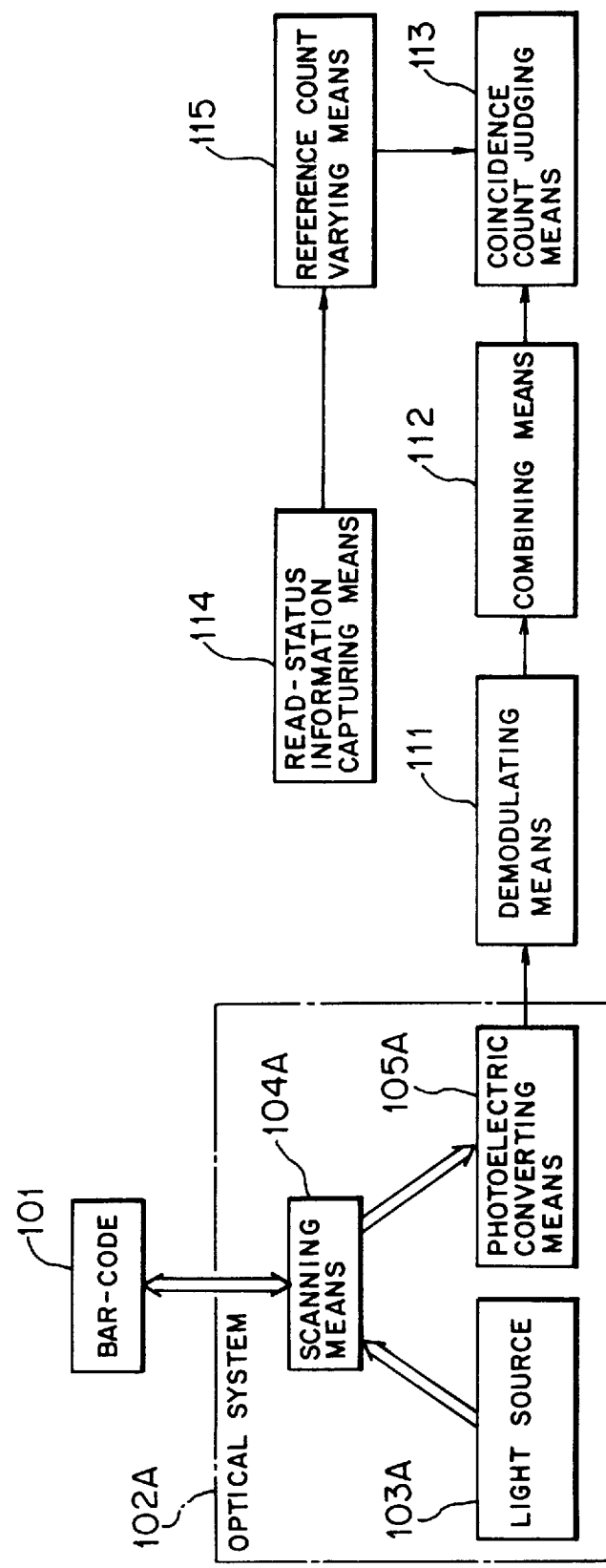
FIG. 8 is a block diagram showing eighth and ninth aspects of the present invention.
Figure 9:
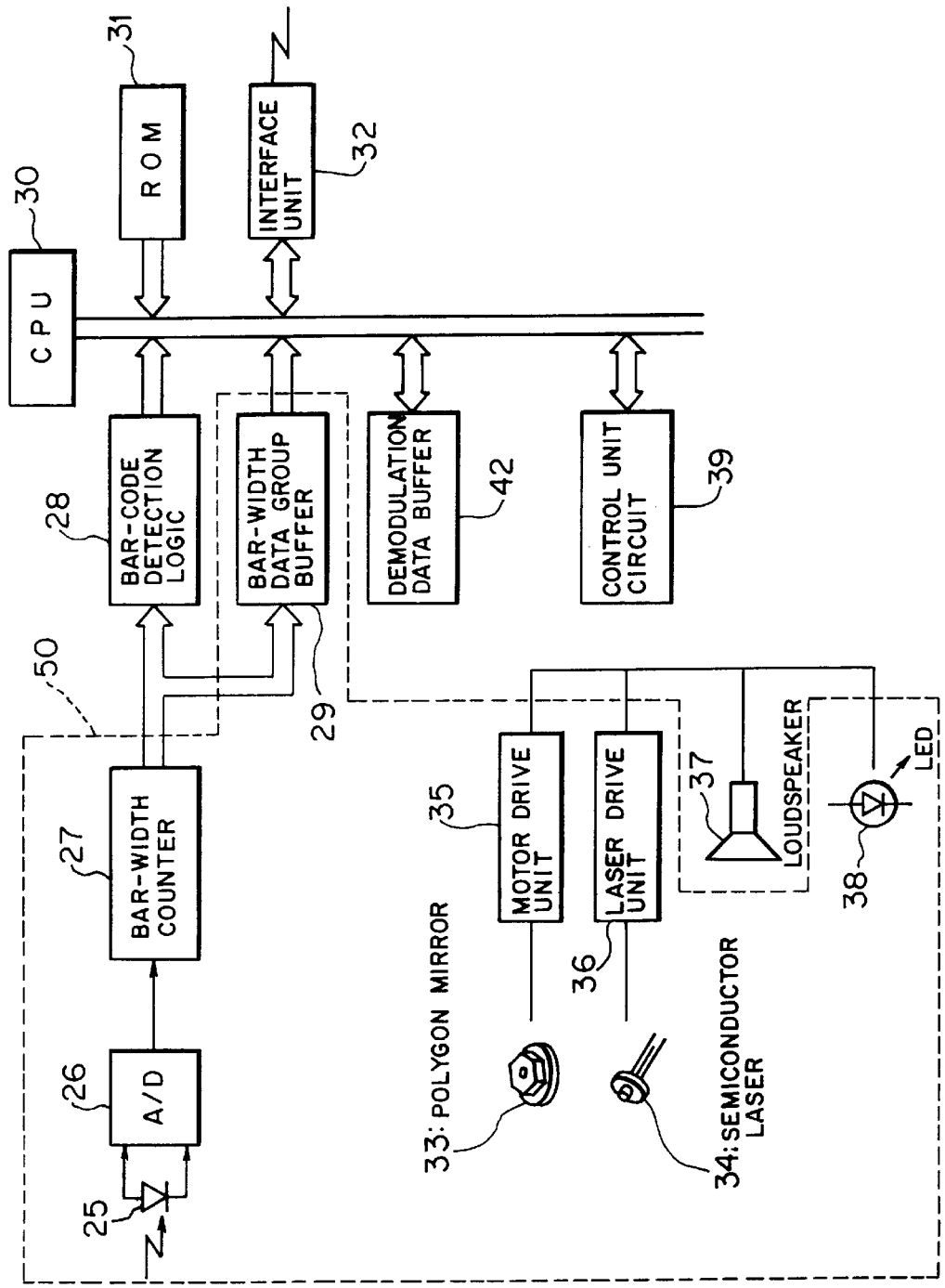
FIG. 9 is a block diagram schematically showing the entire configuration of an apparatus relating to each of the first to seventh embodiments according to the present invention.

FIG. 8 is a block diagram showing the eighth and ninth aspects of the invention. Referring to FIG. 9, numeral 101 represents a bar-code; 102A represents an optical system that irradiates light beam as electromagnetic radioactive rays to the bar-code 101 and receives the reflected light being light beam reflected on the bar-code 101; 103A represents a light source for emitting light beams as electromagnetic radioactive rays; 104A represents scanning means for irradiating a plurality of light beams from the light source 103A to the bar-code 101 and scanning the bar-code 101 with each light beam; and 105A represents photoelectric converting means for receiving the reflected light beam being each light beam from the bar-code 101 and converting it into an electrical signal corresponding to the light amount. The optical system 102A is formed of the light source 103A, the scanning means 104A, and the photoelectric converting means 105A.

Numeral 111 represents demodulating means; 112 represents combining means; 113 represents coincidence count judging means; 114 represents read-status information capturing means; and 115 represents reference count varying means.

The demodulating means 111 demodulates data regarding a plurality of portions of the bar-code 101 partially scanned with each light beam, based on the electrical signal from the photoelectric converting means 105A. The combining means 112 is combining means that demodulates data of the bar-code 101 by combining demodulation data regarding a plurality of portions of the bar-code 101 demodulated by the demodulating means 111.

The coincidence count judging means 113 detects the number of times that the same data from the bar-code 101 is continuously demodulated by means of the demodulating means 111 and the combining means 112, compares the number (count value) with a predetermined reference number of times (reference count), and then completes the reading of the bar-code 101 by validating data demodulated from the bar-code 101 when the count value reaches the predetermined reference count.

The read-status information capturing means 114 captures the read-status information of the bar-code 101. The reference count varying means 115 varies the setting of the reference count of the coincidence count judging means 113 according to read-status information of the bar-code 101 captured by the read-status information capturing means 114.

The following various means explained with the items (1) to (8) are used as the read-status information capturing means 114.

(1) The character number detecting means for detecting as read-status information of the bar-code 101 the number characters which are duplicately demodulated in demodulation data regarding a plurality of portions of the bar-code 101.

(2) The character number detecting means for detecting as read-status information of the bar-code 101 the number of characters with different demodulation results in duplicated portion in demodulation data regarding a plurality of portions of the bar-code 101.

(3) The duplicate position detecting means for detecting as read-status information of the bar-code 101 the positions of duplicated portions in demodulation data regarding a plurality of portions of the bar-code 101.

(4) The combination pattern detecting means for detecting as read-status information of the bar-code 101 a combination pattern of a plurality of portion of the barcode 101 combined by demodulation data combining means 112.

(5) The distortion amount measuring means for calculating and measuring as read-status information of the bar-code 101 the read distortion amount of portions where a plurality of portions of the bar-code 101 a mutually overlapped. Moreover, the distortion amount measuring means may calculate and measure (a) the distortion amount in the character-length of the portion where a plurality of portions of the bar-code 101 are mutually duplicated, (b) the distortion amount in the δ distance-length obtained every character to specify the character data regarding portions where a plurality of portions of the bar-code 101 are mutually duplicated, and (c) the distortion amount in a bar itself being the character of a portion where a plurality of portions of the bar-code 101 are mutually duplicated.

(6) The bit-shift data detecting means for outputting as the read-status information of the bar-code 101 information whether data regarding a plurality of portions of the bar-code 101 is changed into different data by bit-shifting.

(7) The wave error detecting means for outputting as the read-status information of the bar-code 101 the presence or absence of a wave error occurrence in a plurality of portions of the bar-code 101.

(8) The guard bar/center bar detecting means for outputting as the read-state information of the bar-code 101 information indicating whether some of a plurality of portions of the bar-code 101 include both the guard bar and the center bar of the bar-code 101 detected. A plurality means relating to the items (1) to (8) may be combined in use.

In the above-mentioned configuration of the eighth and ninth aspects of the present invention, as shown in FIG. 8, a plurality of light beams emitted from the light source 103 are irradiated to the bar-code 101 and shifted and scanned at a constant rate by means of the scanning means 104A, scattered and reflected on a plurality of portions of the bar-code 101, and then brought as a reflected light into the photoelectric converting means 105A.

The photoelectric converting means 105A converts each reflected light from a plurality of portions of the bar-code 101 into an electrical signal according to the light amount and the demodulating means 111 demodulates a plurality of pieces of data regarding a plurality of portions of the bar-code 101 as much as possible based on the electrical signal. Then the combining means 112 combines the plurality of pieces of demodulated data and then demodulates them as data of the bar-code 101.

When the data of the bar-code 101 is demodulated, the coincidence count judging means 13 detects the number of times that the same data from the bar-code 101 is continuously demodulated. When the number of times reaches a predetermined reference count, the reading operation of the bar-code 101 is completed by validating data demodulated from the bar-code 101. In the eighth and ninth aspects of the present invention, the read-status information capturing means 114 captures the read-status information of the bar-code 101. The reference count varying means 115 varies the setting of the reference count of the coincidence count judging means 113, according to the read-state information of the bar-code 101 from the read-status information capturing means 114.

In the prior-art, the coincidence count judgment is always performed a constant reference number of times. However, according to the eighth and ninth aspects of the present invention, the reference count can be set to a large value according to the read-status information of the bar-code 101 in the case of an erroneous reading with strong possibility. In the case of an erroneous reading with small possibility, the reference count can be set to a small value.

As described above, as read-status information of the bar-code 101 captured by the read-status information capturing means 114 the following are used: (1) the number of characters duplicate-demodulated in demodulated data regarding a plurality of portions of the bar-code 101, (2) the number of characters with different demodulation result in the duplicate portion in demodulated data regarding plural portions of the bar-code 101, (3) the position of a duplicate portion in demodulated data regarding a plurality portions of the bar code 101, (4) the combination pattern of demodulated data regarding a plurality of portions of the bar-code 101 created by the combining means 112, (5) the read distortion amount of a portion where a plurality of portions of the bar-code 101 are mutually duplicated (distortion amount in character-length, distortion amount in δ distance length obtained every character to specify character data, and distortion amount of a bar itself forming a character), (6) information on whether data of each of a plurality of portions of the bar-code 101 is changed into different data through bit-shifting, (7) the presence or absence of wave error occurrence in a plurality of portions of the bar-code 101, and (8) information on whether there is a portion in which both the guard bar and the center bar of the bar-code 101 are detected or not among a plurality of portions of the bar-code 101.

As described above in detail, according to the bar-code reading method of the eighth aspect of the invention and the bar-code reader of the ninth aspect of the invention, when there is a strong possibility of an erroneous reading, the reference number of times is set to a large value, whereas when there is a small possibility of an erroneous reading, the reference number of times is set to a small value according to information regarding the reading status of the bar-code 101. Therefore, there is an advantage in that the reading rate on actual operation is greatly improved without decreasing the reading efficiency, whereby the erroneous reading rate is greatly decreased.

(b) First to Seventh Embodiments:

FIG. 9 is a schematic diagram showing the entire configuration of the apparatus relating to the first to seventh embodiments of the present invention.

As shown in FIG. 9, the bar-code read according to the first to seventh embodiments consists of a light receiving unit 25 for receiving a reflected light reflected on a bar-code; an A/D converter 26 for converting the received analog signal into a digital signal; a bar-width counter 27; a bar-code detecting logic 28; a bar-width data group buffer 29 for holding a bar-width data group; a demodulation data buffer group 42 for holding various demodulation data; a CPU 30 for encoding various types of control and bar-codes; a ROM 31 for storing various programs; an interface unit 32 for controlling a trunk connection to a communication line; a semiconductor laser 34 for emitting a laser beam (electromagnetic radioactive rays) to scan the bar-code, a laser drive unit 36 for driving emission of the semiconductor laser 34; a polygon mirror 33 for rotating to scan the bar-code with the laser beam; a motor drive unit 35 for rotatably driving the polygon mirror 33; a loudspeaker 37 for producing an alarm sound to warn at an error occurrence; an LED light emitting element 38; and a control unit circuit 39 for controlling the laser drive unit 36, the motor drive unit 35, the loudspeaker 37, the LED light emitting element 38, and similar elements.

Figure 10:
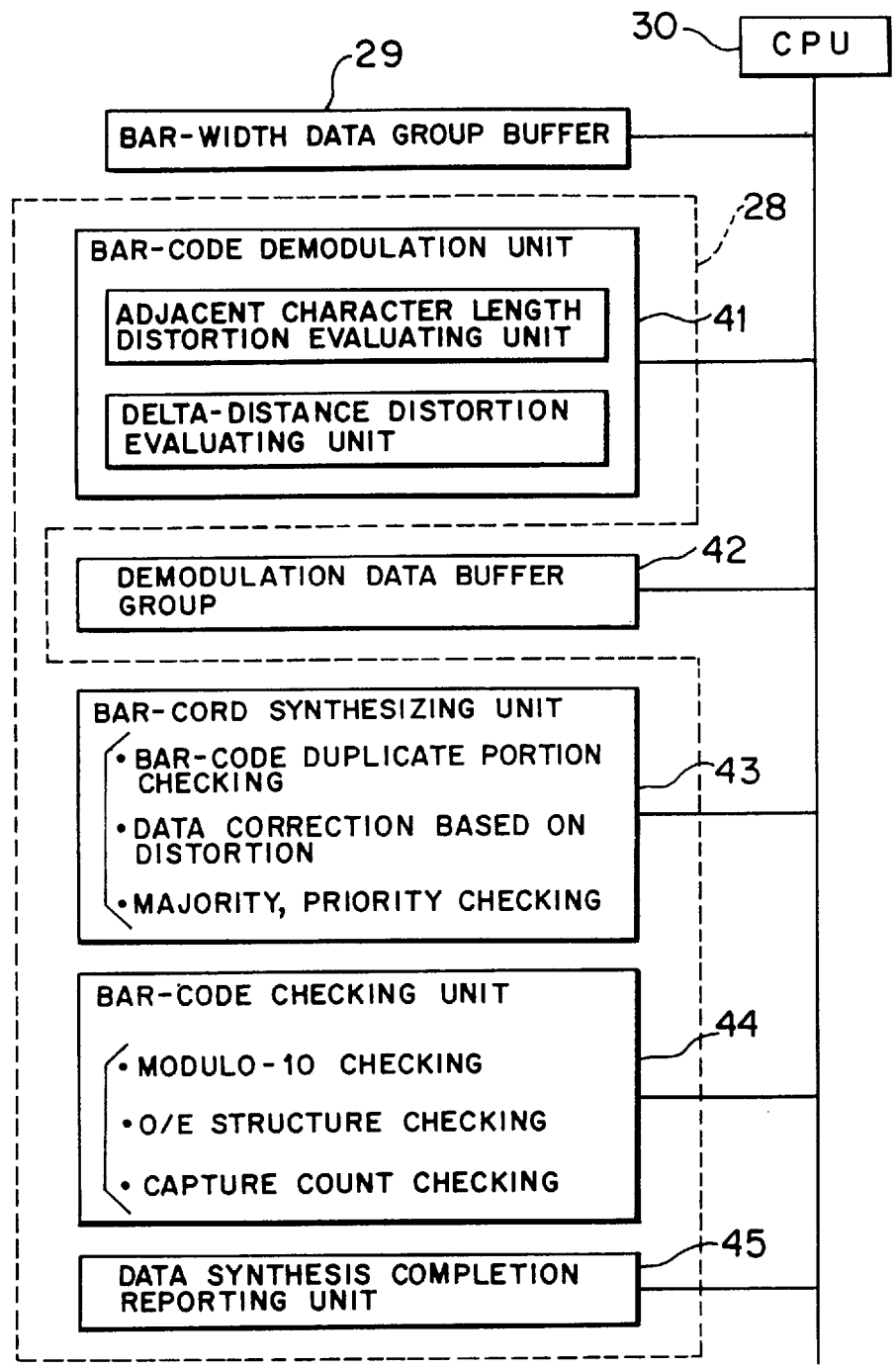
FIG. 10 is a block diagram showing the main portion of a bar-code reader according to the first to seventh embodiments.

Moreover, the bar-code detecting logic 28, as shown in FIG. 10, includes a bar-code demodulating unit 41, a bar-code synthesizing unit 43, a bar-code checking unit 44 for performing various checking operations, and a bar-width data synthesis completion reporting unit 45 for reporting the completion of the bar-width data synthesis to the CPU 30.

The bar-code checking unit 44 executes a modulo-10 checking, an O (odd)/E (even) structure checking, and capture count checking.

The scanning and extracting unit 50 according to the first to seventh embodiments includes the light receiving unit 25, the A/D converter 26, the bar-width counter 27, the bar-width data group buffer 29, the semiconductor laser 34, the laser drive unit 36, the polygon mirror 33, the motor drive unit 35, and the like.

FIG. 11 shows the functional structure of the bar-code reader relating to the first embodiment.

The bar-code reader relating to the first embodiment, as shown in FIG. 11, includes a scanning and extracting unit 50 for scanning a bar-code with a light beam (electromagnetic radioactive rays) and extracting the bar-width data from the reflected light, a demodulating unit 51 for demodulating the bar-width data extracted by the scanning and extracting unit 50 and creating demodulated data, a combination judging unit 52 for judging the presence or absence of the bar-code reproducible combinations of the demodulated data created by the demodulating unit 51 and judging the type of combination if the combination exists, an adjacent character length distortion evaluating unit 53 for evaluating the distortion of an adjacent character corresponding to the deviation from a predetermined standard of the bar-width data extracted by the scanning and extracting unit 50, and a screening and synthesizing unit 55 for screening demodulation data or a character forming demodulation data, based on the distortion evaluated by the evaluating unit 53, and synthesizing the screened demodulated data or character according to the type of combination.

The adjacent character length distortion evaluating unit 53 corresponds to the deviation evaluating means 13 described with FIG. 2 and the evaluated distortion corresponds to the deviation.

The demodulating unit 51 and the adjacent character length distortion evaluating unit 53 correspond to the bar-code demodulating unit 41 shown in FIG. 10. The combination judging unit 52 and the screening and synthesizing unit 55 correspond to the bar-code synthesizing unit 43 shown in FIG. 10.

The "character" is, for example, in a bar-code symbol for a common commodity code, an actual or encoded numerical expression. In the bar-codes, 7 modules represent one character.

The "type (classification)" judged by the combination judging unit 52 will be described later.

The distortion of an adjacent character length will be explained using FIGS. 12(*a*) and 12(*b*).

Figure 12A:
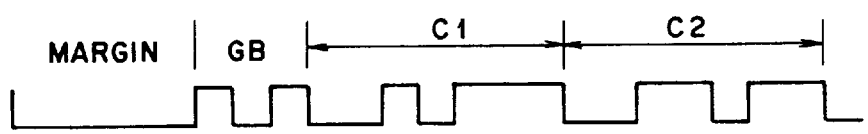
FIG. 12(*a*) and 12(*b*) are diagrams each used for explaining distortion relating to the first embodiment.
Figure 12B:
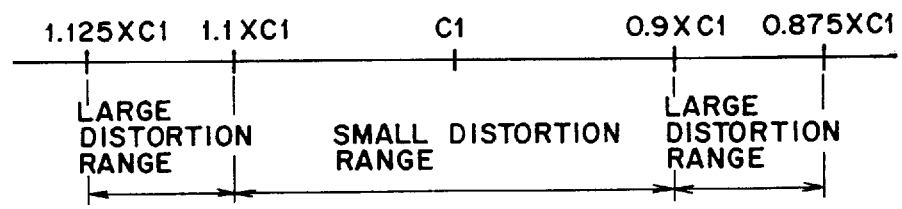

As shown in FIG. 12(*a*), when the lengths of two adjacent characters are "C1" and "C2", respectively, the permissible range of adjacent character length is expressed, for example, as follows:

$$0.875 \times C1 < C2 < 1.125 \times C1$$

In this case, the adjacent character length distortion evaluating unit 53, as shown in FIG. 12(*b*), evaluates as a large permissible distortion the range between (1.125×C1 ) and (1.1×C1) and between (0.9×C1) and (0.875×C1) and as a small permissible distortion the range between (1.1×C1) and (0.9×C1). According to the above-mentioned reference, when it is evaluated that the character of a bar-width data extracted with a single scanning line has a large distortion, the screening and synthesizing unit 55 removes the demodulated data character with the large distortion evaluated and then screens as valid data a character other than the character with the large distortion evaluated, and then performs a synthesizing process using the valid data.

The detailed process extending to synthesis will be described later.

Next, the second embodiment will be explained by referring to FIGS. 13 to 15.

Figure 13:
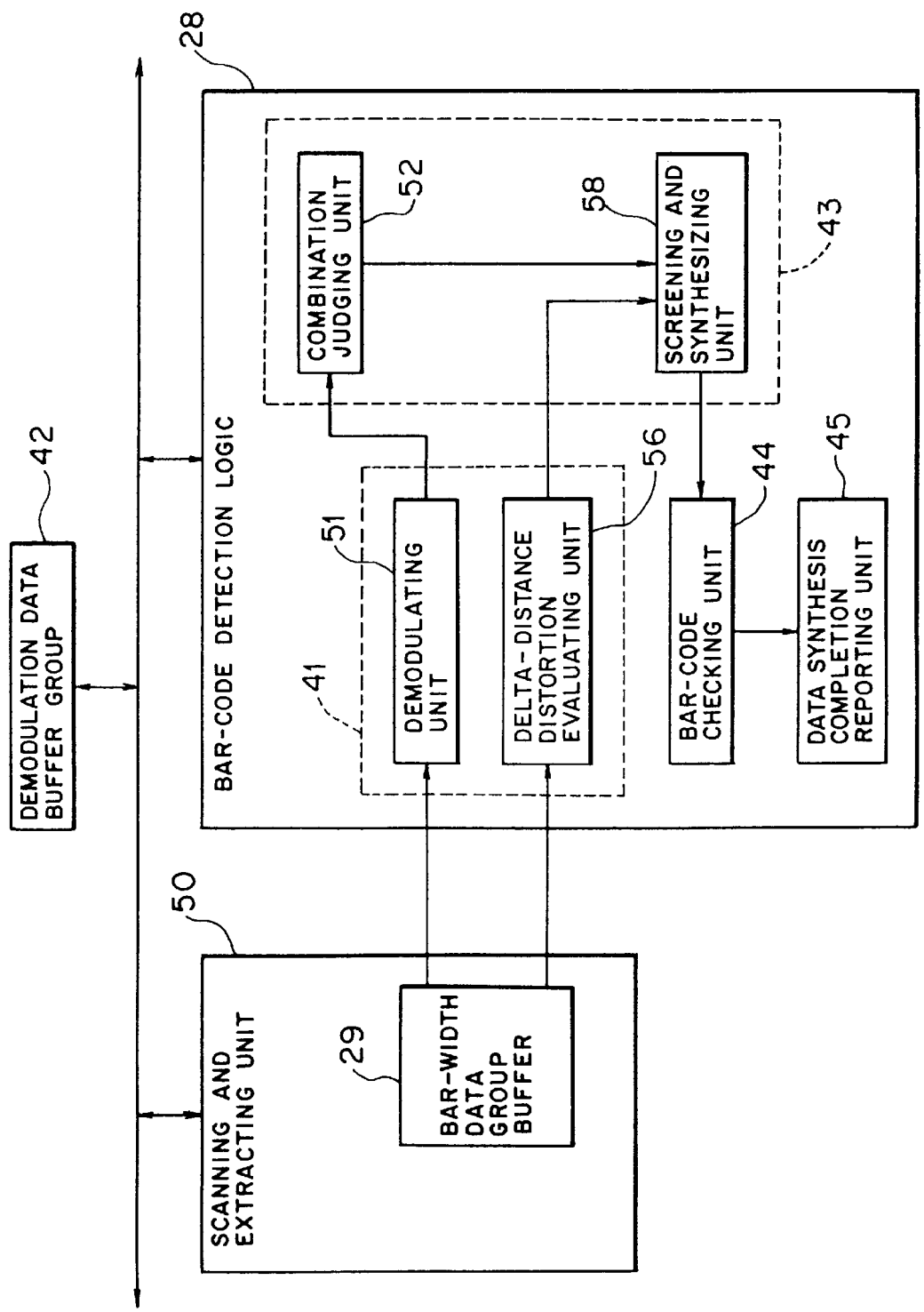
FIG. 13 is a block diagram relating to the second embodiment.

The bar-code reader relating to the second embodiment, as shown in FIG. 13, includes a scanning and extracting unit 50 for scanning a bar-code with a light beam (electromagnetic radioactive rays) and extracting the bar-width data from the reflected light, a demodulating unit 51 for demodulating the bar-width data extracted by the scanning and extracting unit 50 and creating demodulated data, a combination judging unit 52 for judging the presence or absence of the bar-code reproducible combinations of the demodulated data created by the demodulating unit 51 and judging the type of combination if the combination exists, a δ distance distortion evaluating unit 56 for evaluating the distortion (i.e., a degree of deviation) of a δ distance every character of the bar-width data extracted by the scanning and extracting unit 50, and a screening and synthesizing unit 58 for screening demodulation data or a character forming demodulation data, based on the δ distance distortion evaluated by the evaluating unit 56, and synthesizing the screened demodulated data or character according to the type of combination.

The δ distance distortion evaluating unit 56 corresponds to the evaluating means 13 described with FIG. 2, and the evaluated distortion corresponds to the deviation.

Figure 14A:
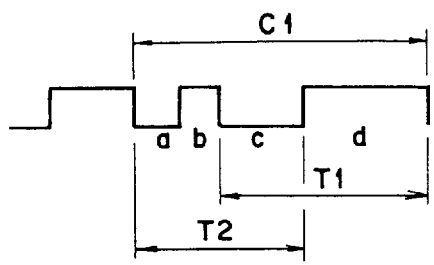
FIG. 14(*a*) to 14(*c*) are diagrams each used for explaining the distortion in δ distance relating to the second embodiment.
Figures 15A, 15B, 15C:
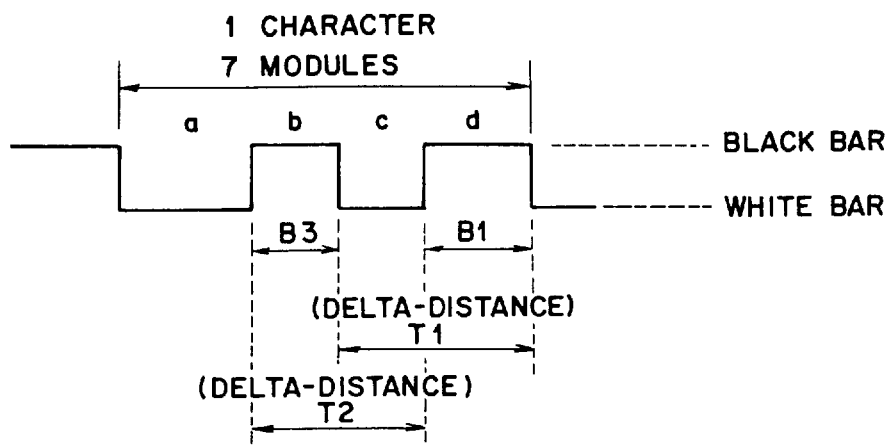
FIG. 15(*a*) and 15(*c*) are diagrams each used for explaining a δ distance vs. demodulated data correspondence relating to the second embodiment.

The "δ distance" means the sum (number of modules) of the bar-widths of a black bar and white bar being adjacent to each other (T1, T2) every character, as shown in FIG. 14(a) and FIG. 15(a), and is data used to obtain demodulation data from the bar-width data.

Figure 14B:
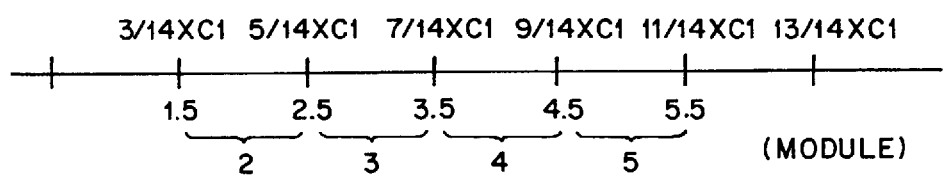

FIG. 14(b) shows a permissible range obtained when each δ distance (T1, T2) has the number of modules.

That is, in the case of N modules, the permissible range is from N−0.5 to N+0.5.

Figure 14C:
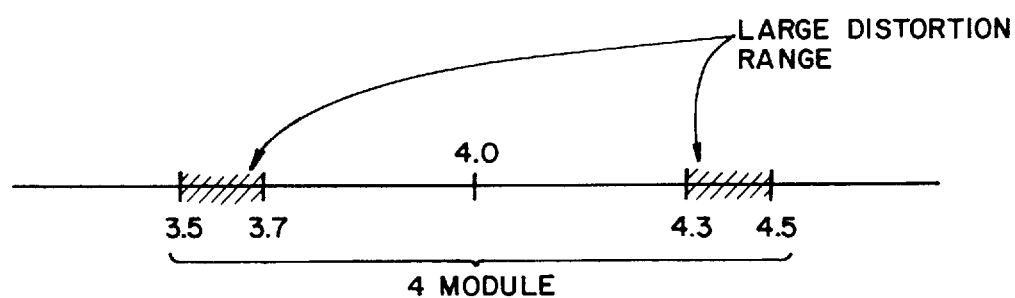

Furthermore, FIG. 14(c) shows a δ distance permissible range in the case where in the δ distance is 4 modules, the range evaluated as a large distortion, and the range evaluated as a small distortion. In the case of 4 modules, the permissible range corresponds to 3.5 to 4.5 modules. The large distortion range from 3.5 to 3.7 and from 4.3 to 4.5. The small distortion range is from 3.7 to 4.3 modules.

That is, in the case of N modules, the large distortion corresponds to the range of N−0.5 to N−0.3 and N+0.3 to N+0.5. The small distortion corresponds to the range of N−0.3 to N+0.3.

In such manner, when the δ distance distortion evaluating unit 56 evaluates the degree of distortion, the screening and synthesizing unit 58 removes characters with large distortion, screens characters with small distortion as valid data, and then performs a synthesizing process using the screened valid data.

FIG. 15(b) shows a table which lists the numerals and parities of characters obtained by combining the δ distances T1 and T2. FIG. 15(b) corresponds to the table shown in FIG. 63. The δ distance T1 shown in FIG. 15(b) corresponds to T02 shown in FIG. 63 and the δ distance T2 shown in FIG. 15(b) corresponds to T01 shown in FIG. 63.

The shaded portion shown in FIG. 15(b) shows the same relationships between the δ distances T1 and T2. Hence FIG. 15(c) shows the table used to discriminate further numerals and parities using the widths B1 and B3 of the black bars (refer to FIG. 15(a)).

The detailed process extending to synthesis will be described later.

Sequentially, the third embodiment will be explained with reference to FIGS. 16 and 17.

Figure 16:
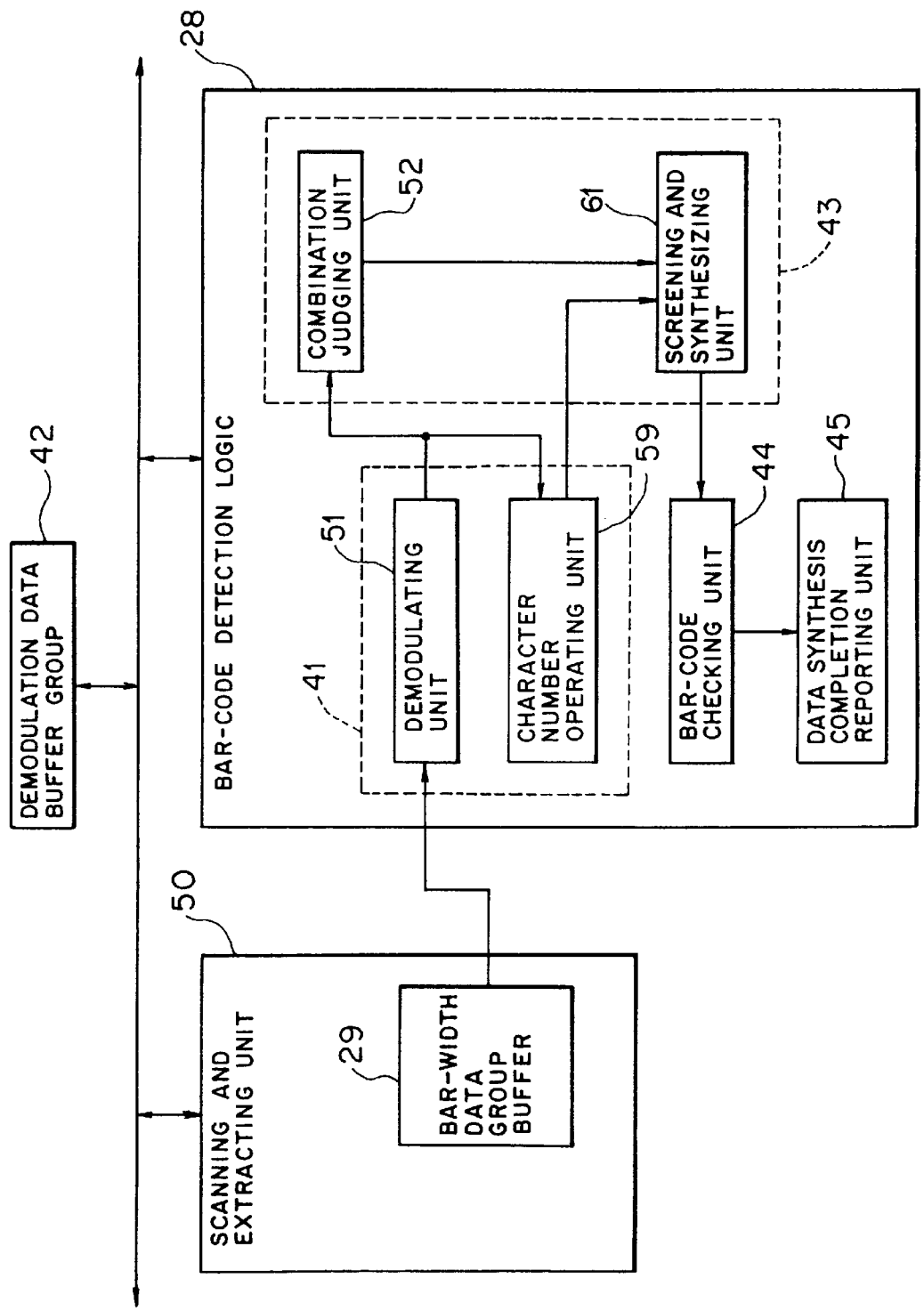
FIG. 16 is block diagram relating to the third embodiment.

As shown in FIG. 16, the bar-code reader relating to the third embodiment includes a scanning and extracting unit 50 for scanning a bar-code with light beams (electromagnetic radioactive rays) and extracting the bar-width data from the reflected light; a demodulating unit 51 for demodulating the bar-width data extracted by the scanning and extracting unit 50 and creating demodulation data; a combination judging unit 52 for judging the presence or absence of a bar-code reproducible combination in the demodulation data created by the demodulating unit 51 and judging the type of combination if the combination exists; a character number operating unit 59 for calculating and operation the number of character forming demodulation data; and a screening and synthesizing unit 61 for screening demodulated data with more characters and then synthesizing the demodulated data screened according to the type of combination.

The character number operating unit 59 corresponds to the demodulation status evaluating means 17 described with FIG. 3. The number of characters operated by the character number operating unit 59 corresponds to a demodulation status.

Figures 17A, 17B, 17C:
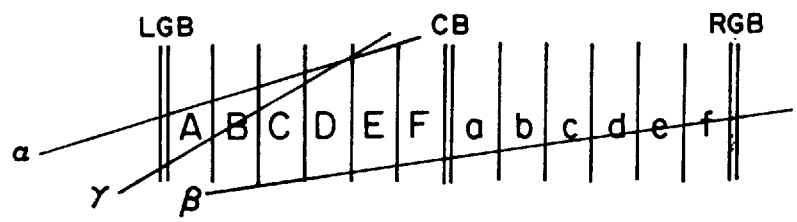
FIG. 17(*a*) to 17(*c*) are diagrams each used for explaining a bar-code reading operation relating to the third embodiment.

FIG. 17(a) shows an example in which the scanning and extracting unit 50 irradiates three scanning lines α, β, and γ to the bar-code of the standard version. Scanning with the scanning line a results in demodulated characters A, B, C, D, and E'. The character E' indicates a character which is erroneously read because beams cannot completely scan over the character E. Symbols D, E, F, a, b, c, d, e, and f represent the characters demodulated with scanning line β. Symbols A, B, C, and D represent the characters demodulated with scanning line γ.

In the above case, the character number operating unit 59 judges that the number of characters is in the order of β>α γ. The screening and synthesizing unit 61 sets as demodulated data with high validity the priority in the decreasing order of character number, screens as valid data the data regarding the scanning lines β and α with the first and second highest priorities, respectively, and then synthesizes using the valid data.

In another example of the third embodiment, as shown in FIGS. 17(b) and 17(c), the characters obtained by scanning the same bar-code with a plurality of scanning lines and the number of the characters (frequency capture count) are stored. The character number operating unit 59 calculates the number of the demodulated characters (frequency). The screening and synthesizing unit 60 removes characters with less frequency and screens characters with high frequency as valid data, and then synthesizes demodulated data, based on the screened character.

In FIG. 17(b), the bits b7 to b5 are used to record the capture count. The bit b4 is used to record parity structure information (Odd/Even). The bits b3 to b0 are used to record character data (0 to 9). Demodulation data of the left block of a bar-code is recorded in the upper blank of the table shown in FIG. 17(b). Demodulation data of the right block of a bar-code is recorded in the lower blank.

FIG. 17(c) shows two storage buffers 1 and 2 each which holds a character obtained with two scanning lines and the character capture count (the demodulation number of times) (symbols A to E, and D' in this figure have no relations with those in FIG. 17(a)). Where a character and the capture count of demodulated data obtained as a result of scanning with a scanning line are stored in the storage buffer 1, as shown in FIG. 17(c), the characters A, B, C, and D are screened as valid data (the demodulation number of times is 2 or more) and the character E is removed from valid data because of a small capture count (the demodulation number of times). Where the character of data modulated based on a result of scanning with another scanning line and the capture count are stored in the storage buffer 2 as shown in FIG. 17(c), the characters A, B, and C are screened as valid data and the character D' is removed from valid data.

As a result, the screening and synthesizing unit 61 performs a synthesizing process by treating characters A, B, C, and D as demodulated data.

Next, the fourth embodiment will be explained with reference to FIGS. 18 and 19(a).

Figure 18:
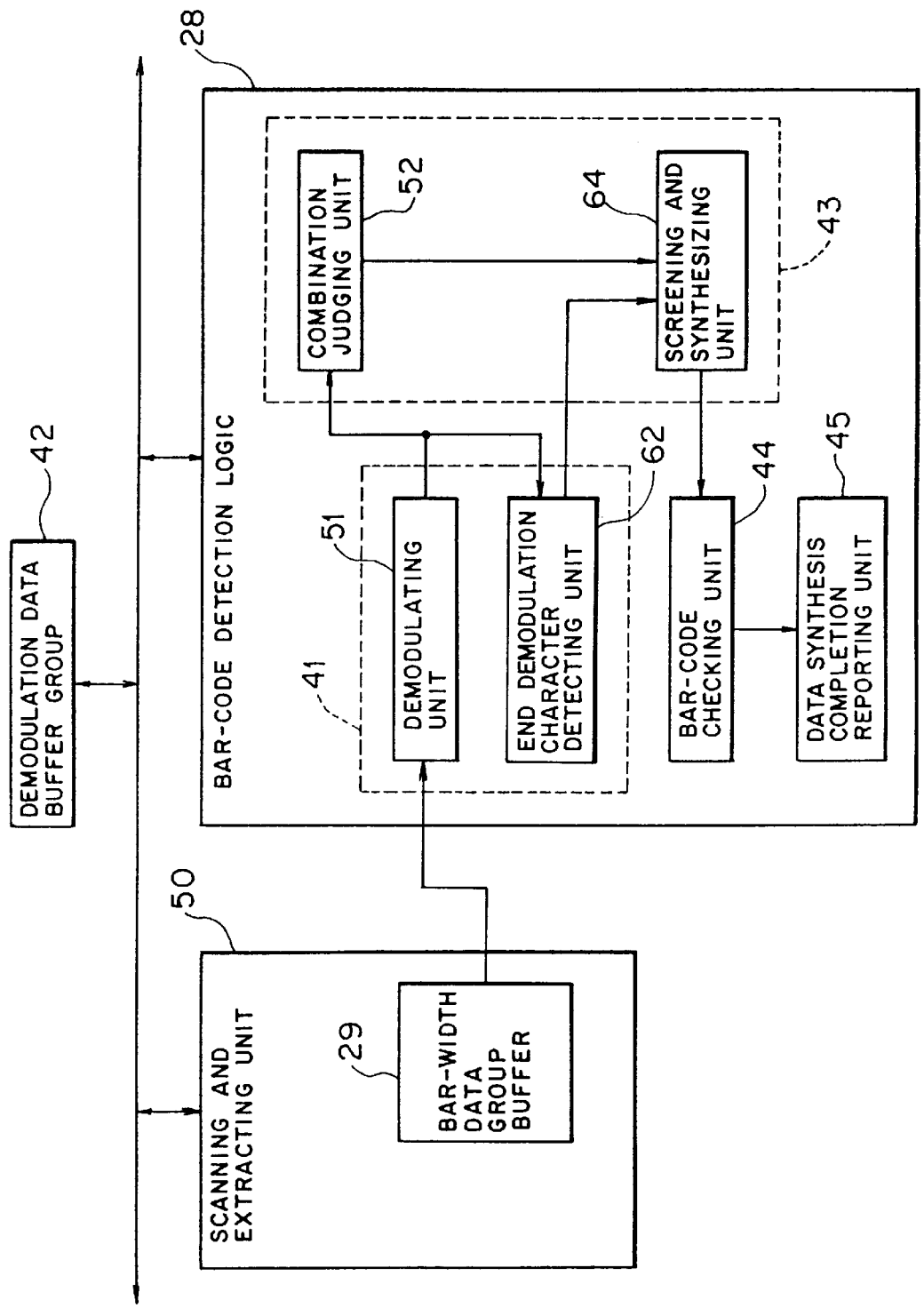
FIG. 18 is a block diagram relating the fourth embodiment.

According to the fourth embodiment, the bar-code reader, as shown in FIG. 18, includes a scanning and extracting unit 50 for scanning a bar-code with light beams (electromagnetic radioactive rays ) and extracting the bar-width data from the reflected light; a demodulating unit 51 for demodulating the bar-width data extracted by the scanning and extracting unit 50 and creating demodulation data; a combination judging unit 52 for judging the presence or absence of bar-code reproducible combinations in the demodulation data created by the demodulating unit 51 and judging the type of combination if the combination exists; an end demodulation character detecting unit 62 for detecting a character demodulated at the end of a series of character rows forming demodulation data corresponding to each scanning line; and a screening and synthesizing unit 64 for screening characters as valid characters except the character demodulated at the end (or detected in the detection 62) and then synthesizing the screened data according to the type of combination.

The end demodulation character detecting unit 62 corresponds to the demodulation status evaluating means 17 shown in FIG. 3. The character detected by the end demodulation character detecting unit 62 corresponds to a demodulation status.

Figure 19A:
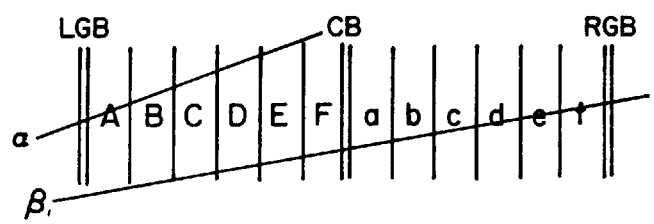
FIG. 19(*a*) to 19(*c*) are diagrams each used for explaining a bar-code reading operation relating to fourth, fifth, and seventh embodiments.

For example, as shown in FIG. 19(a), the characters demodulated with scanning line a are expressed with A, B, C, D, and E', respectively. The characters demodulated with the scanning lines line δ are expressed with C', D, E, F, a, b, c, d, e, and f, respectively. In the demodulation data demodulated with the scanning lines α and β, since there is a strong possibility that the characters E and C arranged at the end is incompletely scanned, the bar-code may not be synthesized. Hence, in the fourth embodiment, the end demodulation characters E' and C' detected by the end demodulation character detecting unit 62 are removed and the demodulation character except the characters are screened as valid data. That is, the characters A, B, C, and D of demodulated data demodulated with the scanning line α are screened as valid data and the characters D, E, F, a, b, c, d, e, and f of demodulated data demodulated with the scanning line β are screened as valid data. As a result, since the characters D in two pieces of the combined demodulated data are duplicated and agree to each other, the demodulated data corresponding to the scanning line α is synthesized with the demodulated data corresponding to the scanning line β.

Next, the fifth embodiment will be described below with reference to FIGS. 20 and 19(b).

According to the fifth embodiment, the bar-code reader, as shown in FIG. 20, includes a scanning and extracting unit 50 for scanning a bar-code with light beams (electromagnetic radioactive rays) and extracting the bar-width data from the reflected light; a demodulating unit 51 for demodulating the bar-width data extracted by the scanning and extracting unit 50 and creating demodulation data; a combination judging unit 52 for judging the presence or absence of bar-code reproducible combinations in the demodulation data created by the demodulating unit 51 and judging the type of combination if the combination exists; a guard-bar/center bar passage data detecting unit 65 for detecting passage data demodulated by crossing the guard bar and center bar among a plurality of pieces of the demodulated data combined; and a screening and synthesizing unit 67 for screening preferentially the passage data as valid data detected by the detecting unit 65 and then synthesizing the screened data according to the type of combination.

The guard bar/center bar passage data detecting unit 65 corresponds to the demodulation status evaluating means 17 shown in FIG. 3. The passage data detected by the guard bar/center bar passage data detecting unit 65 corresponds to a demodulation status.

Figure 19B:
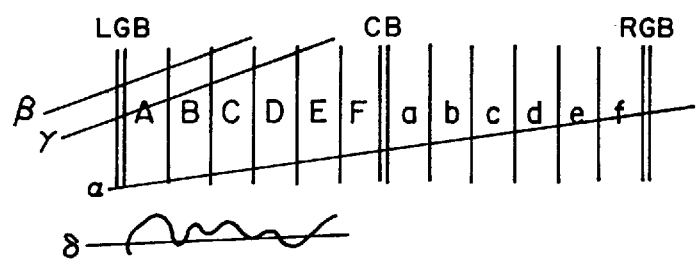

For example, FIG. 19(b) shows the case where demodulated data (demodulation data formed of characters B, C, D, E, F, a, b, c, d, e, and f) is obtained with the scanning line α crossing the guard bar (RGB) and the center bar (CB). In this case, the right block of the bar-code is completely scanned and the left block is partially scanned. FIG. 19(b) shows the case where demodulation data formed of characters A, B, and C' is obtained with the scanning line β; demodulation data formed of characters A, B, C, and D' is obtained with the scanning line γ; and demodulation data formed of characters A', B', and C' is obtained with the scanning lines δ.

In this case, since the duplicate portions in all pieces of the demodulated data demodulated with the scanning lines α to δ differ slightly from each other, the demodulated data of a bar-code cannot be synthesized. The scanning line δ scanning out of the bar-code may produce data like the bar-code data due to noises. It is considered that the demodulated data demodulated with the scanning line α crossing the guard bar and the center bar has a high reliability. When the guard bar/center bar passage data detecting unit 65 detects data passing the guard bar and the center bar, data obtained with the scanning line α is set to the highest priority order. The priority order is set in the order of γ, β, and δ. The screening and synthesizing unit 67 synthesizes demodulated data by duplicating the characters B and C, based on the characters (demodulated data) obtained with the scanning line α and the characters (demodulated data) obtained with scanning line γ.

Sequentially, the sixth embodiment will be explained below with the reference to FIGS. 21 and 22(a) to 22(c).

Figure 21:
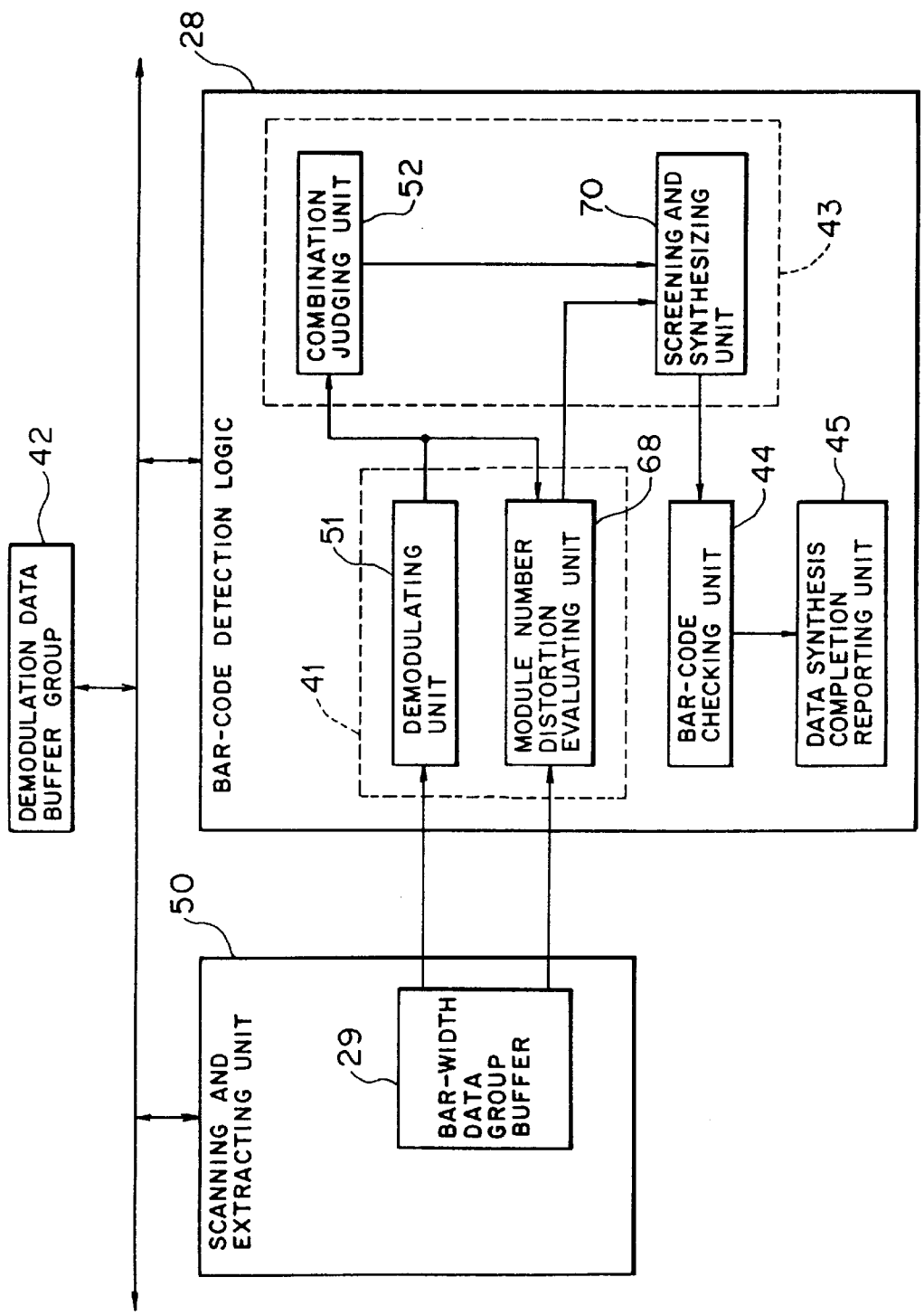
FIG. 21 is block diagram relating to the sixth embodiment.
Figure 22A:
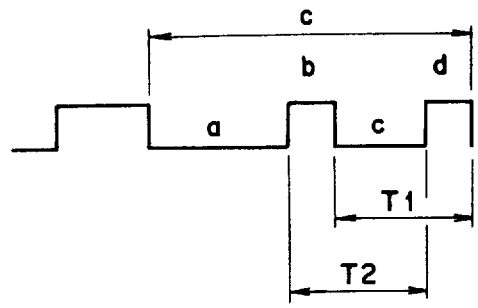
FIG. 22(*a*) to 22(*c*) are diagrams each used for explaining the distortion relating to the sixth embodiment.
Figure 22B:
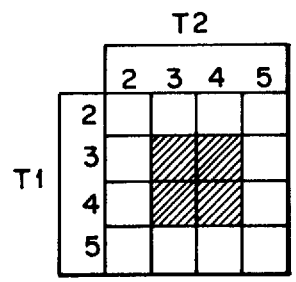
Figure 22C:
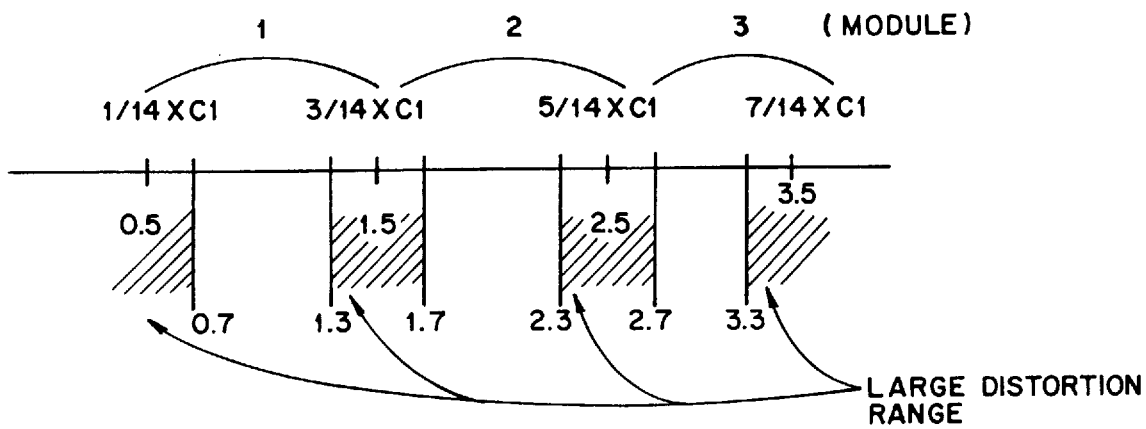

According to the sixth embodiment, the bar-code reader, as shown in FIG. 21, includes a scanning and extracting unit 50 for scanning a bar-code with light beams (electromagnetic radioactive rays) and extracting the bar-width data from the reflected light; a demodulating unit 51 for demodulating the bar-width data extracted by the scanning and extracting unit 50 and creating demodulation data; a combination judging unit 52 for judging the presence or absence of a bar-code reproducible combinations in the demodulation data created by the demodulating unit 51 and judging the type of combination if the combination exists; a module number distortion evaluating unit 68 for evaluating distortion from a predetermined standard of the number of modules of a black bar or white bar when the bar-width data extracted by the scanning and extracting unit 50 demodulates every character; and a screening and synthesizing unit 70 for screening valid demodulated data, based on the distortion of the module number evaluated by the evaluating unit 68, and then synthesizing the screened data according to the type of combination.

The module number distortion evaluating unit 68 corresponds to the deviation evaluating means 13 described in FIG. 2. The evaluated distortion in the number of modules corresponds to the deviation.

As shown in FIG. 22(*a*), when a character is demodulated with the δ distances T1 and T2, a combination of the 6 distances T1 and T2 corresponds to two characters in the shaded portion in FIG. 22(*b*) (corresponding to that shown in FIG. 15(*b*)). In this case, as shown in FIG. 15(*a*), it is necessary that the number of modules B1 at the b portion and the number of modules B3 at the d portion each corresponding to the black bar width are calculated and then the character is discriminated by using the table shown in FIG. 15(*c*).

In the sixth embodiment, when calculating the number of modules of the b and d portions corresponding to the black bar width, the module number distortion evaluating unit 68 judges the degree of the distortion.

In the sixth embodiment, as shown in FIG. 22(*c*), like the second embodiment, [(N−0.5)×C1] to [N−0.3)×C1] and [(N+0.3)×C1] to [(N+0.5)×C1] are set as the range with large distortion in the permissible range of each module number (N).

Figure 68A:
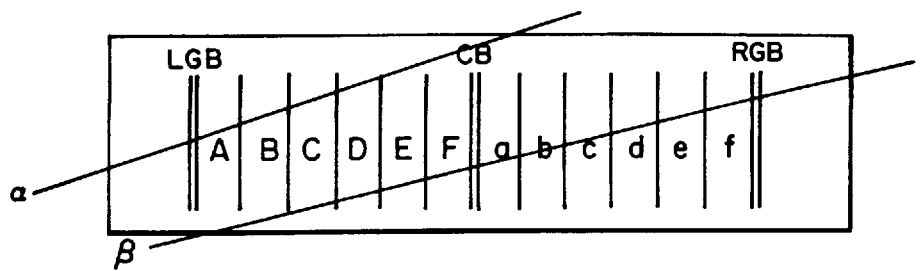
FIGS. 68(a) and 68(b) are diagrams each used for explaining a reading state and a failure state in a prior art bar-code reader.
Figure 68B:
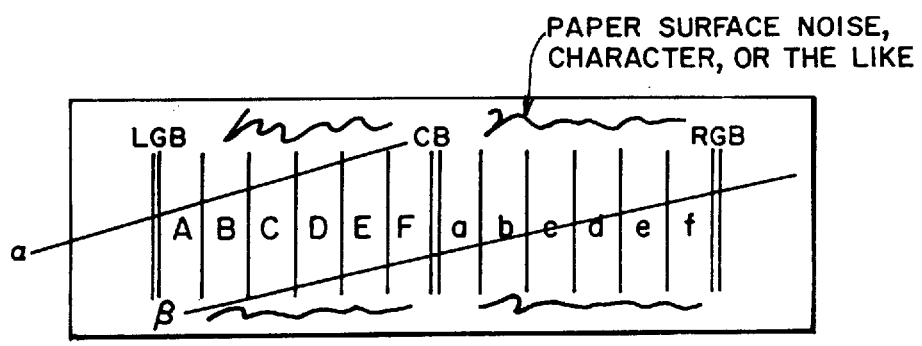

Moreover, for example, as shown in FIG. 68(*b*), where the module number distortion evaluating unit 68 evaluates that the character E' has a large distortion among the characters A, B, C, D, and E' demodulated based on the result scanned with the scanning line α, the screening and synthesizing unit 70 removes the demodulated character E' from valid data, selects only the characters A, B, C, and D as valid data in the case of the scanning line α, and then synthesizes them with the characters D, E, F, a, b, c, d, e, and f demodulated based on the scanned result with the scanning line β. As a result, the demodulated data A, B, C, D, E, F, a, b, c, d, e, and f are obtained.

Next, the seventh embodiment will be explained with reference to FIGS. 23, 24, and 19(*c*).

Figure 23:
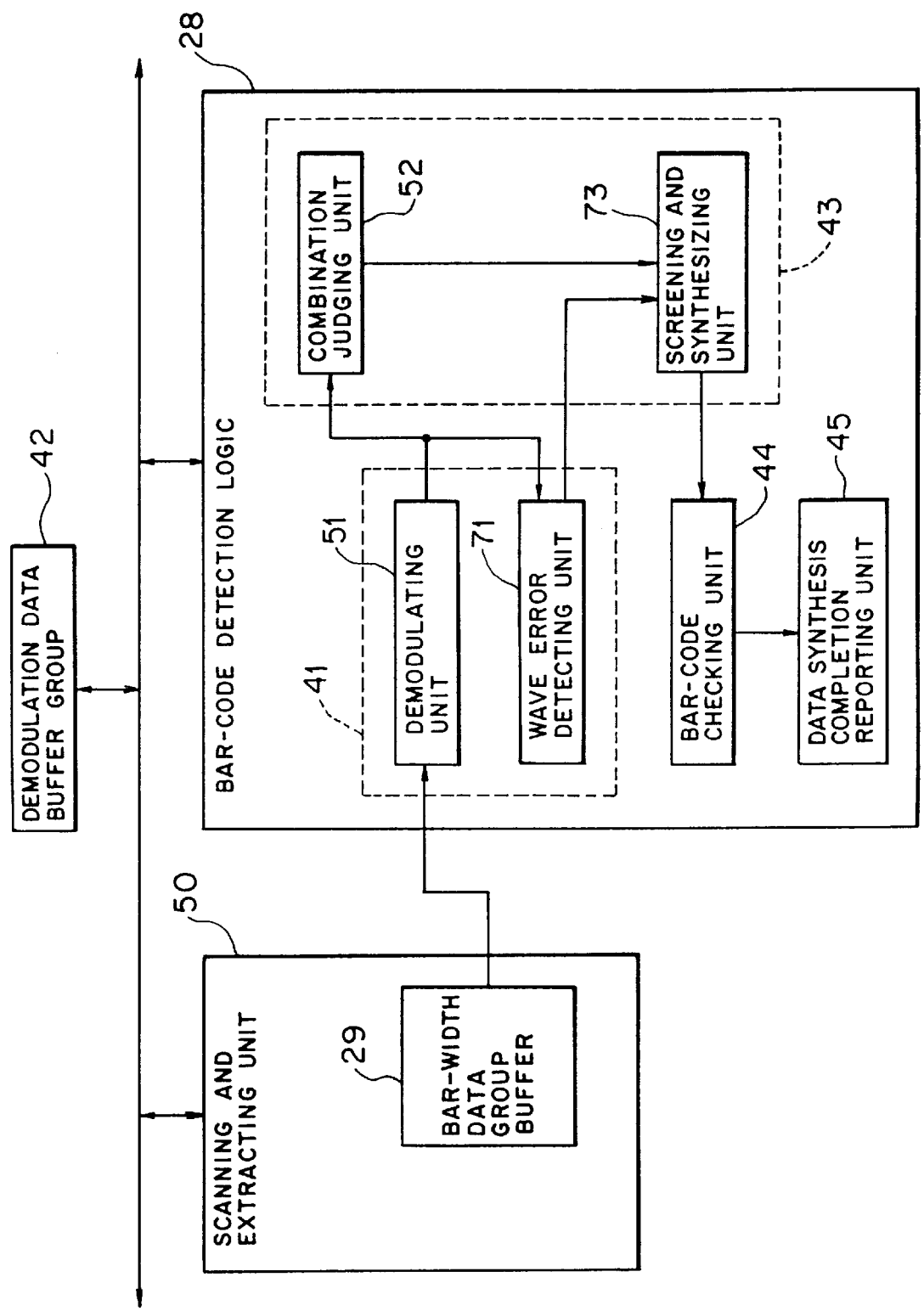
FIG. 23 is block diagram relating to the seventh embodiment.

According to the seventh embodiment, the bar-code reader, as shown in FIG. 23, includes a scanning and extracting unit 50 for scanning a bar-code with light beams (electromagnetic radioactive rays) and extracting the bar-width data from the reflected light; a demodulating unit 51 for demodulating the bar-width data extracted by the scanning and extracting unit 50 and creating demodulation data; a combination judging unit 52 for judging the presence or absence of bar-code reproducible combinations in the demodulation data created by the demodulating unit 51 and judging the type of combination if the combination exists; a wave error detecting unit 71 for detecting a wave error by monitoring whether a wave split occurs in the bar-width data extracted by the scanning and extracting unit 50; and a screening and synthesizing unit 73 for screening as valid data demodulated data occurring no wave error, based on the detection of the detecting unit 71, and then synthesizing the screened demodulated data according to the type of combination.

The wave error detecting unit 71 corresponds to the demodulation status evaluating means 17 described in FIG. 3. The presence or absence of the wave error occurrence detected by the wave error detecting unit 71 corresponds to a demodulation status.

The "wave error" means an error in which a white or black edge signal continuously occurs, or a black edge signal and a white edge signal do not occur alternately, due to poor label print (including void, spot, etc.), material of label (paper surface noise), PCS value, beam diameter (reading depth, label attitude, or the like), or the like, when bar-width data is extracted by detecting alternately the edge of a white bar or black bar in response to the rise or fall of an input waveform. Such a wave error is called "wave split", and when the wave error occurs, identification of which edge signal is correct among the same color edge signals continuously produced cannot be judged.

A wave error may occur in the bar-code margin portion because of the characteristic of the analog circuit. However, the wave error in the margin is ignored.

Figure 19C:
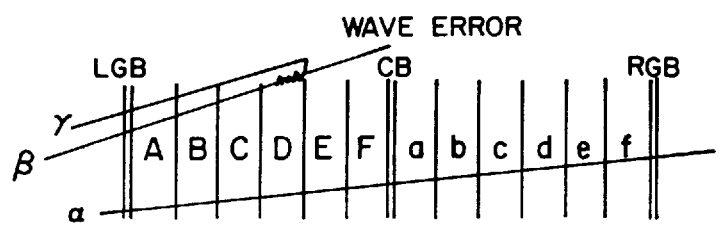

For example, as shown in FIG. 19(*c*), the characters demodulated by scanning with the scanning line α are represented as symbols B, C, D, E, F, a, b, c, d, e, and f. The characters demodulated by scanning with the scanning line β are presented as symbols A, B, C, and D (wave error occurrence). Furthermore, the characters A and B can be demodulated by scanning with the scanning line γ.

In this case, bar-code data can be synthesized by using the characters demodulated with the scanning lines α and β. However, after the character D has been completely demodulated along the scanning line β, a wave error occurs. Consequently, the reliability of data demodulated with the scanning line β is considered to be low.

In the seventh embodiment, when the wave error detecting unit 71 detects a character in which a wave error occurs, the screening and synthesizing unit 73 removes the character row of the demodulated data including the wave error occurring character, and screens as valid data the character row of demodulated data in which a wave error does not occur. Then the screening and the synthesizing unit 73 synthesizes bar-code data by using a plurality of pieces of data with no wave error or a plurality of pieces of data demodulated with the scanning lines α and γ, shown in FIG. 19(*c*).

FIG. 24 shows the signal occurrence state at a time of wave error occurrence. FIG. 24(*a*) shows the original wave form of the reflected light received while a bar-code is scanned with light. FIG. 24(*b*) shows the white edge signal WEG detected at the rise or fall of the original waveform and FIG. 24(*c*) shows the black edge signal BEG detected at the rise or fall of the original waveform. In the example shown in FIGS. 24(*b*) and 24(*c*), wave errors occur sequentially in the white edge signal WEG and the black edge signal BEG. The white bar edge or black bar edge are not alternately detected.

FIG. 24(*d*) shows the bar-width signals (reproduction bar-code signal) obtained by the edge signals shown in FIGS. 24(*b*) and 24(*c*). At the time of the wave error occurrence, it is unclear which waveform should be designated as correct. There is a strong possibility that a bar-width signal is erroneously read. In this case, since a white or black edge signal occurs continuously, the waveform split detection signal WER shown in FIG. 24(*e*) occurs synchronously with the fall of the successive white or black edge signal. The wave error detecting unit 71 monitors the waveform split detecting signal WER.

Next, the operation in the bar-code reader and the bar-code reading method relating to the first to seventh embodiments will be explained below.

Figure 25:
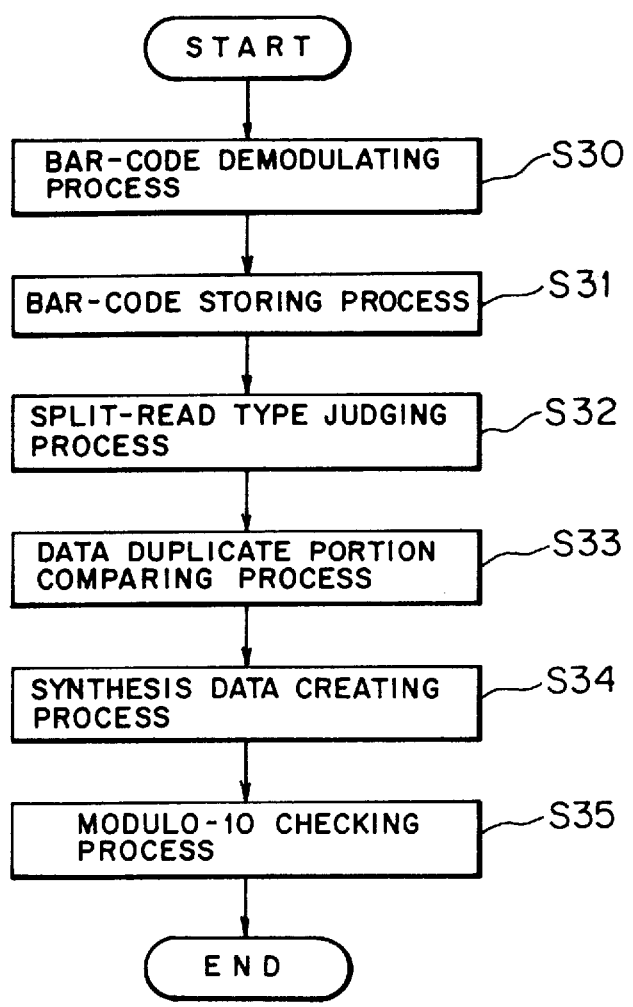
FIG. 25 is a flowchart used for explaining the entire process relating to the first to seventh embodiments.

FIG. 25 is a flowchart used for explaining the entire process relating to the first to seventh embodiments (steps S30 to S35).

As shown in FIG. 25, in step S30, the bar-code demodulating unit 41 formed of the demodulating unit 51, the adjacent character length distortion evaluating unit 53, and the δ distance distortion evaluating unit 56 detects the start-guard bar, the center bar, and the end-guard bar held in the bar-width data group buffer 29, and then executes a bar-code demodulating process.

In step S31, the combination judging unit 52 in the bar-code synthesizing unit 43 executes a storage process for separately storing every type of demodulation data, based on the demodulation data obtained through the bar-code demodulation process in step S30, and then sets character count (digit number) information to the pairing buffer, shown in FIG. 30(b).

The "pairing buffer" means a buffer that stores information needed to judge the presence or absence of the bar-code reproducible combination of the created demodulation data and the type of combination, or information corresponding to each digit number shown in FIG. 30(b).

In step S32, the combination judging unit 52 in the bar-code synthesizing unit 43 judges whether there is a digit number to the extent that the bar-code readable combination can be formed by data synthesis, based on the digit number information of the pairing buffer, and then judges the type or the type of split-reading. The "split-reading type" will be described later.

In step S33, the bar-code synthesizing unit 43 subjects to parity information and character code of a duplicate character to a comparing operation.

In step S34, when the comparison checking of the data duplicate portions proves that the data duplicate portions are the same, the bar-code synthesizing unit 43 creates demodulated data which enables the modulo-10 checking.

In step S35, the bar-code checking unit 44 performs the modulo-10 checking.

Sequentially, the operation of the bar-code detecting logic unit 28 relating to the first to seventh embodiments will be explained with reference to FIGS. 26, 27, 29 and FIGS. 32 to 35.

Figure 26:
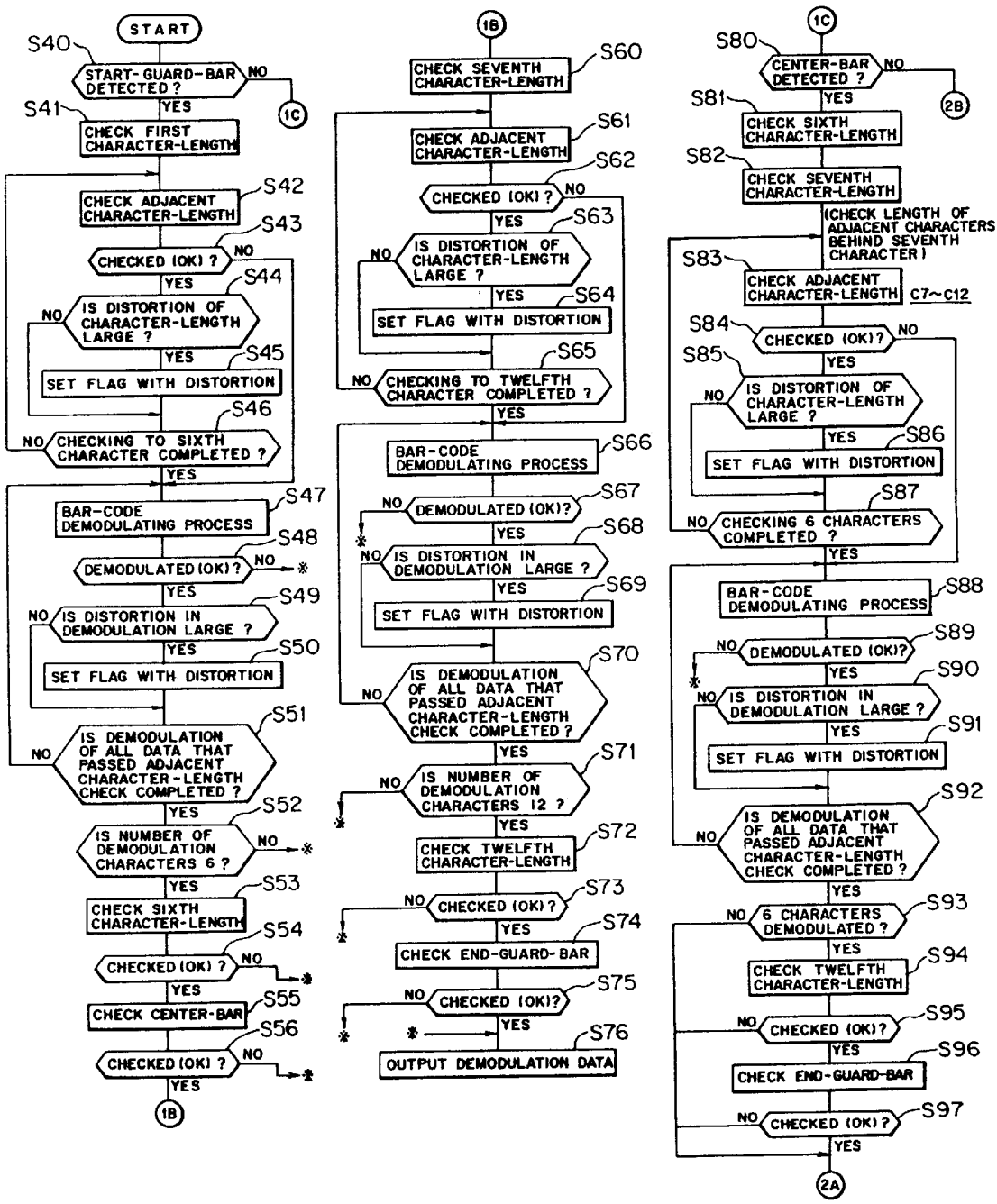
FIG. 26 is a flowchart used for explaining a bar-code demodulating process relating to the first, second, fourth and sixth embodiments.

FIG. 26 shows the bar-code demodulating process relating to the first, second, fourth, and sixth embodiments, or the process corresponding to step S30 shown in FIG. 25.

The scanning and extracting unit 50 scans a bar-code with light beams, and extracts the bar-width data from the reflected light. The bar-width data is held in the bar-width data group buffer 29.

In step S40, when a start-guard bar is detected by the demodulating unit 51 in the bar-code demodulating unit 41 arranged in the bar-code detection logic unit 28 shown in FIG. 9, the adjacent character-length distortion evaluating unit 53 relating to the first embodiment of the bar-code demodulation 41, as shown in FIG. 12(a), detects the first character-length C1 in step S41, and then detects the adjacent second character-length C2 in step S42. In step S43, the distortion evaluating unit 53 evaluates the distortion. In order to evaluate the distortion, it is checked whether the adjacent second character length C2 satisfies the following permissible range decision formula:

$$1.125 \times C1 > C2 > 0.875 \times C1$$

When the second character-length C2 satisfies the permissible range decision formula, the flow goes to the step S44. Then the distortion evaluating unit 53 judges whether the distortion of the character-length is large.

The distortion, as described above, is judged based on the formula of $1.125 \times C1 > C2 > 1.1 \times C1$ or $0.9 \times C1 > C2 > 0.875 \times C1$. If the distortion is within the above range, the distortion of character-length is judged to be large.

If the distortion is large, the flow goes to step S45. Then the distortion evaluating unit 53 sets the "with distortion" flag.

If it is judged that the distortion is mall, the "with distortion" flag is not set. In such a manner, the distortion judgment is performed to the sixth character (step S46). This means that the block of one end of the bar-code is judged.

When the sixth character has been completely checked, the flow goes to step S47. Then the bar-code demodulating process is performed.

Where it is judged that a character length C does not satisfy the permissible range decision formula in step S43, the process is completed without evaluating the distortion or performing the post character checking. Then the flow goes to step S47, and the bar-code demodulating process for the characters obtained until then, is performed.

Where it is judged that the demodulating process has been completed successfully in step S48, the flow goes to step S49 to judge whether the distortion is large during the demodulation.

That the demodulation process has been proceeded successfully in step S48 is judged by whether a meaningful code has been actually obtained. If the demodulation process has not been proceeded successfully, the flow goes to step S76. The data demodulated until then is output.

The "distortion in demodulation", as shown in the second embodiment, means the distortion in $\delta$ distance, or in the number of modules shown in the sixth embodiment, which is evaluated by the $\delta$ distance distortion evaluating unit 56 or the module number distortion evaluating unit 68.

When it is evaluated that distortion is large, the flow goes to step S50. Then the $\delta$ distance distortion evaluating unit 56, or the module number distortion evaluating unit 68, sets a "with distortion" flag.

When distortion is small, the flow goes to step S51 without setting the "with distortion" flag. The number of characters that are approved by the adjacent character checking in step S43 is recorded. Then it is judged whether a plurality of pieces of bar-width data corresponding to the count have been completely demodulated.

Where it is judged that the demodulation has not been completed in step S51, the flow goes back to step S47. When it is judged that the demodulation has been completed, the flow goes to step S52. Then it is judged whether the number of demodulated characters is 6.

If it is judged that the number of demodulated characters is not 6, the flow goes to the step S76 and then the demodulated data is output.

If the number of demodulated characters is 6, the sixth character-length is checked in step S53. Where the checking of the sixth character-length is approved in step S54, the flow goes to step S55 and then the center bar is checked. Where there is a defect in the sixth character-length checking of the demodulated data (NO decision in step S53), the flow goes to step S76. Then the demodulated data is output.

Where the center bar checking in step S55 finds a defect therein (NO decision in step S56), the flow goes to step S76. Then the demodulated data is output.

Where the checking is approved in step S56, the flow goes to step S60 via a connector 1B. The seventh character length (character of another block) is checked. In step S61, the adjacent character length between the seventh character length and the eighth character length is checked.

Steps S61 to S73 correspond to the process ranging from the first to sixth characters, or steps S41 to S54. The first to sixth characters of the right block correspond to the seventh to twelfth characters of the left block. Finally, the checking process in steps S74 and S75 to the end guard bar corresponds to that in steps S55 and S56 to the center bar. Even if the check result is "good" or "no good", the demodulated data is output in step S76.

When the demodulation unit 51 of the bar-code demodulating unit 41 arranged in the bar-code detecting logic unit 28 shown in FIG. 9 does not detect the start-guard bar in step S40, or the LGB or RGB at the end of the bar-code shown, for example, in FIG. 19(a) is not detected, the flow goes to step S80 via the connector 1C. It is judged whether the center bar has been detected by the demodulating unit 51.

When the center bar is detected, the flow goes to step S81. After the sixth character length is checked, the seventh character length is checked in step S82. In this case, for example, FIG. 19(a) shows the case where a bar-code is canned from the right block to the left block.

The following steps S83 to S95 correspond to steps S41 to S54 and S61 to S73, and the seventh character to twelfth character are processed.

Where the checking regarding the twelfth character length results in "good" in step S95, the flow goes to step S96. Then the end-guard bar is checked. Even if the checking in the step S97 is "good" or "no good", the flow goes to step S100 (shown in FIG. 27) via the connector 2A.

Figure 27:
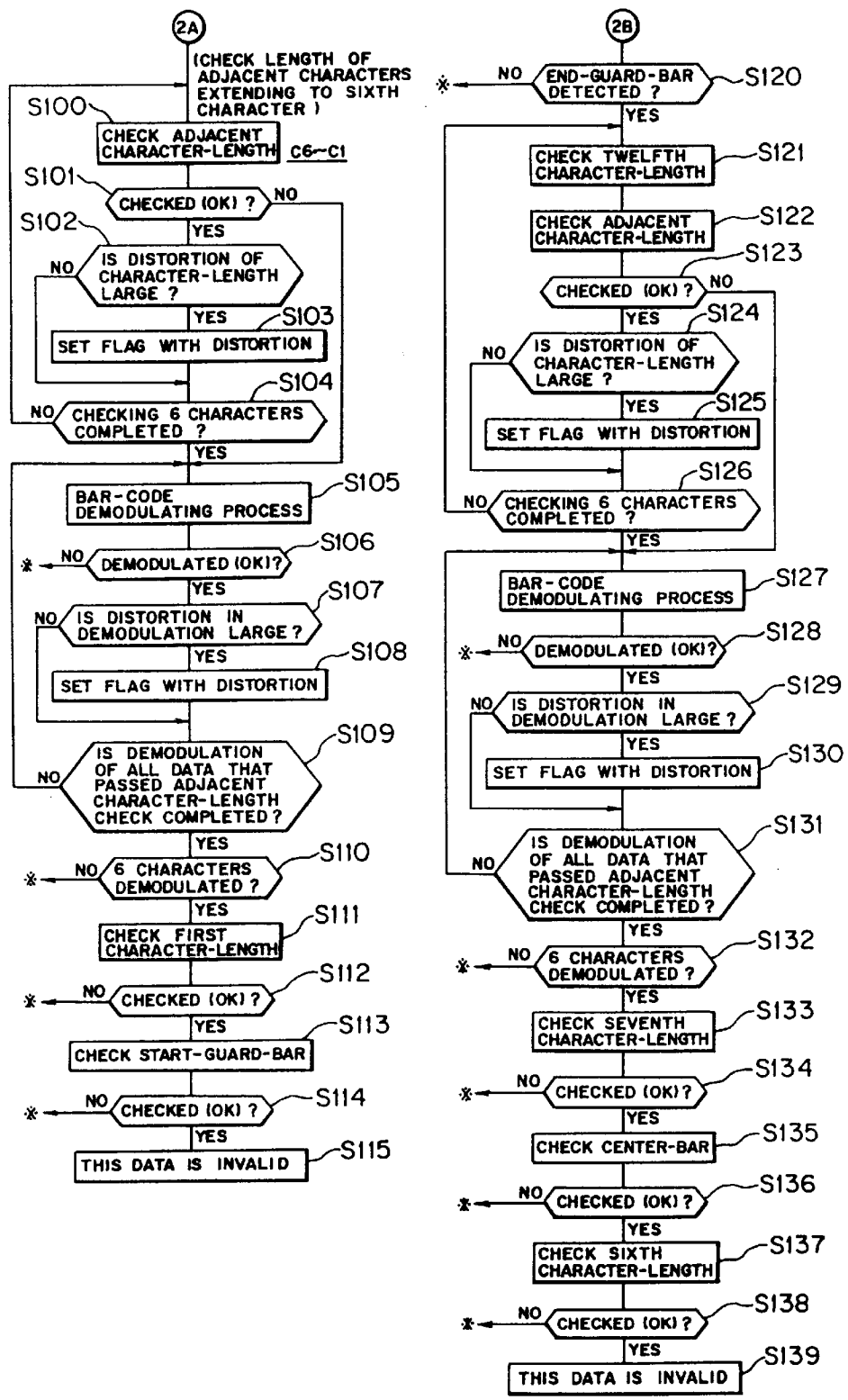
FIG. 27 is a flowchart used for explaining a bar-code demodulating process relating to the first, second, fourth and sixth embodiments.

On the other hand, if the checking in steps S93 and S95 results in "no good", the flow goes to step S100 via the connector 2A, as shown in FIG. 27.

As shown in FIG. 27, the adjacent character length distortion evaluating unit 53 checks the adjacent character length for the sixth character length in step S100. Steps S100 to S112, similar to steps S42 to S54 described above, correspond to the process for the first to sixth characters.

Where checking the first character length results in "good" in step S112, the flow goes to step S113. However, where the checking proves "no good", the flow goes to step S76. The modulated data for the second to sixth characters are output.

In steps S113 and S114, the demodulating unit 51 checks the start-guard bar. When the checking proves "no good", the flow goes to step S76 in FIG. 26. The modulated data are output.

Where checking the start-guard bar in step S114 proves "good", the flow goes to step S115. Then the demodulated data is invalidated. The reason is that it is inconsistent to check the start-guard bar as "good" in step S114 although the start-guard bar is not first detected in step S40 so that it is considered that data includes a defect.

Where it is judged that demodulated process is "no good" in the demodulating process in step S106, or 6 characters are not demodulated in step S110, the demodulated data demodulated till then it output in step S76 shown in FIG. 26.

Where it is judged that the demodulating unit 51 does not detect the center bar in step S80 shown in FIG. 26, the flow goes to step S120 via the connector 2B, as shown in FIG. 27.

It is judged in step S120 whether the end-guard bar has been detected.

If the end-guard bar is detected, the flow goes to step S121. Then the twelfth character length is checked. If the end-guard bar is not detected, the data demodulated till then is output in step S76 shown in FIG. 26.

Steps S121 to S134, similar to steps S41 to S54, correspond to the process for the seventh to twelfth characters.

Where it is judged that 6 characters are not demodulated in step S132, the flow goes to step S76 shown in FIG. 26. Then the demodulated data is output.

Where the checking result is "good" in step S134, the flow goes to step S135. Then the center bar is checked.

As a result of the checking in step S135, when it is judged that the checking result is "no good" in step S136, the flow goes to step S76 shown in FIG. 26. Then demodulated data till then is output.

When it is judged that the checking in step S136 is "good", the flow goes to step S137 and then the sixth character length is checked. When it is judged in step S138 that the checking operation in step S137 is "no good", the flow goes to step S76 in FIG. 26. Then the demodulated data obtained till then is output.

On the other hand, where it is judged in step S138 that the checking is "good", the flow goes to step S139. Then the demodulated data obtained till then is invalidated.

The reason is that it is inconsistent that the center bar and the sixth character exist together with the seventh to twelfth characters although the center bar is not detected in step S80 in FIG. 26. Hence it is considered that there is some defect in the data.

Figure 28C:
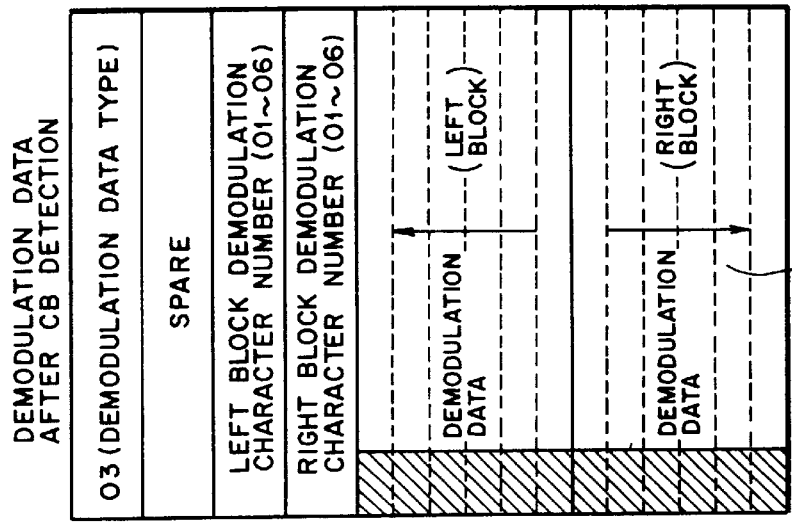
FIG. 28(*a*) to 28(*c*) are diagrams each showing the buffer structure relating to a demodulated data demodulating process relating to the first to seventh embodiments.
Figure 28B:
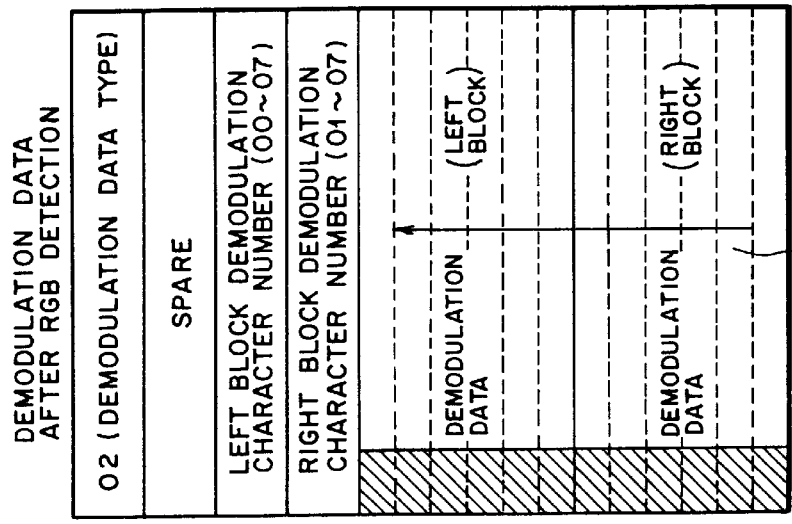
Figure 28A:
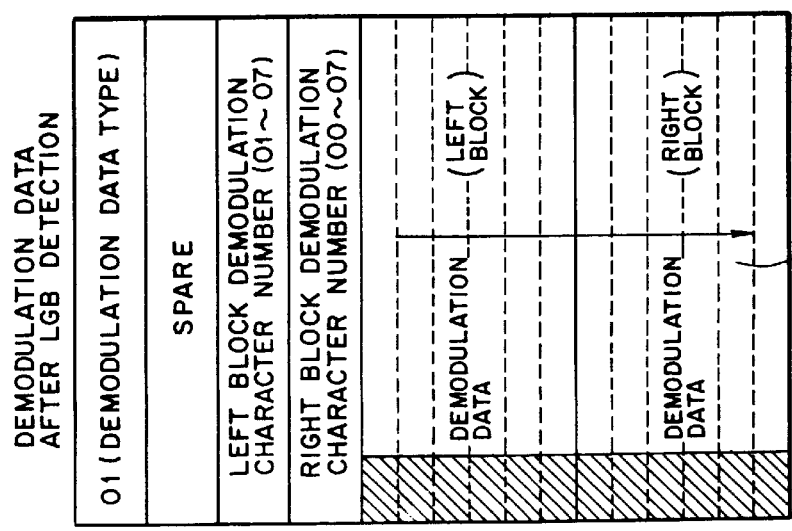

FIGS. 28(a) to 28(c) show the content of the demodulation process buffer in the demodulated data buffer group 42 holding demodulated data obtained as a result of the above-mentioned demodulation process.

The arrow marked in the region storing demodulation data shows the scanning direction.

Demodulated data are stored sequentially in the direction of the arrow, with the content shown in FIGS. 28(a) to 28(c). The demodulated data shown in FIG. 28(a) is demodulated data after detecting the left guard bar (LGB), and includes identification data "01" for identifying data obtained after an LGB detection; the number of the left block demodulation characters; the number of the right block demodulation characters; the demodulated data of the left block; and the demodulated data of the right block. As shown in FIG. 28(b), the demodulated data is demodulated data after detecting the right guard bar (RGB), and includes identification data "02" for identifying data obtained after an RGB detection; the number of the left block demodulation characters; the number of the right block demodulation characters; the demodulated data of the left block; and the demodulated data of the right block. The demodulated data, shown in FIG. 28(c), is demodulated data after detecting the center bar (CB), and includes identification data "03" for identifying data obtained after an CB detection; the number of the left block demodulation characters; the number of the right block demodulation characters; the demodulated data of the left block; and the demodulated data of the right block.

The number of demodulated characters of each of the left and the right blocks indicates the character number at its maximum of six held in each block in the bar-code in the present embodiment and the center-bar or guard-bar. Where the center bar and the guard bar are arranged, the number of the characters is set to "7".

Each of the characters of demodulated data is expressed by 7 bits. Parity structure information (O/E) is stored as the seventh bit. The "with distortion" flag representing adjacent character length, δ distance, and the degree of distortion of each bar is set to the sixth bit (a flat 1 in large distortion and a flag 0 in small distortion). When demodulation cannot be made due to wave error, a flat is set to the fifth bit. A character represented by the first to fourth bits.

At the end of demodulation data, the data such as "#EEH" is set to represent ending. The demodulation character number "7" is set when the center bar and the guard bar are detected. Where demodulation data is not stored in the regions 80, 81, and 82 (16 bytes) (shown in FIGS .28(a) to 28(c)) storing demodulation data in the buffer, data representing, for example, no storage as "#0EEH" is set.

When demodulated data is obtained, the combination judging unit 52 in the bar-code synthesizing unit 43 stores demodulation data into the storage data buffer arranged in the demodulation data buffer group 42 shown in FIGS. 28(a) to 28(c).

FIGS. 29(a) to 29(e) show the contents of the storage buffer stored by the storing process.

In the demodulated data buffer configuration shown in FIGS. 28(a) to 28(c), demodulated data is stored disorderly in the detecting order, in spite of the type of demodulation data. Contrary to the demodulated data buffer configuration in FIGS. 28(a) to 28(c), in the example shown in FIGS. 29(a) to 29(e), a plurality of pieces of demodulated data are respectively stored into the left block buffer (LGBFXX) shown in FIG. 29(b), the right block buffer (RGBFXX) shown in FIG. 29(c), and the CB detection buffer (CBBFXX) shown in FIG. 29(d), every type of demodulation data.

FIG. 29(a) shows the structure of a continuous bar-code subjected in the present embodiment. FIG. 29(e) shows the format of information on the demodulation result of each character, stored in each buffer.

Furthermore, the combination judging unit 52 sets digit number information (character numbers A to F) of the demodulated data corresponding to FIG. 30(b) to the pairing buffer shown in FIG. 30(a). The combination judging unit 52 judges the split read type, based on the content of the pairing buffer, and judges the type of combination according to the presence or absence of a readable combination or the presence of the combination.

The "flag character" shown in FIG. 30(a) is a flag code allocated to a bar-code included in the EAN system such as JAN, by the EAN committee, and regulates the module structure of a data character.

Figure 31A:
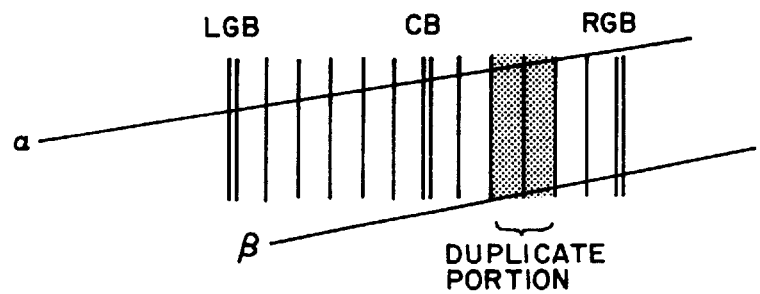
FIG. 31(*a*) to 31(*c*) are diagrams each showing split reading types relating to the first to seventh embodiments.
Figure 31B:
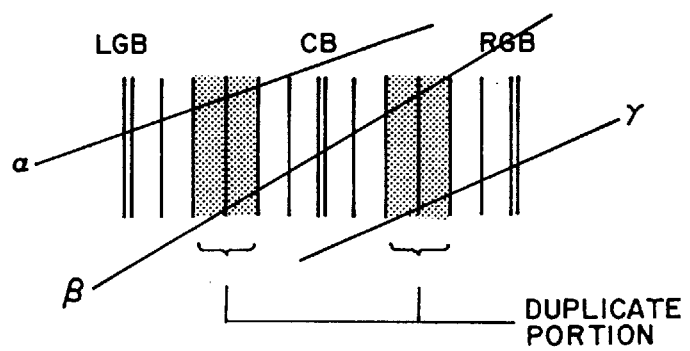
Figure 31C:
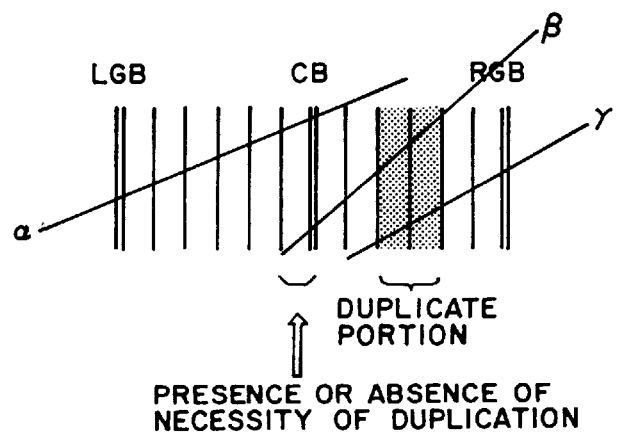

The "split-reading type" means a combination pattern obtained according to, for example, the pattern of the scanning line shown in FIGS. 31(a) to 31(c).

In the example shown in FIG. 31(a), the split-read type corresponds to "2-split reading". In the 2-split reading, data synthesis is performed by combining data demodulated along the scanning line α which passes from the guard bar (GB) to the center bar (CB) and then deflects from the bar-code beyond several characters with data demodulated along the scanning line β which passes the guard bar (RGB in the figure) and then deflects from the bar-code beyond the several characters.

In the example shown in FIG. 31(b), the split-read type corresponds to "3-1-split reading". In the 3-1 split reading, data is synthesized by combining a plurality of pieces of data demodulated along three scanning lines α, β, and γ which cross the left guard bar (LGB), the center bar (CB), and the right guard bar (RGB) and then deflect from the barcode beyond several characters.

In the example shown in FIG. 31(c), the split-reading type corresponds to "3-2-split reading". In the 3-2 split reading, data is synthesized by combining one complete block data (the left block in the figure) obtained with the scanning line α, with two pieces of data modulated along the scanning lines β and γ which pass the guard bar and the center bar of the other block (the right block in the figure) and then deflect from the bar-code beyond several characters.

The shaded portions shown in FIGS. 31(a) to 31(c) are the character duplicate portions. In order to synthesize data, it is necessary that the data (characters) of the duplicate portions are the same.

Figure 32:
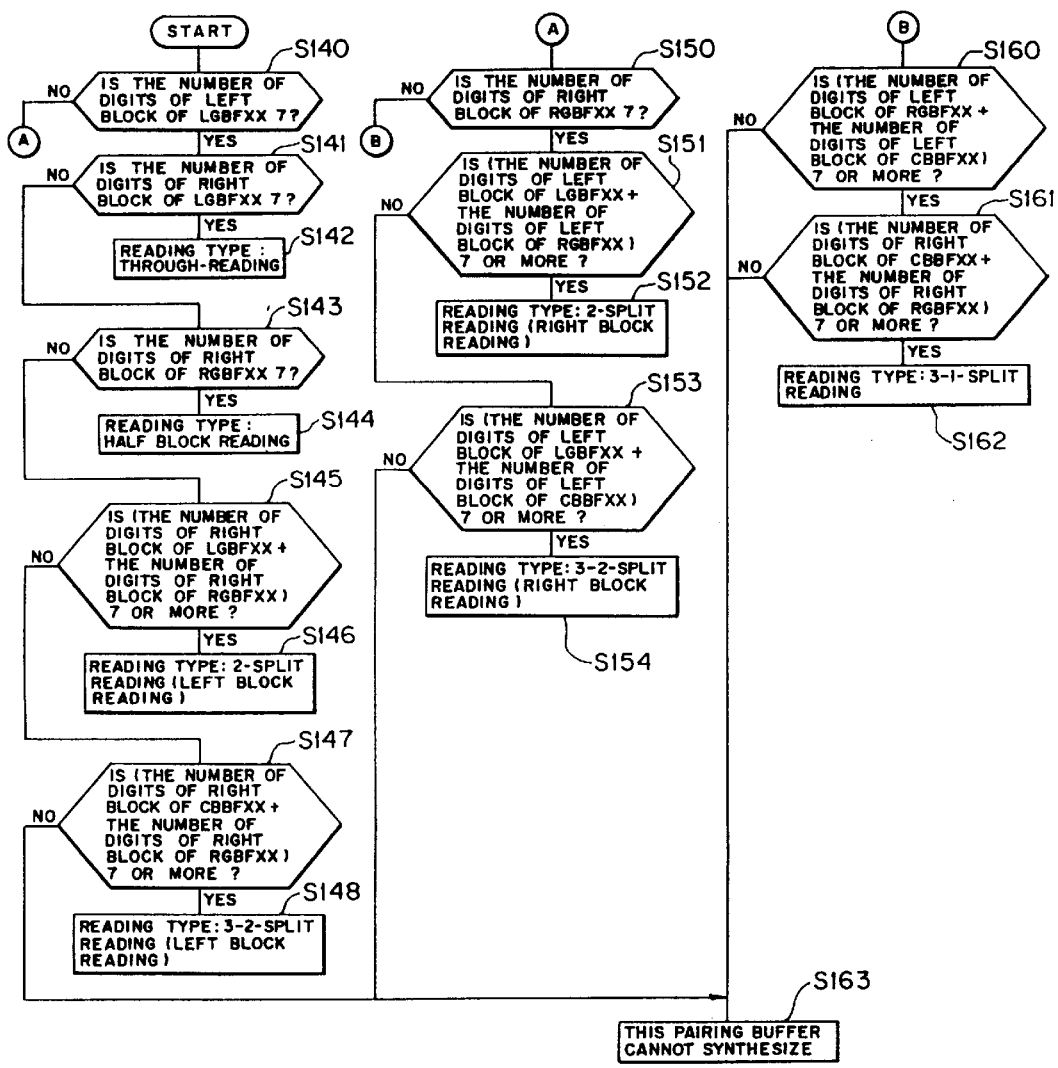
FIG. 32 is a flowchart used for explaining a split reading type judging process related to the first to seventh embodiments.

The operation in the split-read type judging process performed by the combination judging unit 52 in the bar-code synthesizing unit 43 will be described below with reference to FIG. 32.

In step S140, the judging unit 52 judges whether the number of digits (the number of characters) of the left block in the left block buffer (LGBFXX) (the scanning line first detecting the left guard bar) shown in FIG. 29(b) is "7".

The number of digits of "7" is one which is set when the center bar and the guard bar are detected.

Hence, the number of digits of the left block in the left block buffer being "7" means that the left block of the left block buffer is perfect.

With the number of digits of "7", the flow goes to step S141. Then it is judged whether the number of digits of the right block of the left block buffer is "7". The number of digits of "7" means that the right block of the left block buffer is perfect. Then the flow goes to step S142. It is judged that the reading type belongs to through-reading (the left and right blocks are perfect).

Where the number of digits of the right block of the left block buffer in step S141 is not "7", the flow goes to step S143. It is judged whether the number of digits of the right block of the right block buffer (RGBFXX) is "7".

Where it is judged that the number of digits is "7", the left and right blocks after detecting the left guard bar are imperfect and the right block after detecting the left guard bar are imperfect and the right block after detecting the right guard bar is perfect. Then the flow goes to step S144. It is judged that the reading type belongs to the half-block reading.

Where it is judged that the number of digits of the right block of the right block buffer is not "7" in step S143, the flow goes to step S145. Then it is judged whether the sum of the number of digits of the right block of the left block buffer and the number of digits of the right block of the right block buffer exceeds "7".

With the sum of the digit number being "7" or more, the flow goes to step S146. Then it is judged that the reading type belongs to the 2-split reading (left block is perfect; the left block through-reading).

When it is judged that the sum of the number of digits of the right block of the left block buffer and the number of digits of the right block of the right block buffer is not "7" or more (in the case of less than "7"), the flow goes to step S147. It is judged whether the sum of the number of digits of the right block and the number of digits of the left block in the CB detection buffer (CBBFXX) shown in FIG. 29(d) is "7" or more.

When it is judged that the sum of the digits is "7" or more, the flow goes to step S148. It is judged that the reading type belongs to the 3-2 split reading shown in FIG. 31(c) and the left block is perfect (the left block through-reading). It is judged that the combination of the demodulated data can be synthesized.

When it is judged that the sum of digits is not "7" or more (less than "7") in step S147, the flow goes to step S163. Then it is judged that data stored in the pairing buffer, or in the left block buffer, the right block buffer, and the BC detection buffer, cannot be synthesized.

In other words, the combination of a plurality of pieces of data stored in the buffer groups is not the demodulation data to be synthesized. It is judged that the bar-code cannot be read by the combination of the demodulated data stored in the buffer groups.

On the other hand, when it is judged that the number of digits of the right block of the left block buffer is not "7" in step S140, the flow goes to step S150 via the connector A.

In step S150, it is judged whether the number of digits of the right block of the right block buffer is "7".

When it is judged that the number of the digits is "7", the flow goes to step S151. It is judged whether the sum of the number of digits of the left block of the left block buffer and the number of digits of left block of the right block buffer is "7" or more.

With the sum of the digits being "7" or more, the flow goes to step S152. Then it is judged that the reading type belongs to the 2-split reading in which the right block is perfect and that the combination of the demodulated data can be synthesized.

When it is judged that the sum of the digits is not "7" or more (less than "7") in step S151, the flow goes to step S153. It is judged whether the sum of the number of digit of the left block of the left block buffer and the number of digits of the left block of the CB detection buffer is "7" ore more.

When it is judged that the sum of the digits is "7" or more, the flow goes to step S154. It is judged that the reading type belongs to the 3-2 split reading in which the right block is perfect. Then it is judged that the combination of the demodulation data can be synthesized.

When it is judged that the sum of the digits is not "7" or more (less than "7") in step S153, the flow goes to step S163. It is judged that the bar-code reading cannot be performed by the combination of a plurality of pieces of demodulated data stored in the buffer group.

On the other hand, when it is judged that the number of digits of the right block of the right block buffer is not "7" in step S150, the flow goes to step S160 via the connector B. Then it is judged whether the sum of the number of digits of the left block of the right block buffer and the number of digits of the left block of the CB detection buffer is "7" or more.

When it is judged that the sum of the digits is "7" or more, the flow goes to step S161. Then it is judged whether the sum of the number of digits of the right block of the CB detection buffer and the number of digits of the right block of the right block buffer is "7" or more.

When it is judged that the sum of the digits is "7" or more, the flow goes to step S162. Then the reading type is judged as the 3-1 split shown in FIG. 31(b). it is judged that the combination of the demodulation data can be synthesized.

When it is judged that the sum of the digits is less than "7" in step S160 or S161, the flow goes to step S163. It is judged that the synthesizing operation or bar-code reading cannot be performed with the combination of the plural pieces of demodulated data stored in the buffer group.

As described above, with the reading type being 2 split, when the number of digits of the A or F portion shown in FIG. 30(b) being "7", the sum of the number of digits of the B portion and the number of digits of the F portion being "7" or more, and the sum of the number of digits of the A portion and the number of digits of the E portion being "7" or more, there is the duplicate portion corresponding to at least one character between two pieces of demodulation data. Thus the pairing process is performed because of the combinable condition.

With the reading type being split 3-1, when the number of digits of the A or F portion shown in FIG. 30(b) not being "7", the same of the number of digits of the A portion and the number of digits of the C portion being "7" or more, and the sum of the number of digits of the D portion and the number of digits of the F portion being "7" or more, there is the duplicate portion corresponding to at least one character between three pieces of demodulation data. Thus the pairing process is performed because of the combinable condition.

Furthermore, with the reading type being split 3-2, when the number of digits of the A or F portion shown in FIG. 30(b) being "7", the sum of the number of digits of the B portion and the number of digits of the F portion being less than "7", the sum of the number of digits of the A portion and the number of digits of the E portion being less than "7", the sum of the number of digits of the A portion and the number of digits of the F portion being "7" or more, and the sum of the number of digits of the D portion and the number of digits of the C portion being "7" or more, there is the duplicate portion corresponding to at least one character between three pieces of demodulation data. Thus the pairing process is performed because of the combinable condition.

The operation of the screening and synthesizing unit (55, 58, 61, 64, 67, 70, and 73) in the bar-code synthesizing unit 43 and the bar-code checking unit 44 relating to the first to seventh embodiments will be explained with reference to FIG. 33.

Figure 33:
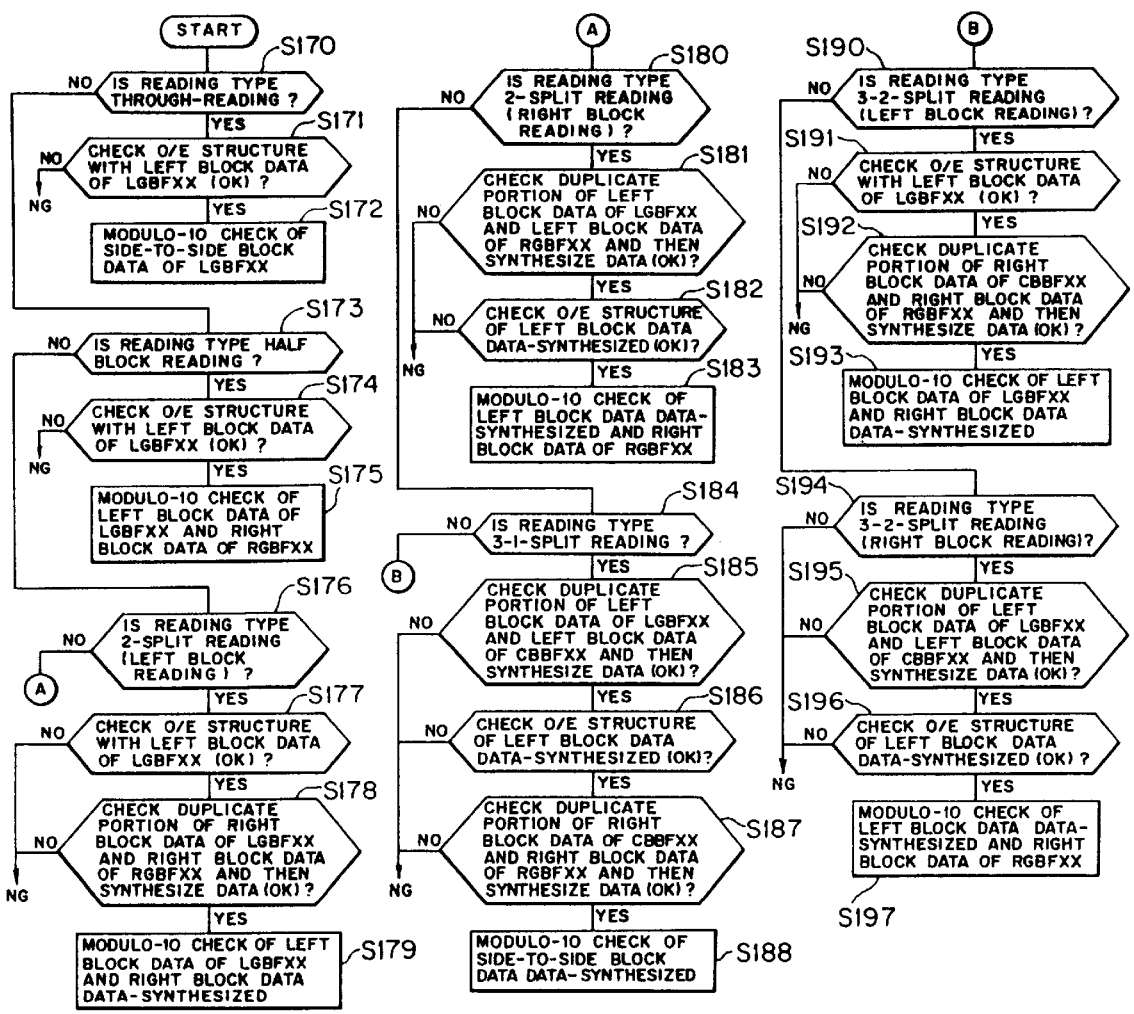
FIG. 33 is a flowchart used for explaining synthesis data creating process and modulo-10 checking process relating to the first to seventh embodiments.

As shown in FIG. 33, in step S170, the bar-code synthesizing unit 43 judges whether the split reading type is a perfect reading (through reading) in the demodulated data combining process. Where the reading type is a perfect reading, the flow goes to step S171. The parity (O/E) structure checking is performed using the left block data of the left block buffer. Where the parity structure checking proves "good" (YES decision), the flow goes to step S172. Then the modulo-10 checking is executed to the side-to-side block data of the left block buffer.

Where the parity structure checking is "no good" (NG decision), it is judged that the demodulated data includes a defect. Hence the data is not subjected to the synthesizing process.

In step S170, the bar-code synthesizing unit 43 judges that the split reading type of the combination of the demodulated data is not perfect reading, the flow goes to step S173. It is judged whether the split reading type relates to a half-block reading.

If it is judged that the split reading type relates to a half-block reading, the flow goes to step S174. The O/E structure checking is performed using the left block data of the left block buffer. When the O/E structure checking proves "good", the flow goes to step S175. The left block of the left block buffer and the right block of the right block buffer are subjected to the modulo-10 checking.

The O/E structure checking proves "no good", it is judged that the demodulated data is defective. Hence the data is not subjected to a synthesizing process.

When it is judged that the split reading type of the combination of demodulated data is not a half-block reading in step S173, the flow goes to step S176. It is judged whether the split reading type is 2-split reading (perfect left block, left block through-reading), or the left block has been completely read.

When is judged in step S176 that there is a 2-split (perfect left block, the flow goes to step S177. The O/E structure is checked using the right block buffer and the left block data.

When the O/E structure checking proves "good", the flow goes to step S178. The screening and synthesizing unit checks the duplicate portion of the right block data of the left block buffer and the right block data of the right block buffer, thus performing the synthesizing process of the right block data and the left block data.

When the data synthesis is performed in step S178, the flow goes to step S179. The bar-code checking unit 44 subjects the left block data of the left block buffer and the data-synthesized right block data to the modulo-10 checking. Where the checking in steps S177 and S178 proves "no good", it is judged that the demodulated data includes a defect. The data are not used for the synthesizing process.

When it is judged in step S176 that the split reading type is not 2-split reading (left block in perfection), the flow goes to step S180 via the connector A.

In step S180, it is judged whether the split reading type is the 2-split reading (right block in perfection, right block through-reading).

When it is judged that the split-reading type is the 2-split reading (right block in perfection), the flow goes to step S181. The duplicate portion of the left block data of the left block buffer and the right block data of the right block buffer is checked and then subjected to a data-synthesis of the left block data and the right block data.

When data is synthesized in step S181, the flow goes to step S182. The data-synthesized left block data is subjected to the O/E structure checking.

If the O/E structure checking proves "good", the flow goes to step S183. Then the data-synthesized left block data and the right block data of the right block buffer are subjected to the modulo-10 checking.

On the other hand, if the checking in steps S181 and S182 proves "no good", it is judged that the demodulated data includes defect so that the data is not subjected to the synthesizing process.

When the split reading type is not the 2-split reading (right block in perfection) in step S180, the flow goes to step S184.

In step S184, it is judged whether the split reading type is the 3-1 split reading. Where it is judged that the split reading type is the 3-1 split reading, the flow goes to step S185. The left block data of the right block buffer and the left block data of the CB detection buffer are checked on the duplicate portion, and then data-synthesized.

When the data is synthesized in step S185, the flow goes to step S186. Then the data-synthesized left block is subjected to the O/E structure checking.

When the O/E structure checking proves "good", the flow goes to step S187. The right block data of the CB detection buffer and the right block data of the left block buffer are checked on the duplicate portion, and then data-synthesized.

When data is synthesized in step S187, the flow goes to step S188. The data-synthesized side-to-side data is subjected to the modulo-10 checking.

When the checking in steps S185, S186, and S187 proves "no good", it is judged that the demodulated data includes a defect. Hence the data are not synthesized.

In step S184, when it is judged that the split reading type is not the 3-2 split reading, the flow goes to step S190 via the connector B.

In step S190, it is judged whether the split reading type is the 3-2 split reading (left block in perfection, left block through-reading).

When it is judged that the split reading type is the 3-2 split reading (left block in perfection), the flow goes to step S191. The O/E structure is checked using the left block data of the left block buffer.

When the O/E structure checking proves "good", the flow goes to step S192. The right block data of the CB detection buffer and the right block data of the right block buffer are checked on the duplicate portion and then data-synthesized.

When data is synthesized in step S192, the flow goes to step S193. The left block data of the right block buffer and the synthesized right block data are subjected to the modulo-10 checking.

When checking proves "no good" in steps S191 and S192, it is judged that the demodulated data includes a defect. Hence the data is not synthesized.

When it is judged in step S190 that the split reading type is not the 3-2 split reading (left block in perfection), the flow goes to step S194. In step S194, it is judged whether the split reading type is the 3-2 split reading (right block in perfection, right block through-reading).

If the split reading type is the 3-2 split reading (right block in perfection), the flow goes to step S195. The left block data of the right block buffer and the left block data of the CB detection buffer are subjected to the duplicate portion checking and the data-synthesizing.

When data synthesis is performed in step S195, the flow goes to step S196. Then the data-synthesized left block is subjected to the O/E structure checking.

When the O/E structure checking proves "good", the flow goes to step S197. The data-synthesized left block data and the right block data of the right block buffer are subjected to the modulo-10 checking.

When the checking proves "no good" in steps S181 and S182, it is judged that the demodulated data includes a defect. Thus the data is not synthesized.

With the NO decision in step S194 and "no good" in checking in steps S195 and S196, it is judged that the demodulated data includes a defect. Then the data is not synthesized.

Next, the operation of the synthesizing process relating to the first to seventh embodiments will be described with reference to FIGS. 34 and 35.

Figure 34:
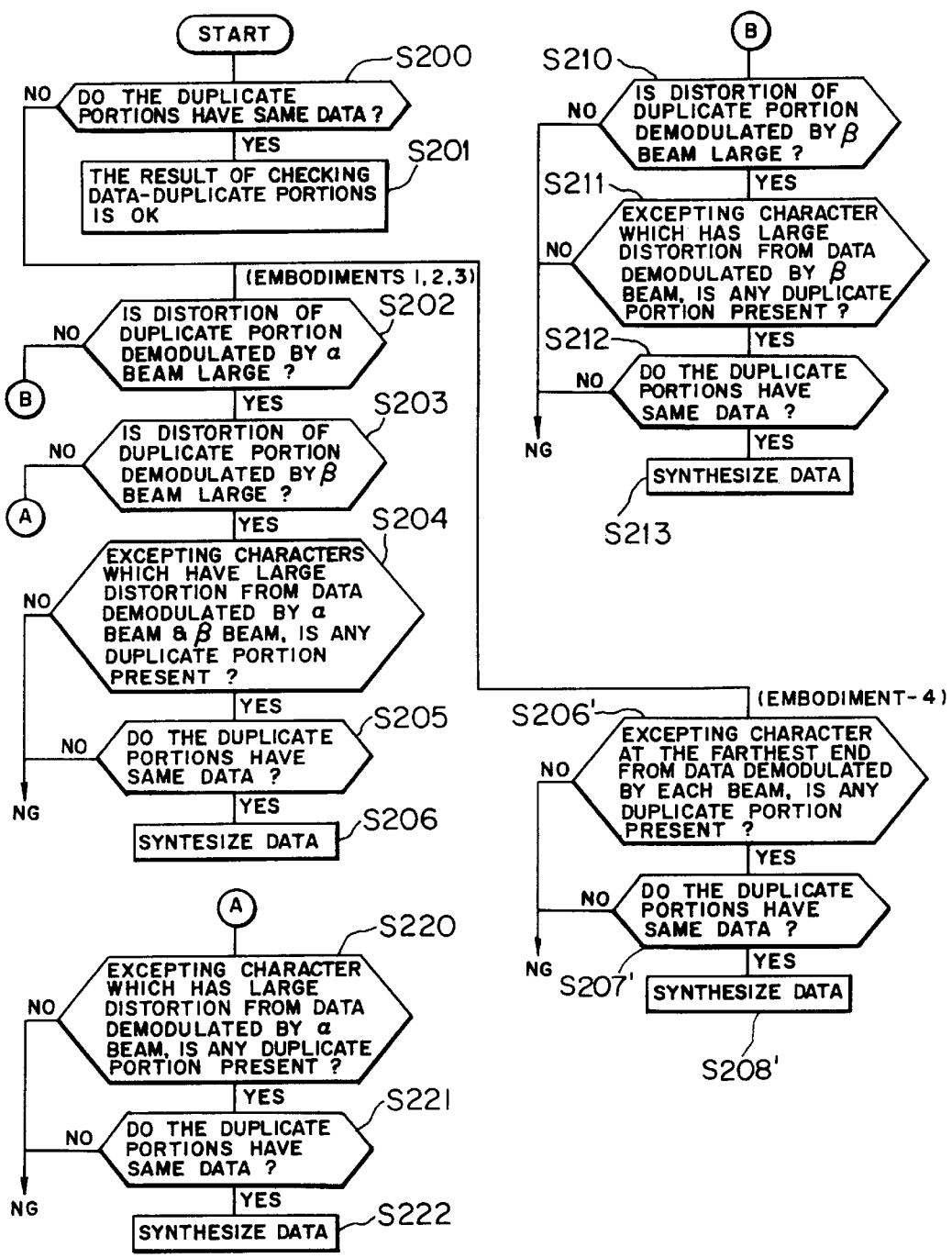
FIG. 34 is a flowchart used for explaining the comparison process of the data duplicate portion relating to the first, second, fourth, and sixth embodiments.

FIG. 34 shows flowcharts relating to the first, second, fourth, and sixth embodiments, respectively.

The flowchart in FIG. 34 is applicable to 2 split, 3-1 split, and 3-2 split reading types. For the brief explanation, explanation will be made below as to the character demodulated based on the result obtained by scanning with two beams (scanning lines $\alpha$ and $\beta$; e.g. refer to FIG. 19(a)).

As shown in FIG. 34, the screening and synthesizing unit judges whether the duplicate portion character is formed of the same data in step S200.

If yes, the flow goes to step S201. Then it is judged that the checking result of the data duplicate portion is "good" (OK).

When it is judged in step S200 that the character of the duplicate portion is not the same, the flow goes to the step S202. Then the process corresponding to each of the first, second, and sixth embodiments is performed. In other words, in the screening and synthesizing units 55, 58, and 70, whether the duplicate unit character demodulated with the scanning line $\alpha$ ($\alpha$ beam) has a large distortion is judged based on the presence or absence of the "with distortion" flag added to the character arranged in a duplicate portion among the demodulation data stored in the demodulated data buffer shown in FIG. 28.

When it is judged that distortion is large in step S202, the flow goes to step S203. Then it is judged whether the character in the duplicate portion demodulated with the scanning line $\beta$ ($\beta$ beam) has a large distortion.

When it is judged that there is a large distortion in step S203, the flow goes to step S204. The screening and synthesizing unit judges whether there is a duplicate portion where characters with large distortion are removed from the demodulation data with two scanning lines $\alpha$ and $\beta$.

When it is judged that there is a duplicate portion in step S204, the flow goes to step S205. Then it is judged whether the character at the duplicate portion has the same data (character and position).

When it is judged that there is the same data in step S205, the flow goes to step S206. The screening and synthesizing unit executes the data synthesizing process.

When it is judged in step S203 that the character of the duplicate portion demodulated with the scanning line $\beta$ has a small distortion, the flow goes to step S220 via the connection A. Then it is judged whether there is a duplicate portion where characters with large amounts of distortion are removed from the data demodulated with the scanning line $\alpha$.

When it is judged there is a duplicate portion in step S220, it is judged whether the two portions mutually overlapping have the same data in step S221. In the case of identical data, data synthesis is performed in step S222.

When it is judged that there is no duplicate portion in step S220, or when it is judged that the two portions mutually overlapping do not have the same data in step S221, no data-synthesizing process is performed.

On the other hand, when it is judged in step S202 that the character in the duplicate portion demodulated with the scanning line α does not have a large amount of distortion, the flow goes to step S210 via the connector B.

In step S210, it is judged whether the character in the duplicate portion demodulated with the scanning line β has a large amount of distortion. If it is judged that the amount of distortion is large, the flow goes to the step S211. Then it is judged whether there is a duplicate portion, with characters with large amounts of distortion removed from the character demodulated with the scanning line β. If it is judged that there is a duplicate portion in step S211, it is judged whether the duplicate portion is formed of the same data in step S212. In the case of the same data, the data synthesizing process is performed in step S213. When it is judged that there is not duplicate portion in step S211 or that the duplicate portion is not formed of the same data in step S212, any data synthesizing operation is not performed.

If it is judged that the duplicate portion of the data demodulated with the scanning lines α and β has small amounts of distortion in steps S202 and S210, it is inconsistent with the decision already made in step S200 in which there is no coincidence data in the duplicate portion at the farthest end. Hence it is judged that there is some defect in the data. Thus any data synthesis is not made.

In step S200, when there is no data coinciding in the duplicate portion at the farthest end of the combined demodulated data, the flow goes to step S206'. As shown in the fourth embodiment, it is judged whether there is a duplicate portion in a character in which the front end or read end scanned by each beam (scanning line) is removed. If there is a duplicate portion, it is judged in the step S207' whether the duplicate portion is formed of the same data. If yes, the data synthesizing process is performed in step S208'. If there is no duplicate portion in step S206', or that the duplicate portion in step S207' is not formed of the same data, the data synthesizing process is not performed.

Figure 35A:
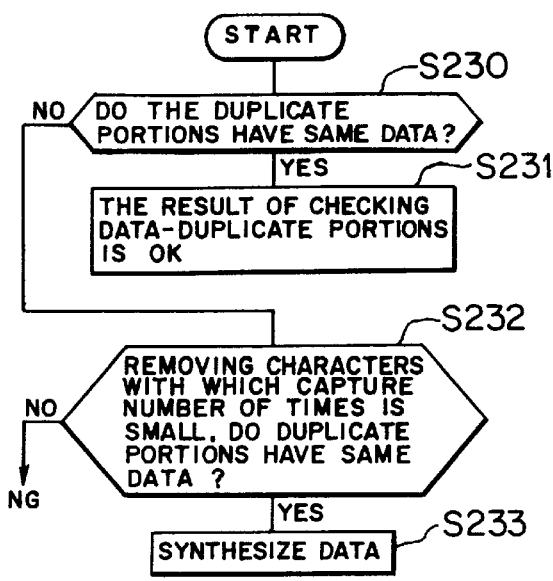
FIG. 35(a) to 35(c) are flowcharts each relating to the third, fifth, and seventh embodiments.
Figure 35B:
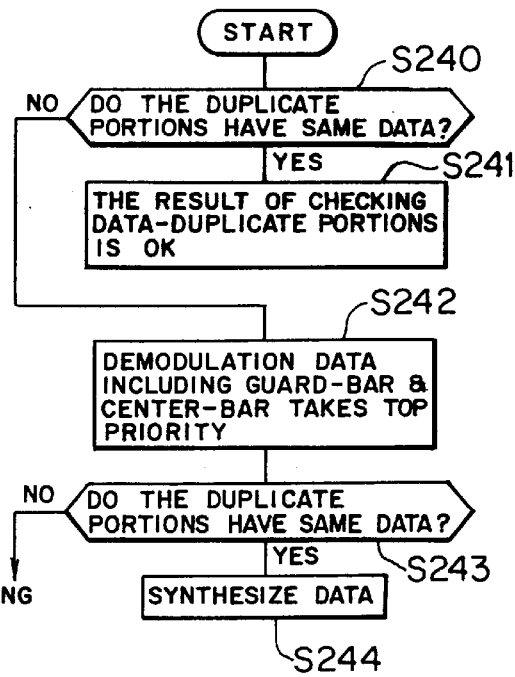
Figure 35C:
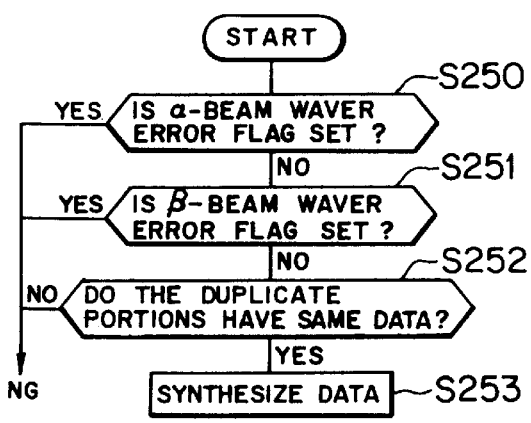

Furthermore, FIGS. 35(a) to 35(c) show flowcharts each for the processes relating to the third, fifth, and seventh embodiments.

FIGS. 35(a) corresponds to the third embodiment. In step S230, if data of the duplicate portion is the same, it is judged in step S231 that the checking result of the duplicate portion is "good" so that the data synthesizing is performed. On the other hand, if the data of the duplicate portion is different, it is judged in step S232 whether the character in the duplicate portion is the same, where the character with a small number of capturing times removed from the demodulated data. If the character is the same, the data synthesizing is performed in step S233. If the character is not the same, the data synthesizing is not performed.

FIG. 35(b) corresponds to the fifth embodiment which is valid in the case of the 2-split reading type.

In step S240, it is judged whether the character in the duplicate portion of the demodulated data obtained from the result scanned with the scanning line, as shown in FIG. 19(b), is formed of the same data. If the data of the duplicate portion is the same, the check result of the data duplicate portion is "good" in the step S241 so that the data synthesizing process is performed. Where it is judged that the character in the duplicate portion is not the same data in step S240, the flow goes to step S242. The demodulated data including the guard bar and the center bar detected is treated preferentially. Some characters are removed from the end data of the demodulated data with only the guard bar detected.

In step S243, it is judged whether the character in the duplicate portion is formed of the same data, with the character removed from the demodulated data.

When it is judged that the character in the duplicate portion is the same data, the flow goes to step S244. Then the data synthesizing process is performed. If it is judged that character in the duplicate portion is not the same data, the data synthesizing process is not performed.

Furthermore, the FIG. 35(c) corresponds to the seventh embodiment. In the 2 split and 3-1 split type reading operations, the duplicate portion of data is checked similarly. For the brief explanation, the character demodulated based on the result obtained by scanning two beams (scanning lines α and β, e.g. refer to FIG. 19(a)) will be described by referring to FIG. 35(c).

In step S250, it is judged whether a wave error flag is set to the demodulated data demodulated with α beams (scanning line). If a wave error flag is set, the data synthesizing is not performed. If the wave error flag is not set, the flow goes to step S251. Then it is judged whether a wave error flag is set to the demodulated data demodulated with β beam (scanning line). Where a wave error flag is set, the data synthesis cannot be performed. If the wave error flag is not set, it is judged in step S252 whether the character in the duplicate portion is the same. If yes, data is synthesized in step S253. If not, data is not synthesized.

In the first to seventh embodiments, only three patterns shown in FIGS. 31(a) to 31(c) have been described as split-reading types. However, this invitation should not be limited only to the above-mentioned patterns. There are various split-reading types which enable the bar-code to be reproduced.

Moreover, in the above-mentioned embodiments, only the bar-code of the standard version of the UPC bar-code symbols has been explained. However, this invention is applicable to, for example, the bar-code symbols for the physical distribution commodity code symbols, without being limited only to the above-mentioned embodiments.

Figure 36:
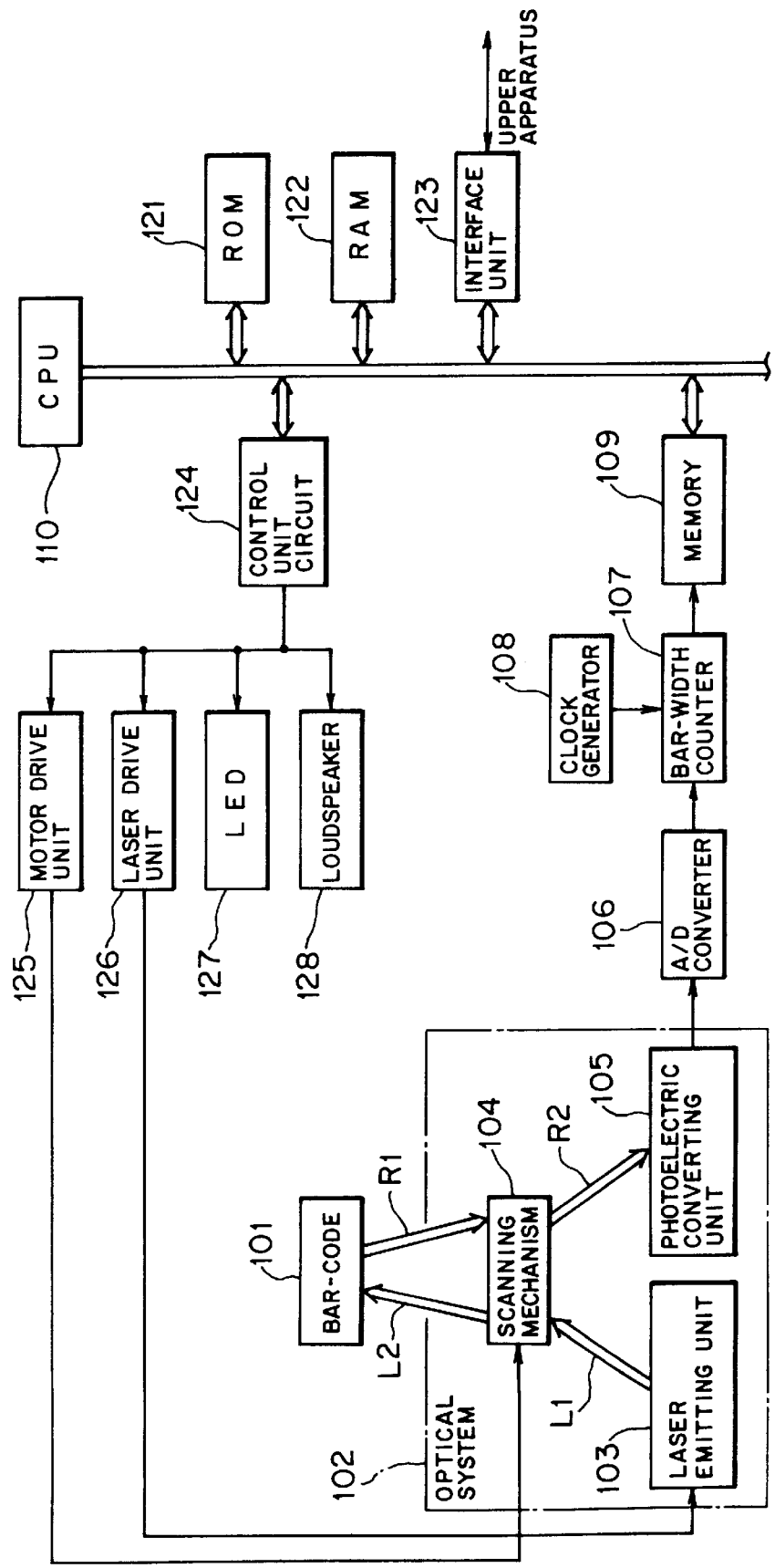
FIG. 36 is a block diagram showing the hardware structure of a bar-code reader of the eighth embodiment according to the present invention.

(c) Eighth Embodiment:

FIG. 36 is a block diagram showing the hardware structure of the bar-code reader according to the eighth embodiment of the present invention. Referring to FIG. 36, in the method and device according to the present embodiment, the data of the bar-code 101 printed on an article is extracted, demodulated, and read.

Figure 40:
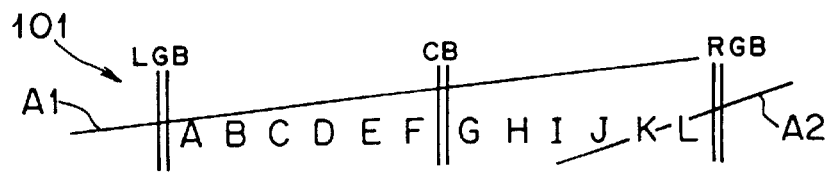
FIG. 40 is a diagram showing a structure of the bar-code and an example of the duplicate status of split-reading data in the present embodiment according to the present invention.
Figure 62:
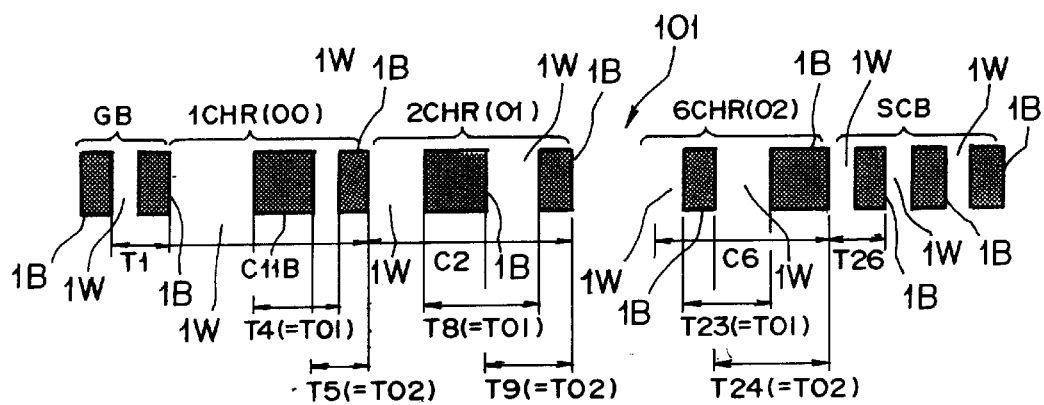
FIG. 62 is a diagram showing the configuration of a general bar-code reader.
Figure 64:
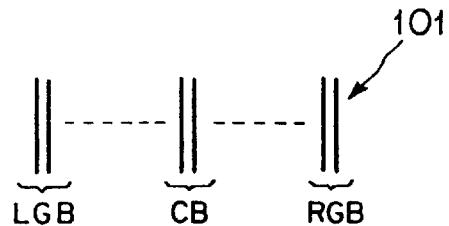
FIG. 64 is a diagram showing the configuration of a general bar-code.
Figure 65:
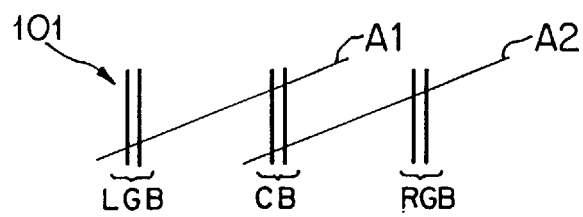
FIG. 65 is a diagram showing an example of a general scanning operation at a bar-code reading time.
Figure 66:
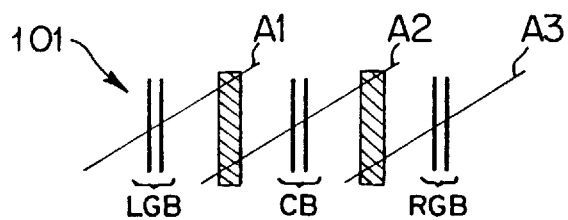
FIG. 66 is a diagram showing an example of a split scanning operation at a bar-code reading time.
Figure 67:
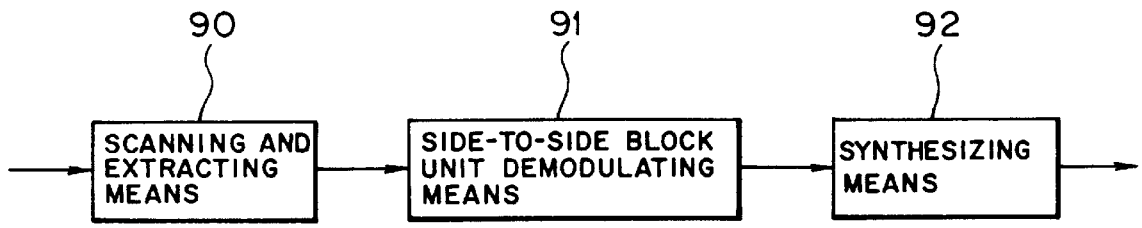
FIG. 67 is a block diagram relating to a prior art bar-code reader.

The bar-code 101, as described with FIG. 62, is formed of a plurality of black bars 1B and white bars 1W arranged alternately. The width of each black bar 1B and each white bar 1W represents predetermined data. As shown in FIG. 40, the bar-code 101 includes the left guard bar LGB defining the left end, the right guard bar RGB defining the right end, and the center bar CB defining the center portion of the bar-code 101. There are 6 character portions A to F representing numerical data between the left guard bar LGB and the center bar CB. There are 6 character portions G to L representing numerical data between the right guard bar RGB and the center bar CB.

Like those described in FIG. 62, each of the character portions A to L is formed of two white bars 1W and two black bars 1B. The number of all the modules is 7. Predetermined numerical data of each of the character portions A to L is expressed by combining the number of modules obtained by the time width (δ distance length) T01 between the left end of the left black bar 1B and the left end of the right black bar 1B with the number of modules obtained by the time width (δ distance length) T02 between the right end of the left black bar 1B and the right end of the right black bar 1B. The relationships between the combination of the number of modules and predetermined numerical data are known and recorded and stored as predetermined table (matrix).

Figure 61:
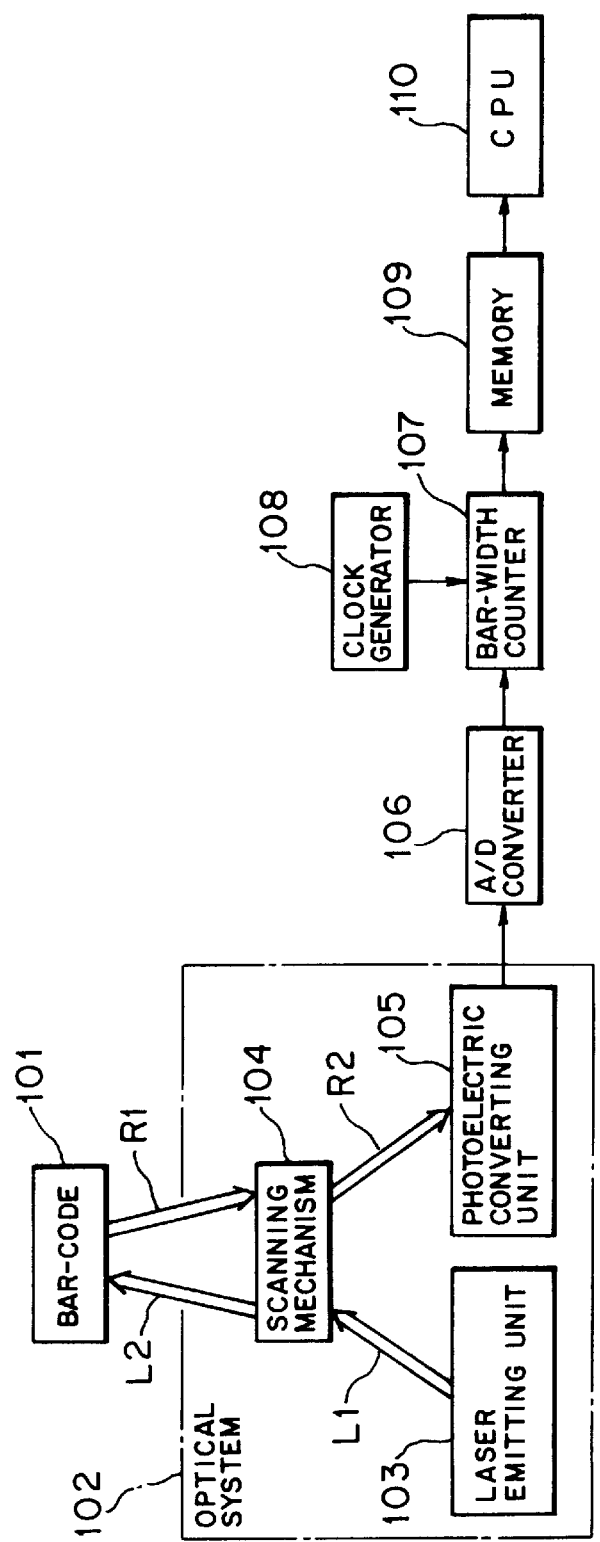
FIG. 61 is a block diagram showing the structure of a general bar-code reader.

Like the structure shown in FIG. 61, numeral 102 represents an optical system formed of a laser emitting unit (light source) 103, a scanning mechanism (scanning means) 104, and a photoelectric converting unit (photoelectric converting means) 105. The laster emitting unit 103 is formed of a semiconductor laser that emits a laser beam (beam light) L1. The scanning mechanism 104 is formed of a polygon mirror rotatably driven by, for example, a motor. The photoelectric converting unit 105 is formed of a photoelectric converting element such as a photodiode.

According to the present invention, the scanning mechanism 104 irradiates laser beams L1 from the laser emitting unit 103 as plural laser beams L2 to the bar-code 101 and scans the bar-code 101 with the laser beam L2. The scanning mechanism 104 also brings a reflected light R1 moving with scanning of the laser beam L2 as a reflected light R2 to the photoelectric converting unit 5, by reflecting the reflected light R1 or the laser beam L2 reflected on the bar-code 101.

The photoelectric converting unit 105 receives the reflected light R2 being the laser beam L2 receiving via the scanning mechanism 104 from the bar-code 101 and then converts it into an electrical signal according to the light amount.

Moreover, as in the conventional structure, the A/D converter 106, the bar-width counter 107, the clock generator 108, the memory 109 and the CPU 110 are arranged behind the photoelectric converting unit 105.

As in the conventional structure digitizes, the A/D converter 106 the electrical signal from the photoelectric converting unit 105 and then converts it into a binary signal including a black level signal (low level signal) corresponding to each black bar 1B of the bar-code 101 and a white level signal (high level signal) corresponding to each white bar 1W of the bar-code 101.

The bar-width counter 107 counts clock signals from the clock generator 108 and produces as a count value of clock signals the time widths of the black level signal and the white level signal of a binary signal from the A/D converter 106, or a value corresponding to the widths of each black bar 1B and each white bar 1W of an actual bar-code 101. Furthermore, the memory 109 stores a bar-width count value from the bar-width counter 107.

The CPU 110 according to the present embodiment extracts and demodulates predetermined data of a bar-code 101, based on the bar-width count value (a value corresponding to the width of each black bar 1B and the width of each white bar 1W) stored in the memory 109. However, the CPU 110 has the function to be described later with FIG. 37.

The CPU 110, as shown in FIG. 36, is connected to the ROM 121, the RAM 122, the interface unit 123, and the control unit circuit 124.

The ROM 121 stores various programs necessary from implementing various processes and tables holding the relationships between the combination of the number of modules and predetermined numerical data. The Ram 122 is used as work area on the operation time of the CPU 110, and functions as the demodulation data storage unit to be described later with FIG. 37.

The interface unit 123 exchanges data (such as a bar-code reading result) with an external device (not shown). The data control unit circuit 124 controls the operation of the bar-code reader in response to various instructions from the CPU 110. The control unit circuit 124 controls the motor drive unit 125 to drive-control the motor of the scanning mechanism 104, the semiconductor laser in the laser emitting unit 103, the light emitting diode (LED) 127, the loudspeaker 128, and the like. When the bar-code reading has been completed, the light emitting diode 127 emits out light to report the situation to an operator or the loudspeaker 128 produces sound to report the situation to an operator.

Next, the functional configuration of the bar-code reader according to the eighth embodiment of the present invention will be described below with reference to FIG. 37. As shown in FIG. 37, the CPU 110 according to the present embodiment functions as the bar-code data detecting unit 131, the bar-code demodulating unit 132, the bar-code synthesizing unit 133, the data comparing unit 134, the modulo-10 checking unit 135, the coincidence count checking unit 136, the reference number varying unit 137, and the bar-code reading completion reporting unit 138. The RAM 122 according to the present embodiment functions as the demodulation data storing unit 122A.

The bar-code data detecting unit 131 detects the center bar CB and the guard bars LGB and RGB based on the data (stored in the memory 109) regarding a plurality of portions to be read of the bar-code 101 and checks the adjacent characters while it extracts the number of valid characters. As described above, according to the present embodiment, a sole bar-code 101 with a plurality of divided portions is scanned. Where at least one of the center bars CB and two guard bars LGB and RGB is included in the data of each portion, it is judged that the bar-code reading is valid. Such a judgment is performed by the bar-code data detecting unit 131. Where the data of a portion of the bar-code 101 split-scanned does not include any one of the center bar CB and two guard bars LGB and RGB, the bar-code data detecting unit 131 outputs as re-reading instruction.

The bar-code demodulating unit (demodulating means) 132 demodulates the valid character extracted by the bar-code data detecting unit 131 into data such as an English letter or numerical letter, based on the bar-width count value (or an electrical signal from the photoelectric converting unit 105) stored in the memory 109. In other words, in the present embodiment, each data (each portion of one bar-code 101) including at least one of the center bar CB and two guard bars LGB and RGB is demodulated by the bar-code demodulating unit 132 as much as possible. The demodulated data is stored into the demodulation data storage unit 122A arranged in the RAM 122.

The bar-code synthesizing unit (combining unit) 133 combines plural demodulated data stored in the demodulation data storing unit 122A to synthesize and demodulate data (a series of the bar-code data) of the bar-code 101 to be currently read. In the combining process, the bar-code synthesizing unit 133 judges whether the portions being mutually adjacent to a plurality of demodulated data are duplicated situationally (position duplicate checking function). If there is a situationally-duplicated portion, the series of the plural plurality pieces of combined bar-code data are validated. If there is no situationally-duplicated portion, the re-reading instruction is output.

The data comparing unit 134 judges through data comparison whether the end character coincides and is duplicated with the end character of another adjacent demodulated data in the plural pieces of demodulated data obtained every scanning line (character duplicate checking function). Where at least one character among characters at the end portion is agreed (duplicated), a plurality of pieces of demodulated data obtained regarding the bar-code 101 to be read are validated. The data comparing unit 134 outputs a re-reading instruction in the case of the absence of duplicated characters.

In the eighth embodiment, the data comparing unit 134 functions as read-status information capturing means (character number detecting means) that detects and captures as information regarding the reading status of the bar-code 101 the number of characters (number of duplicate characters) obtained by duplicate-demodulating the demodulated data in plural portions of the bar-code 101 when the character duplicate checking is performed.

The modulo-10 checking unit 135 subjects the synthesis result (demodulated result) to the general modulo-10 checking when the bar-code synthesizing unit 133 synthesizes valid data as the demodulated data of the bar-code 101 to be read. If the checking result is approved, it is judged that one-time reading (demodulating process) of the bar-code 101 to be read has been completed. The modulo-10 checking unit 135 outputs the re-reading instruction when the checking result is NG.

When one-time reading (demodulating process) to the bar-code 101 has being completed using the functions of the bar-code data detecting unit 131, the bar-code demodulating unit 132, the bar-code synthesizing unit 133, the data comparing unit 134, and the modulo-10 checking unit 135, the coincidence count checking unit (coincidence count judging means) 136 detects the number of times the same data from the bar-code 101 to be read is sequentially demodulated, compares the resultant times with a predetermined reference count set by the reference count varying unit 137 (to be described later), and completes the reading of the bar-code 101 to validate the data demodulated from the bar-code 101 when the times reaches the predetermined reference count. In this case, when the current read result differs from the previous read result, or the count does not reach a predetermined reference count, the coincidence count checking unit 136 outputs the rereading instruction.

The reference count varying unit (reference count varying means) 137 varies the setting of the predetermined reference count in the coincidence count checking unit 136 according to the number of duplicate characters (the reading status information of the bar-code 101) obtained by the function acting as the reading status information capturing means in the data comparing unit 134. The setting-varying operation of the reference count varying unit 137 according to the eighth embodiment will be described later in detail with reference to FIG. 39.

Where completing the reading operation of the bar-code 101 by being judged by the coincidence count checking unit 136 that the number of times, the same data are continuously demodulated reaches the predetermined reference count, the bar-code read-completion reporting unit 138 instructs a read-completion report to the interface unit 123 and the control unit circuit 124 shown in FIG. 36. In response to the instruction, the interface unit 123 transmits the effect that the reading has been completed to the upper equipment while the control unit circuit 124 drives to emit the LED 127 or controls the loudspeaker 128 to produce sound, thus reporting the completed reading to an operator.

Next, the entire operation of the above-mentioned structure in the eighth embodiment of the present invention will be explained below according to the flowchart (steps A1 to A14) shown in FIG. 38.

The CPU 110 sends a reading instruction to the control unit circuit 124. The motor drive unit 125 operates the scanning mechanism 104 and the laser drive unit 126 operates the laser emitting unit 103. The bar-code 101 is subjected to the split-reading process (step A1).

In the present embodiment, the scanning mechanism 104 irradiates the laser beam L1 as a plurality of laser beams L2 emitted from the laser emitting unit 103 to the black bar 1B and white bar 1W of the bar-code 101, and moves and scans at a constant rate in the direction crossing the black bar 1B and the white bar 1W of the bar-code 101.

The laser beams L2 irradiated from the scanning mechanism 104 are scattered and reflected on a portion of the bar-code 110 and then re-enters as a plurality of reflected light beams R1 to the scanning mechanism 104. The reflected light beams R1 move with the reflected angle varying with the scanning movement of the laser beam L2. The reflected light beams R1 are reflected as the reflected light beams R2 on the polygon mirror and then enter into the photoelectric converting unit 105 arranged at a predetermined position.

The photoelectric converting unit 105 converts the reflected light R2 into an electric signal according to the amount of light. The A/D converter 106 digitalizes the electrical signal to convert it into a binary signal including a black level signal corresponding to the portion of the black bar 1B and a white level signal corresponding to the portion of the white bar 1W of the bar-code 101.

Thereafter, the bar-width counter 107 counts clock signals from the clock generator 108 and measures as the count value of the clock signals the time width (a value corresponding to the width of each black bar 1B and the white bar 1W of an actual barcode 101) of the black level signal portion and the white level signal portion of a binary signal from the A/D converter. The count value is temporarily stored into the memory 109.

In the present embodiment, a plurality of pieces of split reading data which are partially read from one bar-code 101 are obtained.

The bar-code data detecting unit 131 detects whether split reading data stored in the memory 109 includes at least one of the center bar CB and two guard bars LGB and RGB (steps A2 and A3). When the split reading data does not include the center bar CB and two guard bars LGB and RGB, the flow goes to the step A1 to re-read the bar-code 101.

Where the split-reading data includes at least one of the center bar CB and two guard bars LGB and RGB, the bar-code demodulating unit 132 subjects the split-reading data to a demodulating process (step A4).

The bar-code demodulating unit 132 demodulates the valid characters of the split-reading data extracted by the bar-code data detecting unit 131 into data such as an English letter or numerical letter based the bar-width count value stored in the memory 109 as much as possible. In other words, as described with FIG. 62, data of the bar-code 101 is extracted and demodulated by deciding the module number of each of the time widths (6 distance lengths) T01 and T02 to each of the character portions A to L (refer to FIG. 40), on a base of each of the positions of the center bar CB and the guard bars LGB, and RGB included in each data and reading the numerical data corresponding tot he combination of two modules out of the predetermined table previously stored in the ROM 121.

A plurality of pieces of demodulated data demodulated every split-reading data are temporarily stored into the demodulation data storage unit 122A in the RAM 122 (step A5).

The bar-code synthesizing unit 133 combines a plurality pieces of demonstrated data stored in the demodulation data storage unit 122A, and then synthesizes and demodulates a series of data in the bar-code 101 to be currently read (step A6).

When the bar-code synthesizing unit 133 cannot synthesize a series of bar-code data (e.g. the position duplicate checking function judges the absence of a position duplicate portion; NO decision in step A7), the flow goes to the step A1. Then reading the bar-code 101 is resumed.

When the bar-code synthesizing unit 133 can synthesize a series of bar-code data and completes the combination of the plurality of pieces of demodulated data (in the case of YES decision in step A7), the data comparing unit 134 compares the character at the end portion (duplicate character portion) of each demodulated data with the character at the end portion (duplicate character portion) of another adjacent demodulation data, in the plurality of demodulated data obtained every scanning line (step A8), and then judges whether the characters are coincided or duplicated (step A9).

If it is judged that there is not duplicate character (in the case of NO decision in step A9), the flow goes back to step A1. Then re-reading the bar-code 101 is resumed. If it is judged that there is a duplicate character (in the case of YES decision in step A9), the modulo-10 checking unit 135 subjects a series of data (synthesis result) regarding the barcode 101 to be read, to the modulo-10 checking process (step A10).

If the checking result is NG (NO decision in step A11), the flow goes back to the step A1 to resume re-reading the bar-code 101. If the checking result is OK (YES decision in step A11), it is judged that one-time reading of the bar-code 101 (demodulation process) has been completed. Then the coincidence count checking unit 136 performs a coincidence count checking process (step A12).

Every time when one-time reading to the bar-code 101 (demodulation process) is completed, the coincidence count checking unit 136 detects the number of times (continuous demodulation count) the same data from the bar-code 101 to be read is continuously demodulated, and then compares the resulting continuous demodulation count with a predetermined reference count whose setting to be varied (as described later).

As a result of the comparison, when the continuous demodulation count does not reach a predetermined reference count, or the current reading result differs from the previous reading result (NO decision in the step A13), the flow goes back to step A1. The reading the bar-code 101 is resumed.

On the other hand, when the continuous demodulation count reaches the predetermined reference count (YES decision in the step A13), data demodulated from the bar-code 101 is validated and reading the bar-code 101 is completed. At this time, the barcode read-completion reporting unit 138 instructs the interface unit 123 and the control unit circuit 124 to report a read-completion, and the effect that the reading of the bar-code 101 to be read has been completed is reported to the upper equipment or an operator (step A14).

With a single bar-code 101 divided into a plurality of portions in the reading operation, increasing the number of characters (number of duplicate characters) which are coincident in the duplicate portion where demodulated data is duplicated with the adjacent demodulated data in the plurality of pieces of demodulated data obtained every scanning line results in a small possibility of an erroneous reading of the bar-code 101. In other words, the larger the number of duplicate characters becomes, the higher the reliability of the split-reading result becomes. Hence even if the coincidence count checking unit 136 sets the predetermined reference count at a small value, the possibility of the erroneous reading is very small.

As shown in FIG. 40, for example, let us consider the case where a single bar-code 101 is divided into two portions with two scanning lines A1 and A2 in the reading operation.

Now it is assumed that the first pattern includes the characters A to F, G, H, I and J in the bar-code 101 demodulated with the scanning line A1 and the characters J, K, and L in the bar-code demodulated with the scanning line A2, and the second pattern includes the characters A to F, G, H, I, and J in the bar-code 101 demodulated with the scanning line A1 and the characters I, J, K, and L in the bar-code 101 demodulated with the scanning line A2.

In the first pattern, the duplicate character is only J at the end portion and the number of duplicate characters is 1. In this case, the possibility that both the character J at the farthest end portion of the character demodulated with the scanning line A1 and the character J at the farthest end portion of the character demodulated with the scanning line A2 have been erroneously read is strong. Hence even if these characters are in coincident and duplicate state, the demodulated data has low reliability.

In the second pattern, the duplicate characters are I and J and the number of duplicate characters is 2. In this case, the possibility that both the character J at the farthest end portion of the character demodulated with the scanning line A1 and the character I at the farthest end portion of the character demodulated with the scanning line A2 have been erroneously read is strong. However, both the second character J away from the farthest end of the character demodulated with the scanning line A2 have high reliability.

In other words, in the second pattern, the character J at the farthest end portion of the character demodulated with the scanning lien A1 agrees with the second character J away from the farthest end portion of the character demodulated with the scanning line A2. The character I away from the farthest end portion of the character demodulated with the scanning line A1. Hence the characters with strong erroneous reading possibilities are not duplicated with each other. In comparison with the first pattern described before, the demodulated data has high reliability.

Decreasing the number of duplicate characters results in stronger erroneous reading possibilities. Hence, in the eighth embodiment, in order to improve the reliability, the reference count varying unit 137 varies the setting of the reference count in the coincidence count checking unit 136 to a large value. When the character duplicate checking is performed, the number of duplicate characters is detected by the function acting as the read-status information capturing means (character number detecting means) in the data comparing unit 134.

The operation of the reference count setting/varying process in the reference count varying unit 137 will be explained below with reference to the flowchart (the steps A21 to A27) shown in FIG. 39. If the number of duplicate characters detected by the data comparing unit 134 is 1 (in the case of YES decision in the step A21), the reference count of the coincidence count checking unit 136 is set to 3, or the times the data of the bar-code 101 to be read is captured is set to 3 (step A22).

If the number of duplicate characters detected by the data comparing unit 134 is 2 (in the case of the YES decision in the step A23), the reference count of the coincidence count checking unit 136 is set to 2, or the times data of the bar-code 101 to be read is captured is set to 2 (step A24).

Furthermore, if the number of duplicate characters detected by the data comparing unit 134 is 3 or more (in the case of the YES decision in the step A25), the reference count of the coincidence count checking unit 135 is set to 1, the reliability of the demodulated data is very high. Hence since it is unnecessary to check with the coincidence count checking unit 136, the demodulated data is validated as it is, without performing the coincidence count checking, whereby the bar-code 101 is completely read.

When there is NO decision in the step A25 (it is judged that the number of duplicate characters is not 3 or more), it is judged that the duplicate character number is 0, or any error has occurred. Then the re-reading of the bar-code 101 is instructed (step A27).

As described above, according to the eighth embodiment of the present invention, if the number of duplicate characters is small, or the possibility of an erroneous reading is high, the reference count is set to a large value according to the number of duplicate characters being the reading status information of the bar-code 101. If the number of duplicate characters is large and the possibility of an erroneous reading is mall, the reference count is set to a small value.

Hence, where a single bar-code 101 is divided into a plurality of portions and they are scanned and demodulated, the coincidence count checking can be performed according to the reading status (number of duplicate characters) of the bar-code 101. The reading ratio on an actual operation is greatly improved without decreasing the reading efficiency. As an result, the erroneous reading ratio can be significantly decreased.

Particularly, with the character erroneously demodulated due to paper surface noises or characters removed, a plurality of pieces of demodulated data can be synthesized. As a result, the erroneous reading ratio can be greatly decreased. Where there are no paper noises or characters with the bar-code 101 background, the reading accuracy can be greatly improved.

Figure 39:
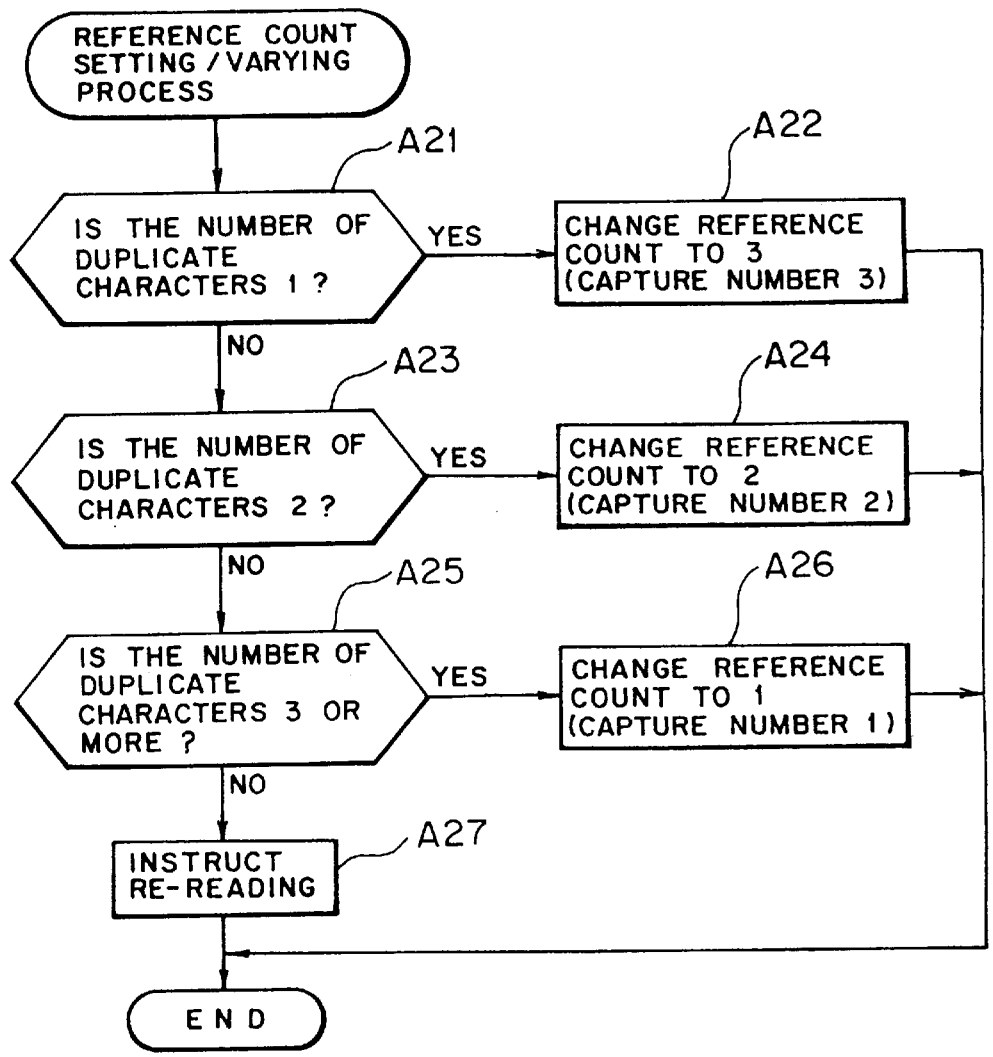
FIG. 39 is a flowchart used for explaining the reference count setting operation in the eighth embodiment according to the present invention.

In the eighth embodiment, with reference to FIG. 39, the case where the reference count varying unit 137 sets the reference count to 3 when the number of duplicate characters is 1, sets the reference count 2 when the number of duplicate characters is 2, and sets the reference count to 1 when the number of duplicate characters is 3 ore more has been explained. However, in the present invention, the numerical values should not be limited only to the above-mentioned values.

According to the eighth embodiment, the case where a single bar-code 101 is read in 2-split state with the scanning lines A1 and A2 has been explained with reference to FIG. 40. However, the present invention should not be limited to only the above-mentioned embodiment. Similarly the present invention is applicable to the case of reading a single bar-code 101 split into 3 or more. The same function and effect can be obtained in the eighth embodiment.

Figure 41:
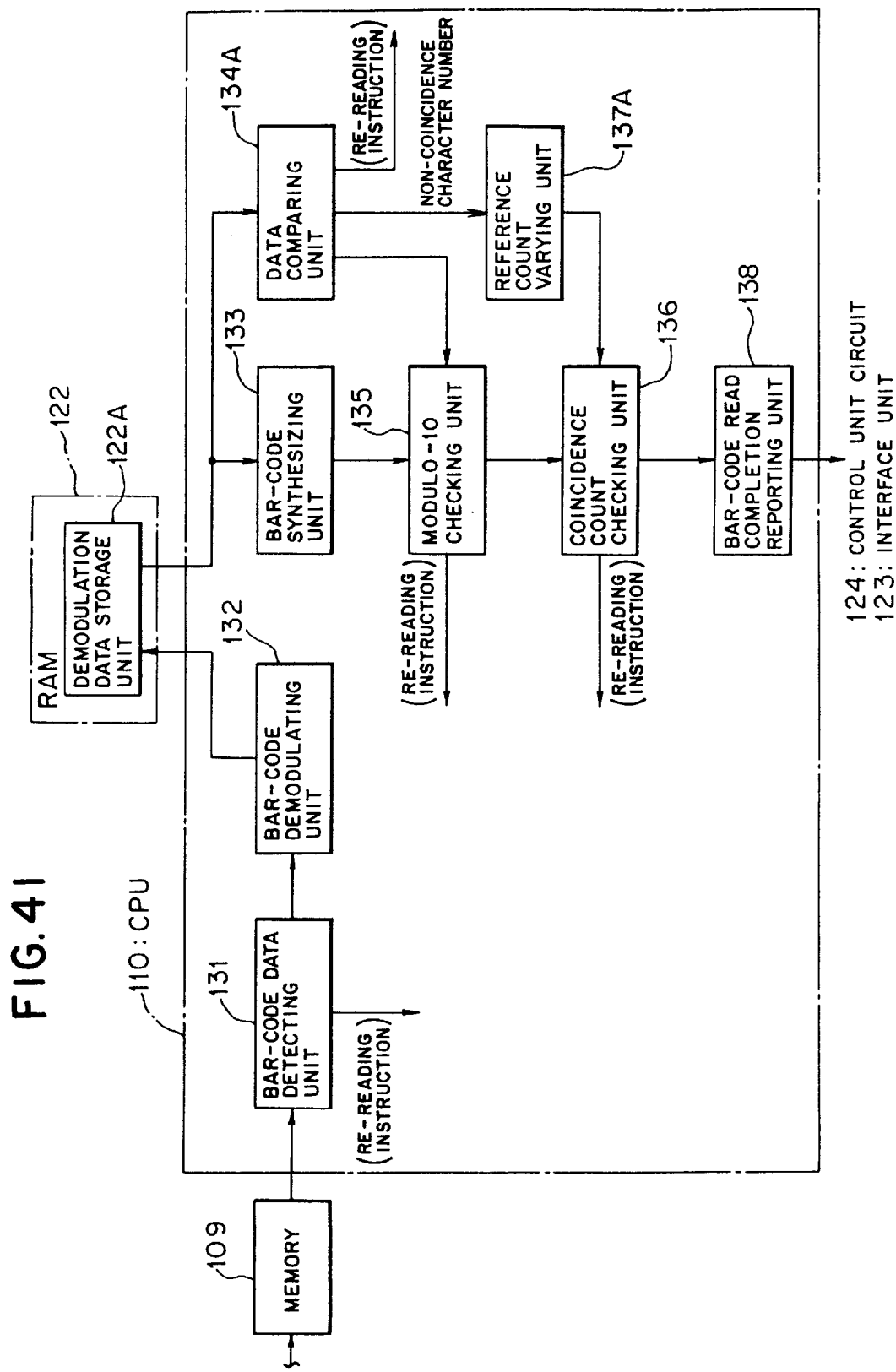
FIG. 41 is a block diagram showing the functional structure of a bar-code reader in the ninth embodiment according to the present invention.

(d) Ninth Embodiment:

The hardware configuration of the bar-code reader according to the ninth embodiment of the present invention is identical to that of the eighth embodiment shown in FIG. 36. The function configuration of the bar-code reading according to the ninth embodiment of the present invention, as shown in FIG. 41, is substantially the same as that of the eighth embodiment. However, in the ninth embodiment, the data comparing unit 134A differs functionally somewhat from the data comparing unit 134 of the eighth embodiment shown in FIG. 37. The reference count varying unit 137A differs functionally somewhat from the reference count varying unit 137 in the eighth embodiment shown in FIG. 37. In FIGS. 41 and 37, like symbols and numerals represent like elements. Hence the duplicate explanation will be omitted.

According to the ninth embodiment, in order to perform a character duplicate checking like the data comparing unit 134 in the eighth embodiment, the data comparing unit 134A acts as the read-status information capturing means (character number detecting means) that detects and captures as the read-status information of the bar-code 101 the number of characters (non coincidence character number) with difference demodulation results of a duplicate portion in demodulated data of a plurality portions of the bar-code 101.

According to the ninth embodiment, the reference count varying unit (reference count varying means) 137A varies the setting of the predetermined reference count in the coincidence count checking unit 136, according to the number of non-coincidence characters (the read-status information of the bar code 101) obtained with the function of the read-status information capturing means of the data comparing unit 134A. The setting varying operation of the reference count varying unit 137A of the ninth embodiment will be described later with reference to FIG. 42.

Figure 38:
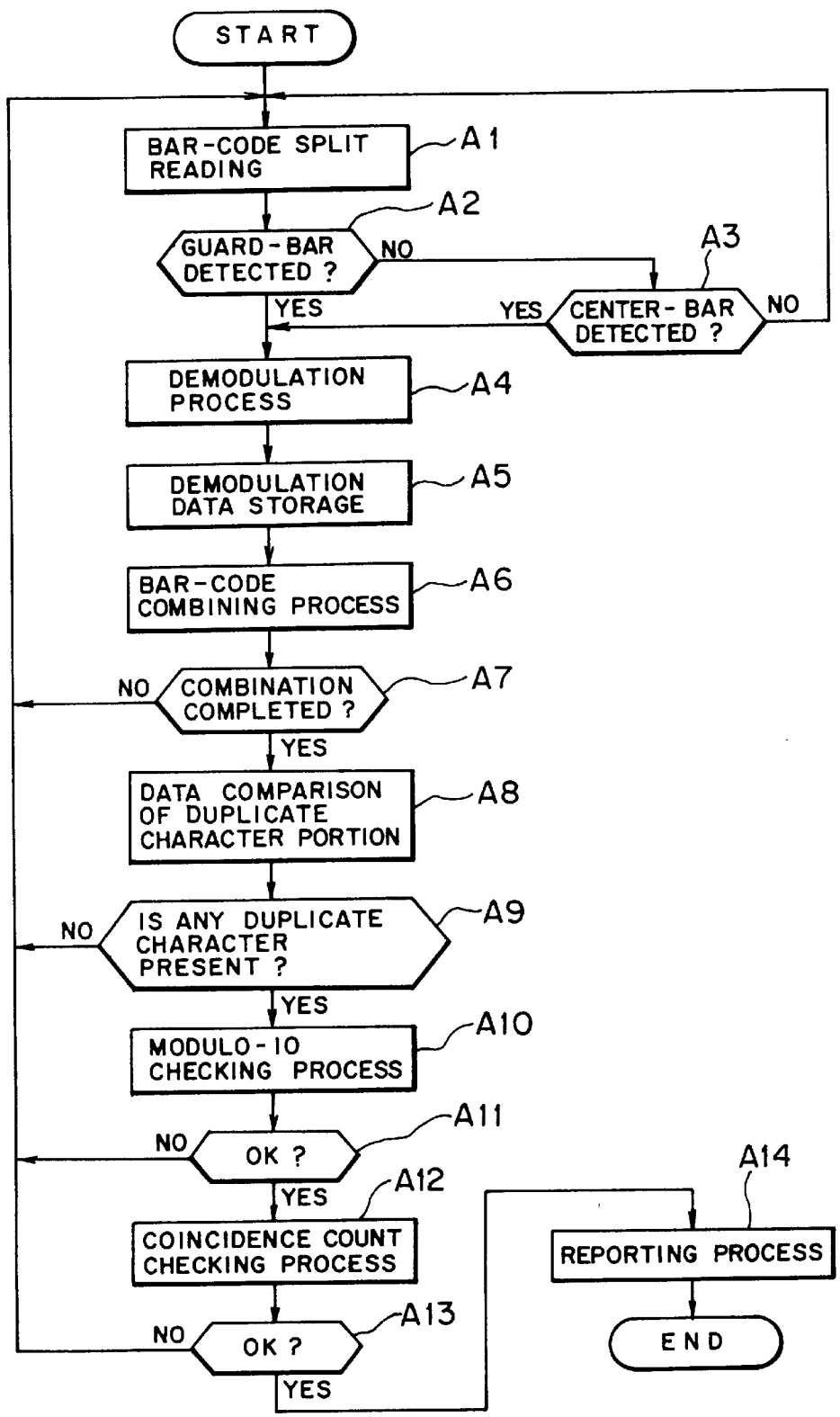
FIG. 38 is a flowchart used for explaining the entire operational flow of the eighth embodiment according to the present invention.

The entire operation of the above-mentioned configuration according to the ninth embodiment of the present invention is identical to that of the eight embodiment explained according to the flowchart shown in FIG. 38. Hence the duplicate explanation will be omitted below.

Where a single bar-code 101 is divided into a plurality of portions and read, the reliability of the demodulation data of the bar-code 101 becomes lower by consisting of larger number of characters with different demodulation results (the number of non-coincidence characters) at the portion where each demodulated data and adjustment demodulated data are duplicated, in a plurality of pieces of demodulated data obtained every scanning line. Therefore, with the number of non-coincidence characters being larger, it is desirable to improve the reliability of the result of the split-reading by setting the predetermined reference count at a greater value by the coincidence count checking unit 136.

As in the eight embodiment shown in FIG. 40, let us consider the case where a single bar-code 101, divided into two with the scanning lines A1 and A2, is read.

The first pattern includes the characters A to F, G, H, I, and J' of the bar-code 101 demodulated with the scanning line A1, and the characters I, J, K, and L of the bar-code 101 demodulated with the scanning line A2. The second pattern includes the characters A to F, G, H, and I of the bar-code 101 demodulated with the scanning line A1, and the characters I, J, K, and L of the bar-code 101 demodulated with the scanning line A2.

In this case, the first pattern includes the duplicate portion for 2 characters (I and I, J and J'). An actual duplicate character corresponds to only one character I. The character J' at the farthest end of a demodulated character demodulated with the scanning line A1 disagrees with the second character J away from the farthest end of a demodulated character demodulated with the scanning line A2. This means that the number of non-coincidence characters is 1.

Such non-coincidence may cause an erroneous reading due to letters or paper surface noises except the bar-code 101. Hence the character I has two pieces of demodulated data duplicated. However, particularly, where the reliability of the character I at the farthest end of the character demodulated with the scanning line A2 becomes low, and the reading result is validated only with the character I duplicated, an erroneous reading is likely to occur.

The second pattern has a duplicate portion for one character. Two characters I are made to each other in the duplicate portion. That is, the number of non-coincidence characters is 0. In this case, it is supposed that the possibility that an erroneous reading due to letters or paper surface noises except the bar-code 101 occurs is much lower than that in the first pattern.

Hence, according to the ninth embodiment, because an increase in the number of non-coincidence characters causes a strong possibility of an erroneous reading, the reference count varying unit 137A varies the setting of the reference count of the coincidence count checking unit 136 to a large value to improve the reliability. In this case, the number of non-coincidence characters is detected with the function of the read-status information capturing means (character number detecting means) in the data comparing unit 134A when the character duplicate checking is performed.

Figure 42:
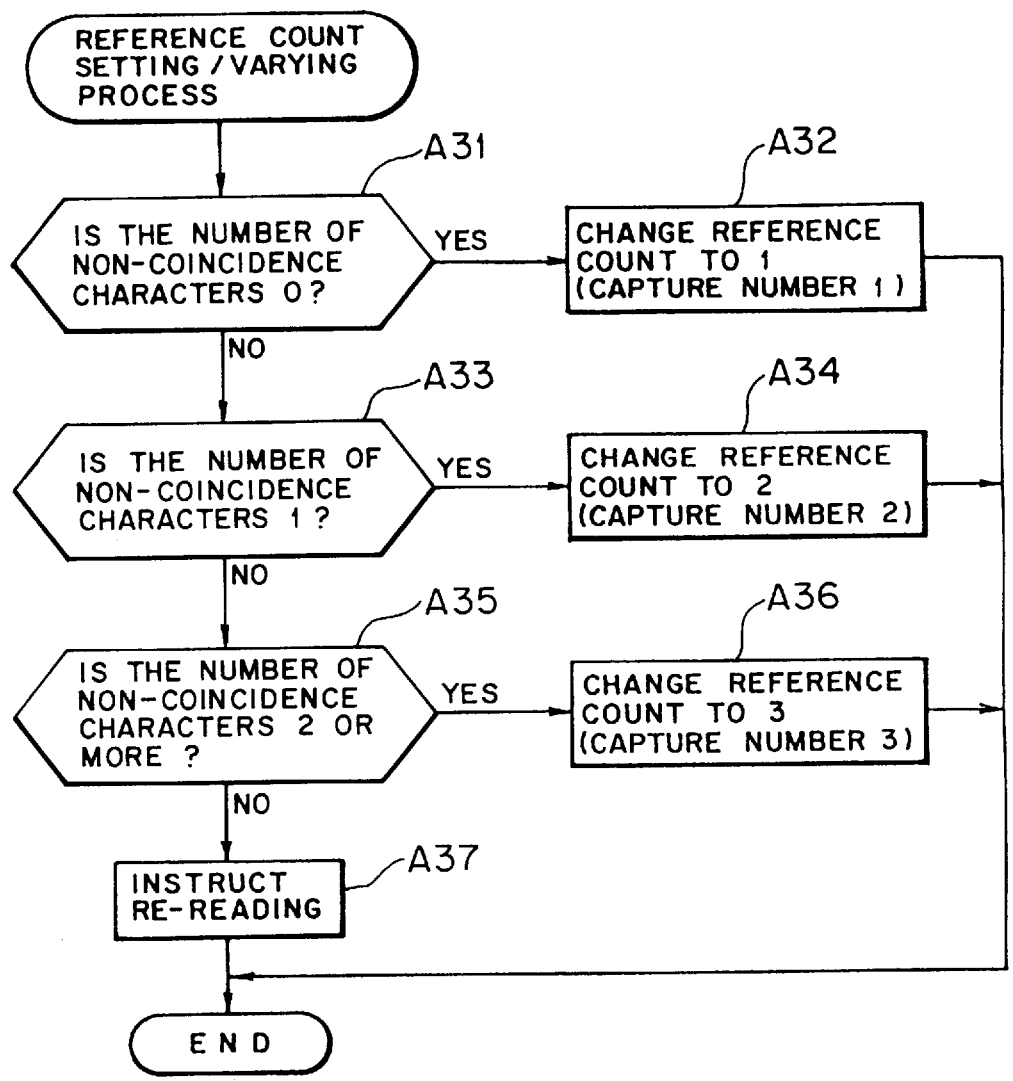
FIG. 42 is a flowchart used for explaining the reference count setting operation in the ninth embodiment according to the present invention.

The operation of the reference count setting varying process by the reference count varying 137A will be explained below by referring to the flowchart (steps A31 to A37) shown in FIG. 42. If the number of non-coincidence characters detected by the data comparing unit 134A is 0 (in the cases of the YES decision in step A31), the reference count of the coincidence count checking unit 136, or the data capturing count of the bar-code 101 to be read, is set to 1 (step A32). AS described in the eighth embodiment, if the reference count is set to 1, the reliability of the demodulated data is high and it is unnecessary for the coincidence count checking unit 136 to perform the checking operation. Hence demodulated data is validated without performing the coincidence count checking so that the bar-code 101 is completely read.

If the number of non-coincidence characters detected by the data comparing unit 134A is 2 or more (in the case of the YES decision in step A35), the reference count of the coincidence count checking unit 136 is set to 3, or the data capturing count of the bar-code 101 to be read is set to 3 (step A36).

Where there is NO decision in step A35 (or it is judged that the number of non-coincidence characters is not 2 or more), it is judged that an error has occurred and re-reading the bar-code 101 is indicated (step A37).

According to the ninth embodiment of the present invention, where the number of non-coincidence characters is large and there is a strong possibility of an erroneous reading according to the number of non-coincidence characters being the read-status information of the bar-code 101, the reference count is set to a large value. Where the number of non-coincidence characters is small and the possibility of an erroneous reading is small, the reference number of times is set to a small value.

Therefore, where one bar-code 101 divided into a plurality of portions is scanned and demodulated, the coincidence count checking can be performed according to the read-status (the number of non-coincidence characters) of the bar-code 101. The same effect as that in the eight embodiment can be obtained.

In the ninth embodiment, the case where the reference count varying unit 137A sets the reference count to 1 when the number of non-coincidence characters is 0, sets the reference count to 2 when the number of non-coincidence characters is 1, and set the reference count to 3 when the number of non-coincidence characters is 2 or more, has been explained with reference to FIG. 42. In the present invention, the reference count should not be limited only to the above-mentioned values.

In the ninth embodiment, as shown in FIG. 40, the case where one bar-code 101 divided into two, with two scanning lines A1 and A2, is read has been described. The present invention should not limited only to this embodiment. Similarly, the present invention is applicable to the case where one bar-code 101 divided into 3 or more is read. The same function and effect as those in the ninth embodiment can be obtained.

Figure 43:
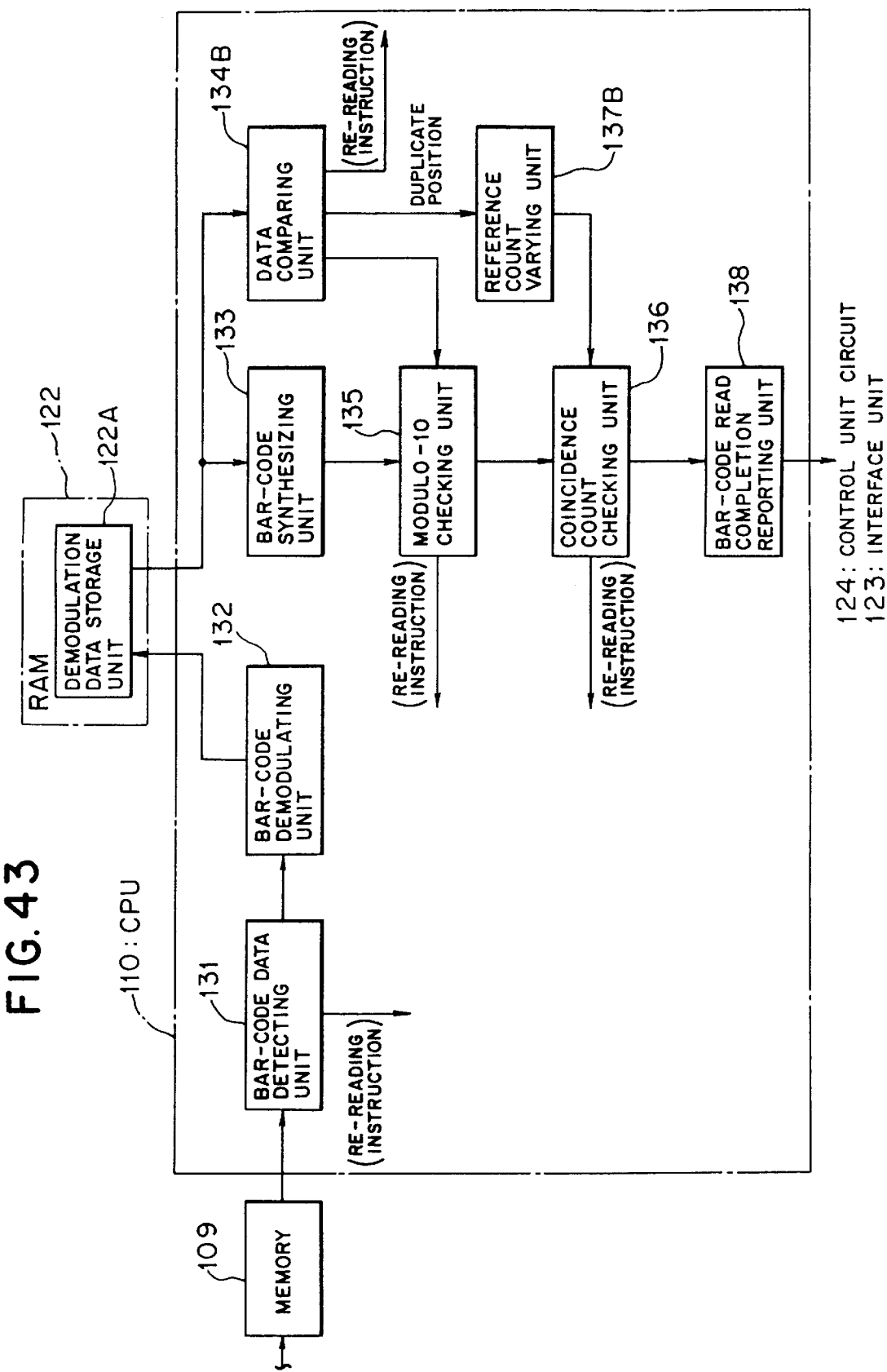
FIG. 43 is a block diagram showing the functional structure of a bar-code reader in the tenth embodiment according to the present invention.

(e) Tenth Embodiment:

The above configuration of the bar-code reader in the tenth embodiment of the present invention is identical to that in the eighth embodiment shown in FIG. 36. The hardware configuration of the bar-code reader in the tenth embodiment of the present invention shown in FIG. 43 is substantially the same as that in the eighth embodiment. In the tenth embodiment, the data comparing unit 134B differs somewhat functionally from the data comparing unit 134 in the eighth embodiment shown in FIG. 37. The reference count varying unit 137B differs somewhat functionally from the reference count varying unit 137 in the eighth embodiment shown in FIG. 37. In FIG. 43, like symbols and numerals represent like elements. The duplicate explanation will be omitted here.

According to the tenth embodiment, the data comparing unit 134B functions as read-status information capturing means (duplicate position detecting means) that detects and captures as the read-status information of the bar-code 101 the position of a duplicate portion (duplicate position) of demodulated data in plural portions of the bar-code 101 when the same character duplicate checking as that of the data comparing unit 134 in the eighth embodiment is performed.

According to the tenth embodiment, the reference count varying unit (reference count varying means) 137B varies the setting state of the predetermined reference count of the coincidence count checking unit 136, according to the duplicate position (the read-status information of the bar-code 101) obtained with the function of the read-status information capturing means in the data comparing unit 134B. The detail setting/varying operation of the reference count varying unit 137B according to the tenth embodiment will be described later with reference to FIG. 44.

The entire operational flow of the above-mentioned configuration according to the tenth embodiment is identical to that of the eighth embodiment described according to the flowchart shown in FIG. 38. Hence the duplicate explanation will be omitted here.

As described above, where one bar-code 101 divided into plural portions is read, the data demodulated with scanning lines crossing both the guard bar and the center bar has higher reliability that the data demodulated with the scanning line crossing only the guard bar (or center bar). In the example shown in FIG. 40, the scanning line A1 passes through the both the left guard bar LGB and the center be CB, and the scanning line A2 passes through only the right guard bar RGB. In this case, the demodulated data corresponding to the scanning line A1 has greater reliability than the demodulation data corresponding to the scanning line A2.

There is a strong possibility that a column marked near the bar-code 101 printed on a newspaper may be erroneously read as a guard bar is strong. That is, if the number of the duplicate characters described in the eight embodiment is the same, the reliability of the demodulated data including only the guard bar becomes high, with the number of characters thereof.

Hence, where the number of characters of the demodulated data including only the guard bar is smaller, or the position of a duplicate character (duplicate position) is closer to the guard bar, it is desirable to improve the reliability of the split-reading result by setting the predetermined reference count of the coincidence count checking unit 136 to a large value.

Like the eighth embodiment shown in FIG. 40, let us consider that one bar-code 101 divided into two portions using two scanning lines A1 and A2 is read.

It is assumed now that the first pattern has the characters A to F, G, H, I, and J of the bar-code 101 including the left guard bar LGB and the center bar CB demodulated by the scanning line A1, and the characters J, K and L of the bar-code 101 including the right guard bar RGB demodulated by the scanning line A2. The second pattern has the characters A to F, G, and H of the bar-code 101 including the left guard bar LGB and the center bar CB demodulated by the scanning line A1, and the characters H, I, J, K, and L of the bar-code 101 including the right guard bar RGB demodulated by the scanning line A2.

In this case, the first pattern includes one duplicate character J. The second pattern includes one duplicate character H. The number of duplicate characters is 1 in the first and second patterns.

However, in the first pattern, the number of characters of the bar-code 101 including the right guard bar RGB demodulated with the scanning line A2 is 3. In the second pattern, the number of characters of the bar-code 101 including the right guard bar RGB demodulated with the scanning line A2 is 5. This means that the duplicate position of the first pattern is closer to the right guard bar RGB than that of the second pattern.

As described above, where the number of characters of the demodulated bar-code 101 including the right guard bar RGB is small, there is a possibility that the right guard bar RGB is erroneously read by the column indication of a newspaper.

Hence in the tenth embodiment, where the number of characters of the demodulated data including only a guard bar becomes smaller, or the duplicate position becomes closer to the guard bar, there is a strong possibility of an erroneous reading. In order to improve reliability, the reference count varying unit 137B varies the reference count of the coincidence count checking unit 136 to a large value. The duplicate position is detected when the function acting as the read-status information capturing means (duplicate position detecting means) in the data comparing unit 134B performs the character duplicate checking.

The operation in the reference count setting varying process of the reference count varying unit 137B will be explained below with reference to the flowchart (steps A41 to A47) shown in FIG. 44. If the duplicate position detected by the data comparing unit 134B is closest to the center bar CB and the maximum number of characters of demodulated data including only the guard bar is 6 (in the case of YES decision in the step A41), the reference count of the coincidence count checking unit 136 is set to 1, or the data capturing count of the bar-code 101 to be read to 1 (step A42).

The duplicate position detected by the data comparing unit 134B is closer to the guard bar by one character from the center bar CB, and the number of characters of the demodulated data including only the guard bar is 5 (in the case of YES decision in step A43; e.g. the second pattern described above), the reference count of the coincidence count checking unit 136 is set to 2, or the data capture count of the bar-code 101 to be read is set to 2 (step A44).

Furthermore, the duplicate position detected by the data comparing unit 134B is closer to the guard bar by 2 characters or more from the center bar CB, and the number of characters of demodulated data including only the guard bar is less than 4 (on the case of YES decision in step A45), the reference count of the coincidence count checking unit 136 is set to 3, or the data capturing count of the bar-code 101 to be read is set to 3 (step A46).

Where there is NO decision in step A45 (or it is judged that the number of characters is not less than 4), it is judged that an error has occurred, and it is instructed to re-read the bar-code 101 (step A47).

As described above, according to the tenth embodiment of the present invention, if there is a strong possibility of an erroneous reading because of the duplicate position closer to the guard bar, the reference count can be set to a larger value according to the duplicate position being the read-status information of the bar-code 101 (the number of characters of demodulated data including the guard bar). If the possibility of an erroneous reading is small because of the duplicate position closer to the center bar, the reference number of times is set to a smaller value.

Hence where one bar-code split into plurality of portions is scanned and demodulated, the coincidence count checking can be performed according to the read-status (duplicate position) of the bar-code 101 so that the same effect as that in the eighth embodiment can be obtained.

Figure 44:
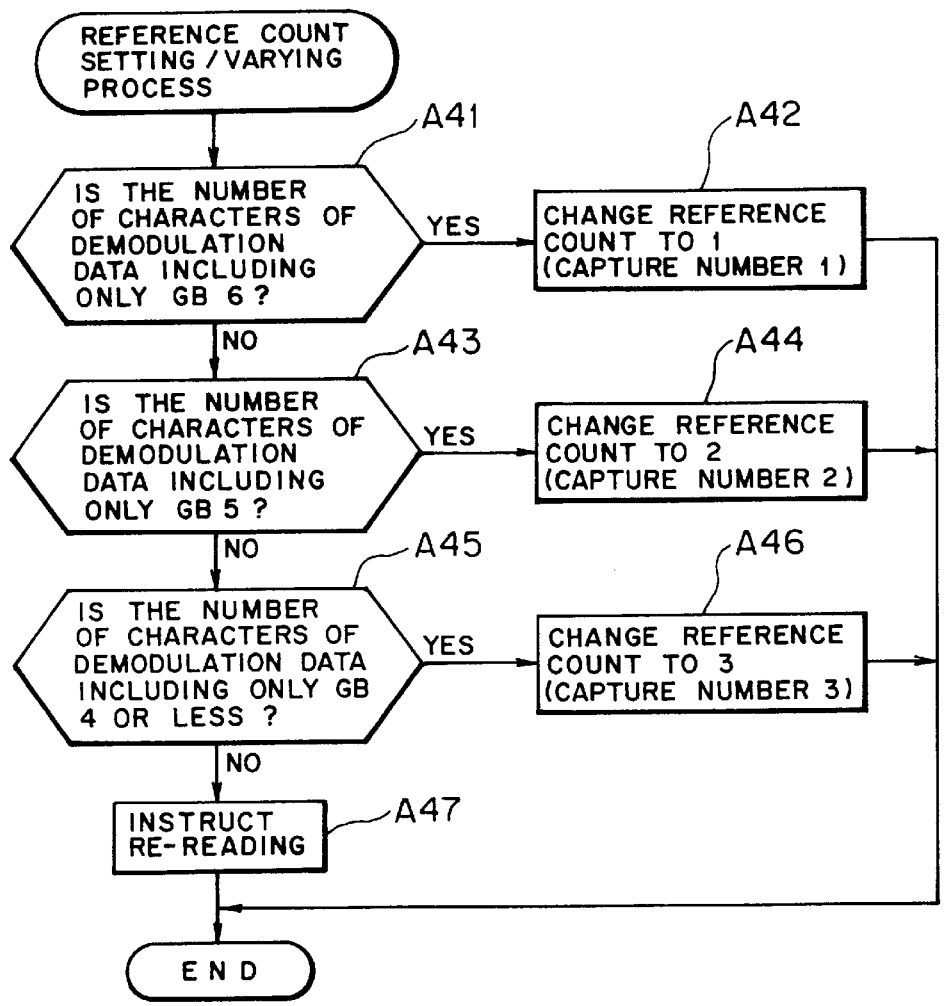
FIG. 44 is a flowchart used for explaining the reference count setting operation in the tenth embodiment according to the present invention.

In the explanation of the tenth embodiment, as shown in FIG. 44, the reference count varying unit 137B sets the reference count to 1 when the number of characters of demodulated data including only the guard bar is 6, sets the reference count to 2 when the number of characters is 5, and sets the reference count to 3 when the number of characters is 4 or less. However, in the present invention, the numerical values should not be limited only to the above-mentioned values.

Moreover, in the explanation of the tenth embodiment, as shown in FIG. 40, one barcode 101 in 2-split form is read with two scanning lines A1 and A2. However, the present invention should not be limited only to the above-mentioned embodiment. The present invention is applicable to the case where a bar-code 101 divided into three or more portions is read. Thus the same function and effect as those in the tenth embodiment can be obtained.

Figure 45:
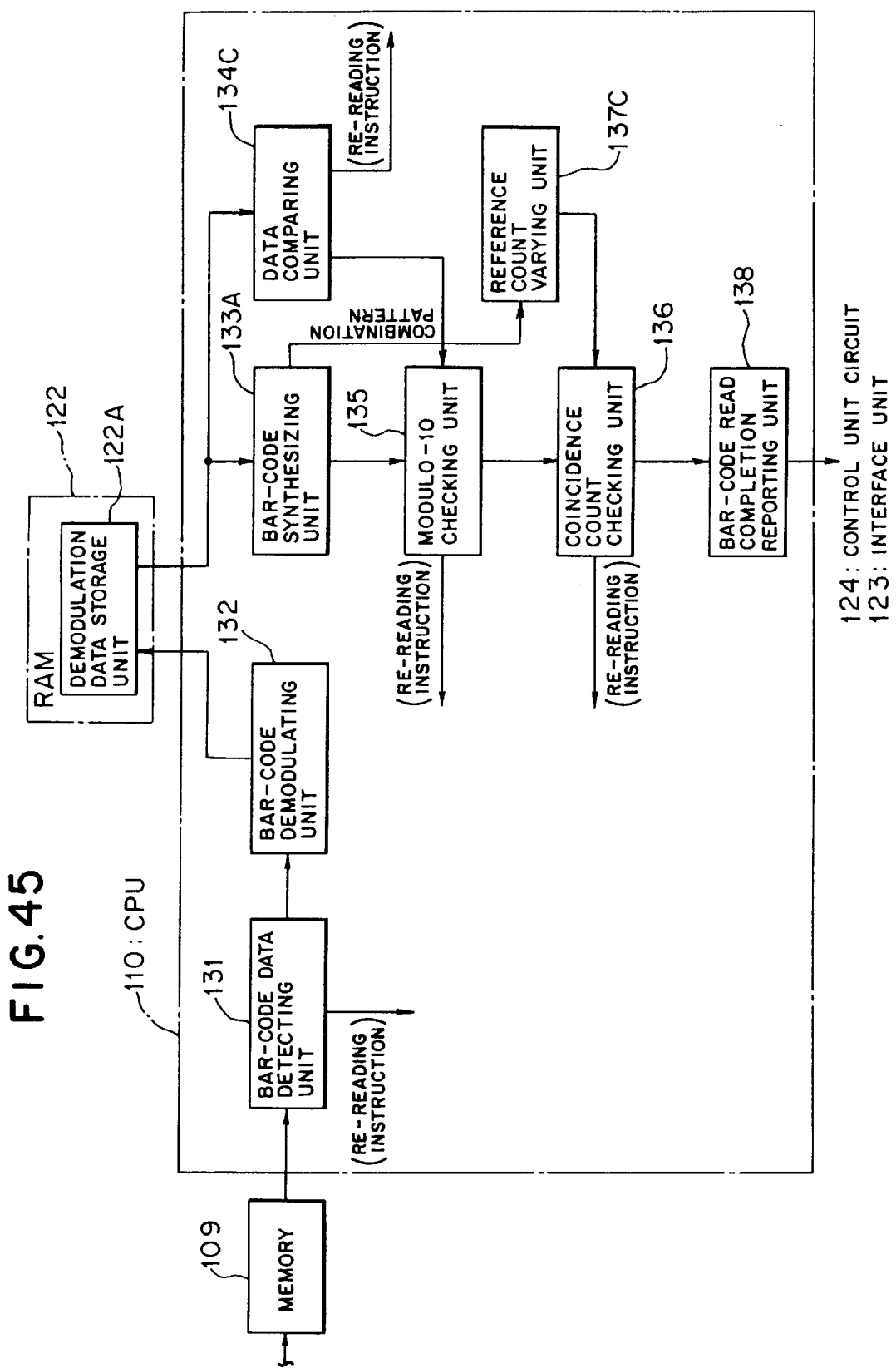
FIG. 45 is a block diagram showing the functional structure of a bar-code reader in the eleventh embodiment of the present invention.

(f) Eleventh Embodiment:

The hardware configuration of the bar-code reader according to the eleventh embodiment of the present invention is identical to that in the eighth embodiment shown in FIG. 36. The functional configuration of the bar-code reader according to the eleventh embodiment of the present invention, as shown in FIG. 45, is substantially the same as that in the eighth embodiment. However, in the eleventh embodiment, the bar-code synthesizing unit 133A differs somewhat functionally from the bar-code synthesizing unit 133 in the eighth embodiment shown in FIG. 37. The data comparing unit 134 in the eighth embodiment shown in FIG. 37. The reference count varying unit 137C differs somewhat functionally from the reference count varying unit 137 in the eighth embodiment shown in FIG. 37. In FIG. 45, like symbols and numerals represent like elements. Hence the duplicate explanation will be omitted here.

In other words, the bar-code synthesizing unit 133A according to the eleventh embodiment has the same function as the bar-code synthesizing unit 133 in the eighth embodiment. The bar-code synthesizing unit 133A also acts as the read-status information capturing means (combinational pattern detecting means) that detects a combinational pattern of the plurality of portions of the bar-code 101 (refer to FIGS. 46(A) to 46(D)) as read-status information of the bar-code 101, and reports it to the reference count varying unit 137C (to be described later).

The data comparing unit 134C according to the eleventh embodiment has only the character duplicate checking function like that in the data comparing unit 134 in the eighth embodiment, but does not have the function of the read-status information capturing means described in the eighth to tenth embodiments.

Furthermore, the reference count varying unit (reference count varying means) 137C according to the eleventh embodiment varies the setting of the predetermined reference count of the coincidence count checking unit 136 according to the combinational pattern (read-status information of the bar-code 101) obtained by the function of the read-status information capturing means of the bar-code synthesizing unit 133A. The setting/varying operation of the reference count varying operation of the reference count varying unit 137C in the eleventh embodiment will be described in detail later with reference to FIG. 47.

The entire operational flow of the above-mentioned configuration according to the eleventh embodiment of the present invention is the same as that in the eighth embodiment described with reference to the flowchart shown in FIG. 38. Hence the duplicate explanation will be omitted here.

In order to read the bar-code 101 divided into plural portions as shown in FIG. 40, the split patterns shown in FIGS. 46(A) to 46(D) are considered. The bar-code synthesizing unit 133A synthesizes and combines a plurality of pieces of demodulated data, using the combinational patterns according to the split patterns.

The split pattern (combinational pattern) shown in FIG. 45(A) is a 2-split pattern. The demodulated data corresponding to the scanning line A1 includes one guard bar GB and the center bar CB, and the demodulated data corresponding to the scanning line A2 includes only the other guard bar GB. These demodulated data are duplicated or overlapped at the shaded portion B1 in the figure.

Figure 46A:
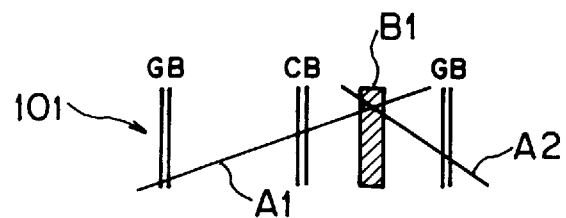
FIG. 46(A) to 46(D) are diagrams each showing a split pattern (combination pattern) at a bar-code split reading operation.
Figure 46B:
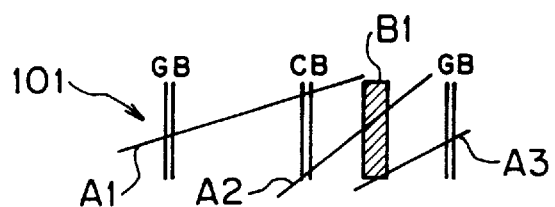

The split pattern (combination pattern) shown in FIG. 46(B) in a 3-split pattern. The demodulated data corresponding to the scanning line A1 includes one guard bar GB and the center bar CB, and the demodulated data corresponding to the scanning line A2 includes only the center bar CB, and the demodulated data corresponding to the scanning line A3 includes only the other guard bar GB. The demodulated data corresponding to the scanning line A2 is overlapped with the demodulated data corresponding to the scanning line A3 at the shaded portion B1 in the figure.

Figure 46C:
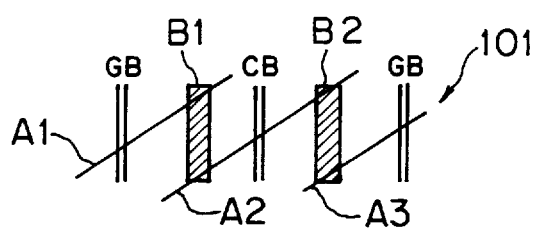

The split pattern (combinational pattern) shown in FIG. 46(C) is a 3-split pattern. In this split pattern, the demodulated data corresponding to the scanning line A1 includes only one guard bar GB; the demodulated data corresponding to the scanning line A2 includes only the other center bar GB. The demodulated data corresponding to the scanning line A1 is overlapped with the demodulated data corresponding to the scanning line A2 at the shaded portion B1 in the figure. The demodulated data corresponding to the scanning line A2 is overlapped with the demodulated data corresponding to the scanning line A3 at the shaded portion B2 in the figure.

Figure 46D:
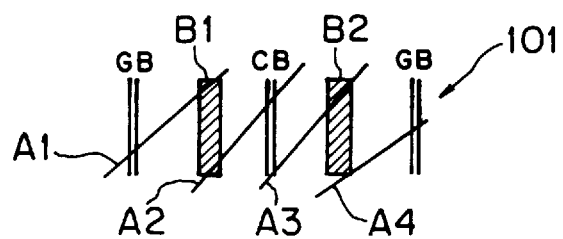

The split pattern (combination pattern) shown in FIG. 46(D) is a 4-split pattern. The demodulated data corresponding to the scanning line A1 includes only one guard bar GB; the demodulated data corresponding to the scanning line A2 includes only the center bar CB; the demodulated data corresponding to the scanning line A3 includes on the center bar CB; and the demodulated data corresponding to the scanning line A4 includes only the other guard bar GB. The demodulated data corresponding to the scanning line A1 is overlapped with demodulated data corresponding to the scanning line A2 at the shaded portion B1 in the figure. The demodulated data corresponding to the scanning line A3 is overlapped with the demodulated data corresponding to the scanning line A4 at the shaded portion B2 in the figure.

In such a split pattern (combinational pattern), increasing split portions (combinations) results in a small portion of the bar-code 101 to be demodulated. As a result, the increased number of duplicate portions causes demodulated data with low reliability.

Therefore, according to the eleventh embodiment, increasing the number of split and duplicate portions means increasing the possibility of an erroneous reading. Hence in order to achieve high reliability, the reference count varying unit 137C sets the reference count of the coincidence count checking unit 136 to a large value, according to the combinational pattern shown in FIGS. 46(A) to 46(D). In this case, the combination pattern is detected when the read-status information capturing means (combinational pattern detecting means) in the bar-code synthesizing unit 133A synthesizes and combines a plurality pieces of demodulated data.

The operation of the reference count setting/varying process of the reference count varying unit 137C will be explained below with reference to the flowcharts (steps A51 to A59) shown in FIG. 47. When the combinational pattern of demodulated data from the barcode synthesizing unit 133A is of a 2-split type (split number 2, duplicate portion number 1) shown in FIG. 46(A) (in the case of YES decision in the step A51), the reference count of the coincidence count checking unit 136 is set to 1, or the data capturing count of the bar-code 101 to read is set to 1 (step A52).

When the combination a pattern of demodulated data from the bar-code synthesizing unit 133A is of a 3-split type (split number 3, duplicate portion number 1) as shown in FIG. 46(B) (in YES decision in the step A53), the reference count of the coincidence count checking unit 136 is set to 2, or the data capturing count of the bar-code 101 to be read is set to 2 (step A54).

Furthermore, when the combinational pattern of demodulated data from the bar-code synthesizing unit 133A is of a 3-split type (split number 3, duplicate portion number 2) shown in FIG. 46(C) (in the case of YES decision in the step A55), the reference count of the coincidence count checking unit 136 is set to 3, or the data capturing count of the bar-code 101 to be read is set and varied to 3 (step A56).

When the combinational pattern of demodulated data of the bar-code synthesizing unit 133A is of a 4-split type (split number 4, duplicate portion number 2) shown in FIG. 46(D) (in the case of YES decision in the step A57), the reference count of the coincidence count checking unit 136 is set to 4, or the data capture count of the bar-code 101 to be read is set to 4 (step A58).

Where there is a NO decision in the step A57 (or the situation does not fit to any pattern shown in FIGS. 46(A) to 46(D), it is judged that an error has occurred and then it is instructed to re-read the bar-code 101 (step A59).

As described above, according to the eleventh embodiment of the present invention, the reference count is set to a large value when there is very strong possibility of an erroneous reading because of large number of split portions or duplicate portions of the combinational pattern, according to the combination pattern (split pattern) being the read-status information of the bar-code 101. When there is a small possibility of an erroneous reading because of a small number of split portions or duplicate portions of the combination pattern, the reference count is set to small value.

Hence where a single bar-code 101 divided into a plurality of portions is scanned and demodulated, the coincidence count checking can be performed according to the read-status (combination pattern) of the bar-code 101. An effect the same as that in the eighth embodiment can be obtained.

Figure 47:
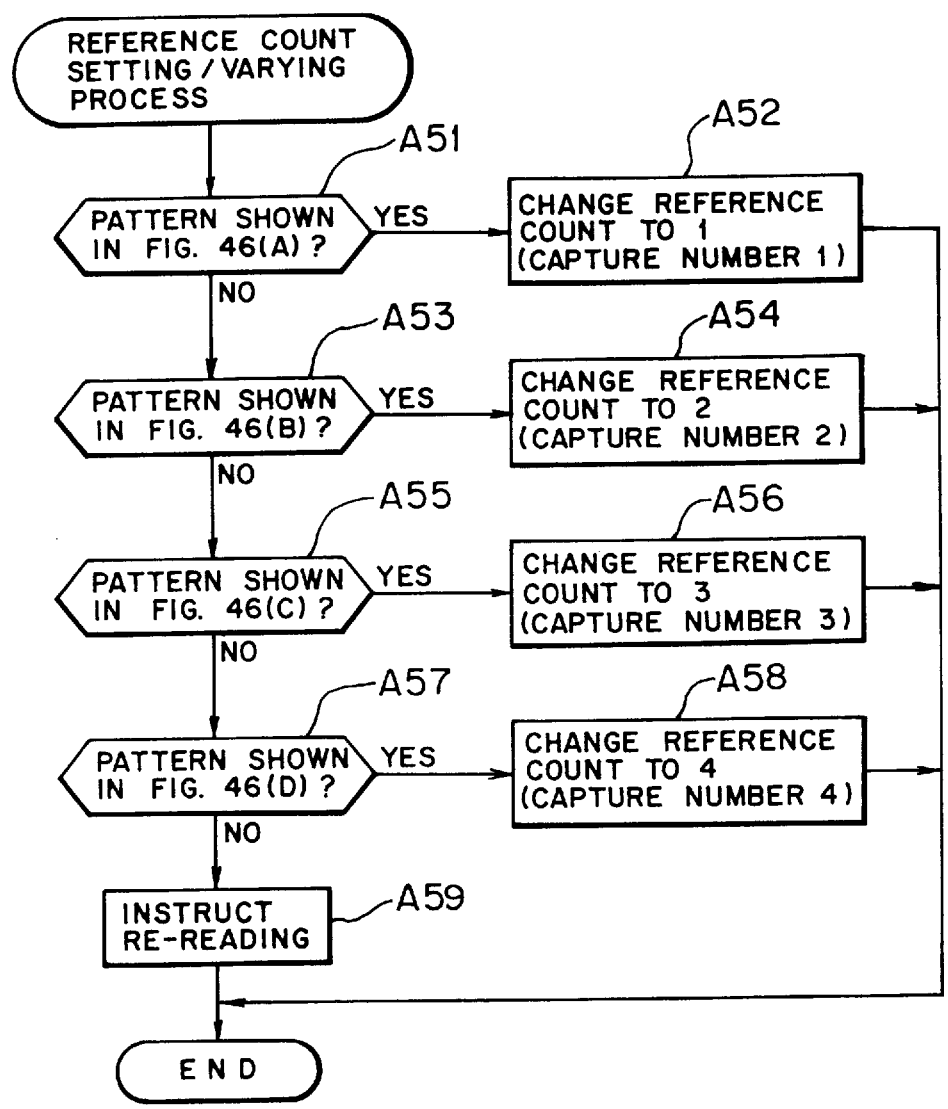
FIG. 47 is a flowchart used for explaining the reference count setting operation in the eleventh embodiment according to the present invention.

In the explanation on the above-mentioned eleventh embodiment, as shown in FIG. 47, the reference count varying unit 137C sets the reference count to 1 to 4 according to the patterns shown in FIGS. 46(A) to 46(D). However, in the present invention, the numerical values should not be limited only to the values shown in the embodiment.

Figure 48:
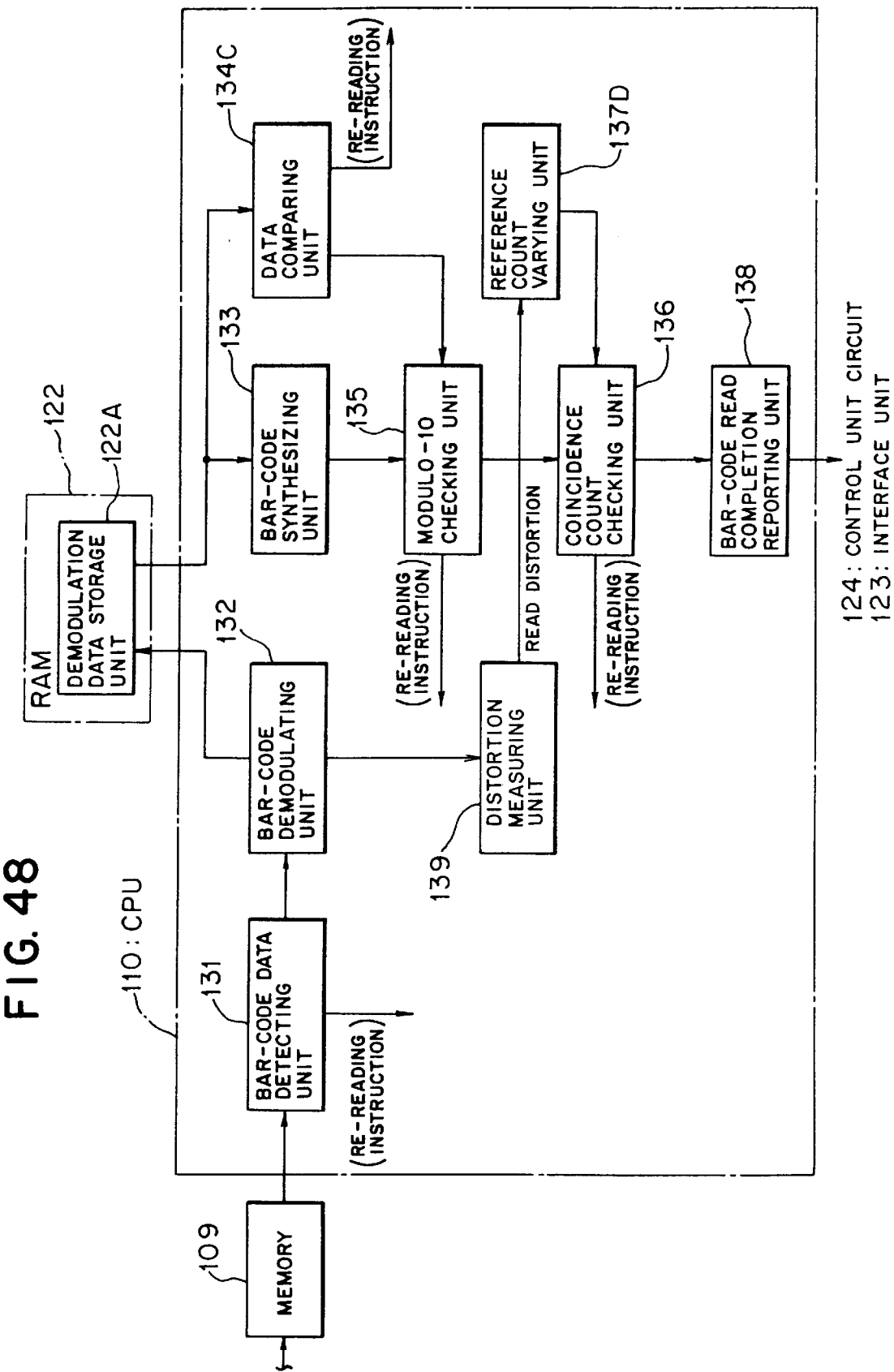
FIG. 48 is a block diagram showing the functional structure of a bar-code reader in the twelfth embodiment according to the present invention.

(g) Twelfth Embodiment:

The hardware configuration of the bar-code reader according to the twelfth embodiment of the present invention is identical to that in the eighth embodiment shown in FIG. 36. The functional configuration of the bar-code reader according to the twelfth embodiment of the present invention shown in FIG. 48 is substantially the same as that in the eighth embodiment. However, in the twelfth embodiment, the reference count varying unit 137D differs somewhat functionally from the reference count varying unit 137 in the eighth embodiment shown in FIG. 37. The distortion measuring unit 139 is newly arranged in the twelfth embodiment. In FIG. 48, like symbols and numerals represent like elements. Hence the duplicate explanation will be omitted here.

In other words, according to the twelfth embodiment, the distortion measuring unit (the read-status information capturing means and the distortion amount measuring means) 139 calculates and measures as the read-status information of the bar-code 101 the read-distortion amount of the portion where a plurality of split-read portions of the bar-code 101 are mutually duplicated, based on the demodulation result from the bar-code demodulating unit 132, and the reports it to the reference count varying unit 137D (to be described later). The amount of read-distortion measure by the distortion measuring unit 139 will be described later by referring to FIGS. 49 to 51.

According to the twelfth embodiment, the reference count varying unit (reference count varying means) 137D varies the setting of the predetermined reference count of the coincidence count checking unit 136, according to the amount of read-distortion (the read-status information of the bar-code 101) measured by the distortion measuring unit 139. The setting\varying operation of the reference count varying unit 137D according to the twelfth embodiment will be explained in detail later with reference to FIG. 52.

The entire operational flow of the above-mentioned configuration according to the twelfth embodiment is identical to that in the eighth embodiment, according to the flowchart shown in FIG. 38. Hence the duplicate explanation will be omitted here.

In order to perform the split-reading of the bar-code 101, as described above, partial data including at least one of the center bar and two guard bars is demodulated as much as possible, and then demodulated data of several characters obtained every partial data are combined. One bar-code is demodulated and read.

The character just before demodulation becomes impossible may be erroneously read as letters, paper surface noises, or the like as a bar-code. Such a character with a strong possibility of an erroneous reading has a large amount of read-distortion. Hence, with a large amount of read-distortion, it is desirable to improve the reliability of the split-reading result by setting a large value for the predetermined reference count of the coincidence count checking unit 136.

It is considered that the amount of read-distortion of the bar-code 101 includes (1) the amount of character-length distortion (2) 1a amount of δ distance-length distortion, and (3) the amount of distortion of the bar itself.

Now let us explain the case where the amount of distortion in the character-length is measured as the read-distortion amount of the bar-code 101.

Figure 49A:
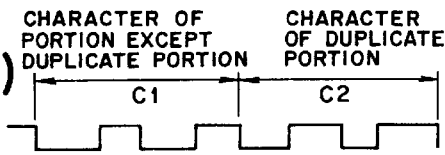
FIGS. 49(A) and 49(B) are diagrams each showing the character-length distortion amount judging method in the twelfth embodiment according to the present invention.

As shown in FIG. 49(A), the distortion measuring unit 139 calculates and measures as C2\C1 the amount of distortion of the character length of a portion where a plurality of portions of the bar-code 101 are mutually duplicated, based on the character lengths C1 and C2 obtained at the demodulation time by the bar-code demodulating unit 132, where C2 is the character length of a portion where a plurality of portions of bar-code 101 are mutually duplicated and C1 is the character length of a portion other than the duplicated portion. The amount of distortion C2\C1 is character length is calculated for each of two duplicated portions. Then the largest amount of distortion is reported as the amount of read-distortion to the reference count varying unit 137D.

Figure 49B:
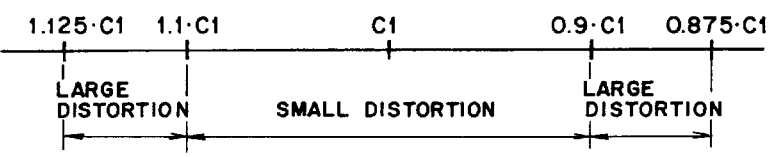
Figure 52:
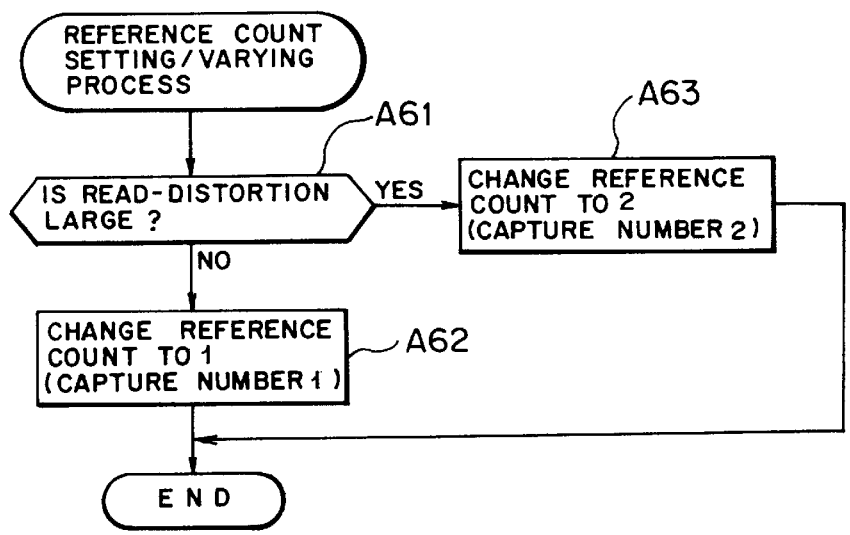
FIG. 52 is a flowchart used for explaining the reference count setting operation in the twelfth embodiment according to the present invention.

The reference count varying unit 137D judges that the amount of distortion is small (YES decision in step A61 shown in FIG. 52) when the amount of distortion, as shown in FIG. 49(B) ranges e.g. from 0.9 to 1.1, and then varies the setting of the reference count in the coincidence count checking unit 136 to 1, or the data capture count of the bar-code 101 to be read is set and varied to 1 (refer to step A62 in FIG. 52). The reference count varying unit 137D judges that the amount of distortion is large (NO decision in step A61 shown in FIG. 52) when the amount of distortion, as shown in FIG. 49(B), ranges from 0.875 to 0.9 or from 1.1 to 1.125 and then varies the setting of the reference count in the coincidence count checking unit 136 to 2, or the data capture count of the bar-code 101 to be read is set and varied to 2 (refer to step A63 in FIG. 52). In FIG. 49(B), the amount of distortion is shown as the coefficient of the character length C1.

Figure 50A:
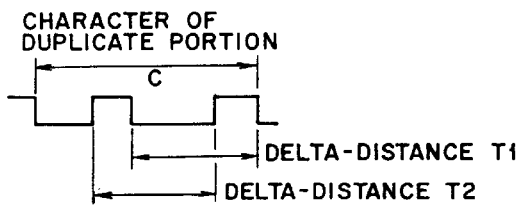
FIGS. 50(A) and 50(B) are diagrams each used for explaining the δ-distance length distortion amount judging method in the twelfth embodiment.
Figure 50B:
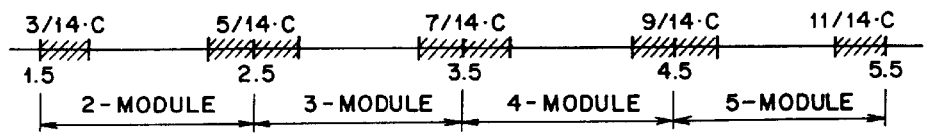
Figure 51A:
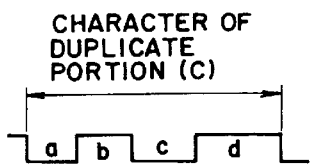
FIGS. 51(A) and 51(B) are diagrams each used for explaining the bar distortion amount judging method according to the twelfth embodiment.

Next, the case where the amount of distortion of δ distance length is measured as the read-distortion of the bar-code 101 will be explained below.

Where the bar-code demodulating unit 132 performs the bar-code data demodulating process, the character screening is performed as described with FIG. 62, based on the combination of the number modules of two δ distance lengths T1 and T2, as shown in FIG. 50(A).

Where the amount of distortion in δ distance length is measured as an amount of read-distortion, the distortion measuring unit 139 calculates and measures the values T1/C and T2/C as the amount of read-distortion, where each of T1 and T2 is the δ distance length of a portion where a plurality of portions of the bar-code 101 are mutually duplicated, and C is a character length. The amount of distortion of T1\C and T2\C in δ distance length are calculated for two duplicated portions, respectively, and then reported to the reference count varying unit 137D.

Where the amount of distortion covers the shaded range shown in FIG. 50(B), the reference count varying unit 137D judges that the amount of distortion is large (NO decision in step A61 shown in FIG. 52), and then varies the setting of the reference count in the coincidence count checking unit 136 to 2, or the data capture count of the bar-code 101 to be read to 2 (refer to step A63 shown in FIG. 52). Where the amount of distortion covers a range other than the shaded range shown in FIG. 50(B), the reference count varying unit 137D judges that the amount of distortion is small (YES decision in the step A61 shown in FIG. 52), and then varies the setting of the reference count in the coincidence count checking unit 136 to 1, or the data capture count of the bar-code 101 to be read to 1 (refer to step A62 shown in FIG. 52).

Next, the case where the amount of distortion of a bar itself is measured as the amount of read-distortion of the bar-code 101 will be explained below.

Where the bar-code demodulating unit 132 performs a bar-code data demodulating process, the character is discriminated based on the combination of the number of modules of two δ distance lengths T1 and T2, as shown in FIG. 50(A). However, there are characters which cannot be discriminated based on the δ distance lengths T1 and T2. In such a case, the bar-code demodulating unit 132 calculates the length of each bar itself (refer to letters a, b, c, and d shown in FIG. 51(A)), calculates the number of modules of each bar, and then discriminates the character.

Where the amount of distortion of a bar itself is measured as the amount of read-distortion, the distortion measuring unit 139 calculates and measures values a\C to d\C as an amount of read-distortion, where a to d are the length of each bar itself of a portion where plural portions of the bar-code 101 are mutually duplicated and C is a character length. The amount of distortion of a\C to d\C of each bar itself is calculated for two duplicate portions and reported to the reference count varying unit 137D.

Figure 51B:
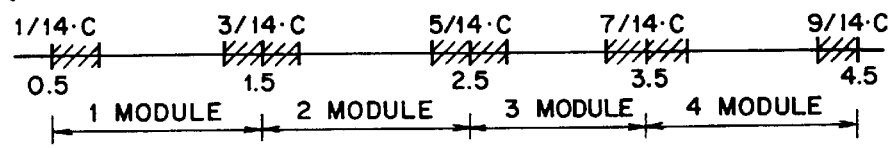

As in the case where the amount of distortion in δ distance length is an amount of read distortion, the reference count varying unit 137D judges that the amount of distortion within the shaded range shown in FIG. 51(B) is large (NO decision in step A61 shown in FIG. 52), and sets the reference count of the coincidence count checking unit 136 to 2, or sets the data capture count of the bar-code 101 to be read to 2 (refer to the step A63 shown in FIG. 52). If the amount of distortion is out of the shaded range shown in FIG. 51(B), the reference count varying unit 137D judges that the amount of distortion is small (YES decision in step A61 shown in FIG. 52). Thus the reference count of the coincidence count checking unit 136 is set and varied to 1, or the data capture count of the bar-code 101 to be read is set and varied to 1 (refer to the step A62 shown in FIG. 52).

In such a manner, according to the twelfth embodiment of the present invention, where the amount of read-distortion is large and there is a great possibility of an erroneous reading, the reference count is set to a large value according to the amount of read-distortion being the read-status information of the bar-code 101. Where the amount of read-distortion is small and there is a small possibility of an erroneous reading, the reference count is set to a small value.

Hence, where one bar-code 101 divided into a plurality of portion is scanned and demodulated, the coincidence count checking can be performed according to the read-status (amount of read-distortion) of the bar-code 101. hence, the same effect as that in eighth embodiment can be obtained.

In the explanation according to the twelfth embodiment, as shown in FIG. 52, the reference count varying unit 137D sets the reference count to 2 in the case of a large amount of read-distortion and sets the reference count to 1 in the case of a small amount of read-distortion. However, in the present invention, the numerical value should not be limited only to those shown in the embodiment. The amount of read-distortion may be classified in more detail and the reference count may be set for each amount of read distortion.

Figure 53:
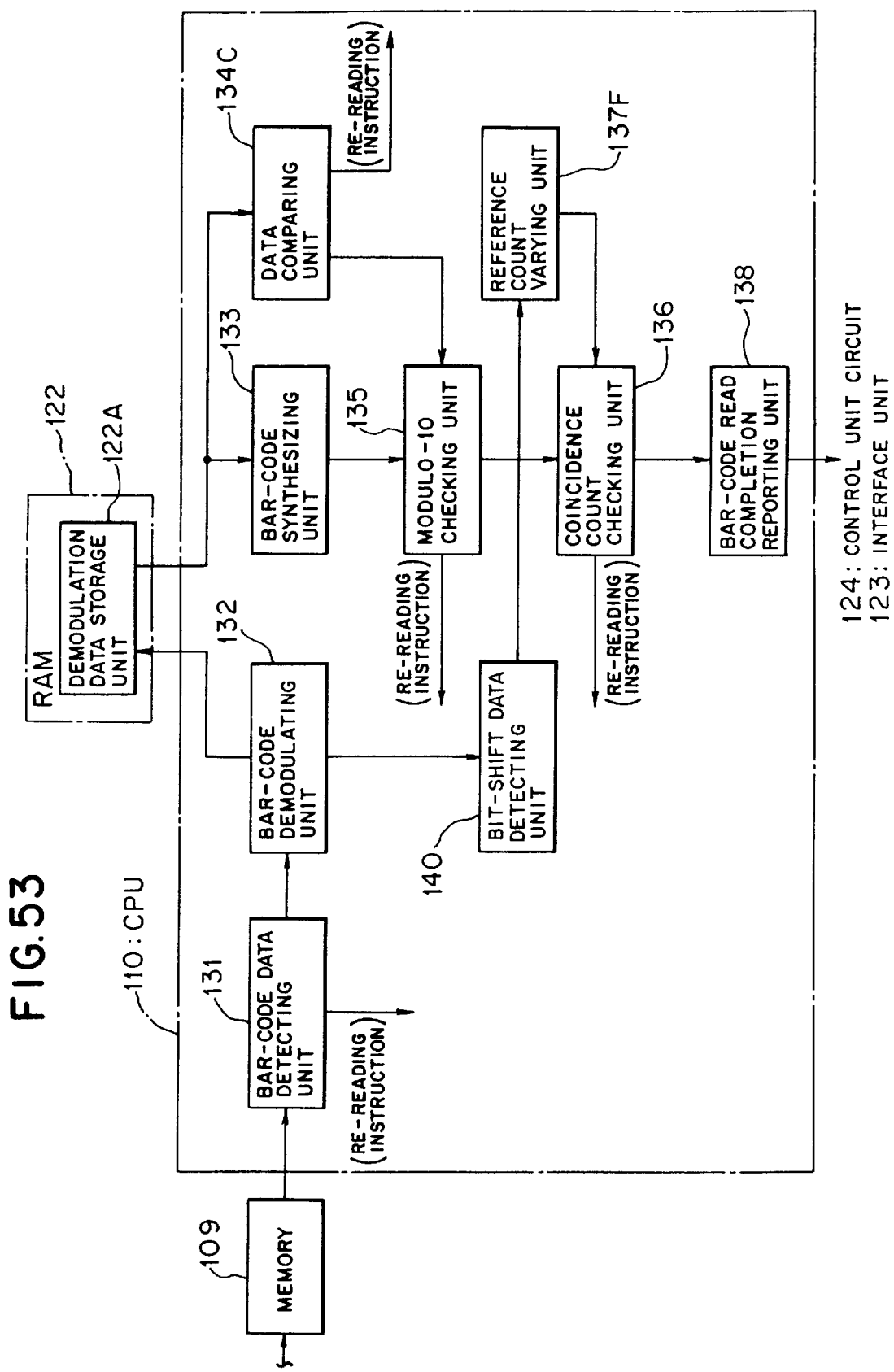
FIG. 53 is a block diagram showing the functional structure of a bar-code reader in the thirteenth embodiment according to the present invention.

(h)Thirteenth Embodiment:

The configuration of the hardware of the bar-code reader according to the thirteenth embodiment of the present invention is identical to that of the eighth embodiment shown in FIG. 36. The functional configuration of the bar-code reader according to the thirteenth embodiment of the present invention, as shown in FIG. 53, is substantially the same as that in eighth embodiment. However, in the thirteenth embodiment, the reference count varying unit 137E differs somewhat functionally from the reference count varying unit 137 in the eighth embodiment shown in FIG. 37. A bit-shift data detecting unit 140 is newly-arranged. In FIG. 53, like symbols and numerals represent like elements. Hence the duplicate explanation will be omitted here.

Figure 54A:
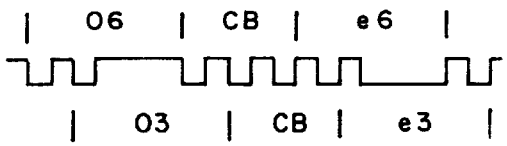
FIGS. 54(A) and 54(B) are diagrams each showing an example of a bit shifting in the thirteenth embodiment according to the present invention.
Figure 54B:
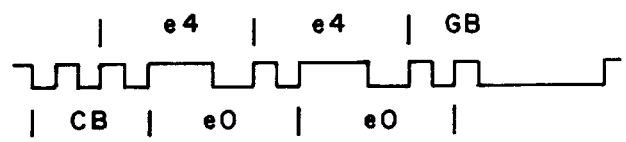

According to the thirteenth embodiment, the bit-shift data detecting unit (read-status information capturing means, the bit-shift data detecting means) 140 detects as the read-status information of the bar-code 101 information regarding whether a plurality of pieces of demodulated data of the bar-code 101 is converted into different data of the bar-code 101 is converted into different data (bit-shift data) by bit-shifting, based on the demodulation result of the bar-code demodulating unit 132, and then outputs the result to the reference count varying unit 137E. The bit-shift data will be explained later with reference to FIGS. 54(A) and 54(B).

According to the thirteenth embodiment, the reference count varying unit (reference count varying means) 137E varies the setting of the reference count of the coincidence count checking unit 136, according to the information (read-status information of bar-code 101) detected by the bit-shift data detecting unit 140. The setting varying operation of the reference count varying unit 137E according to the thirteenth embodiment will be explained later in detail with reference to FIG. 55.

The entire operational flow of the above-mentioned configuration according to the thirteenth embodiment of the present invention is identical to that in the eighth embodiment described with reference to the flow chart shown in FIG. 38. Hence the duplicate explanation will be omitted here.

As described above, where the bar-code data 101 is divided into a plurality of portions and read, there is demodulated data including at least one of center bar and two guard bars, in addition to demodulated data with both ends defined by the guard bar and the center bar. The demodulated data may be converted into different demodulated data by the bit-shifting. As shown, for example, in FIGS. 54(A) and 54(B), data includes the center bar CB. Data can be subjected to two kinds of demodulation shown in upper and lower columns in the figure. Symbols in FIGS. 54(A) and 54(B) correspond to those shown in FIG. 63.

It is difficult to discriminate a correct one among the two kinds of demodulation result of the bit-shift data. When the bit-shift data occurs, the reliability of the demodulated data of the bar-code 101 becomes low. Hence, in order to improve the reliability of the split-reading result, it is desirable to set the predetermined reference count of the coincidence count checking unit 136 to a large value.

According to the thirteenth embodiment, the bit-shift data detecting unit 140 detects that bit-shift data has been obtained as the demodulated data of the bar-code demodulating unit 132. Since the possibility of the erroneous reading is strong, the reference count varying unit 137E varies the setting of the reference count of the coincidence count checking unit 136 to a large value to improve reliability.

The operation of the reference count setting varying process of the reference count varying unit 137E is explained below according to the flowchart (steps A71 to A73) shown in FIG. 55. When the bit-shift data detecting unit 140 detects the bit-shift data (in the case of YES decision in step A71), the reference count of the coincidence count checking unit 136 is set to 2, or the data capture count of the bar-code 101 to be read is set and varies to 2 (step A72). While the bit-shift data detecting unit 140 does not detect bit-shift data (in the case of NO decision in step A71), the reference count of the coincidence count checking unit 136 is set to 1, or the data capture count of the bar-code 101 to be read is set and varies to 1 (step A73).

According to the thirteenth embodiment of the present invention, if the demodulated data is bit-shift data and there is a strong possibility of an erroneous reading, the reference count is set to a large value, according to information regarding the presence or absence of the bit shift data being the read-status information of the bar-code 101. If the demodulated data is not bit-shift data and there is a small possibility of an erroneous reading, the reference count is set to a small value.

Therefore, where a sole bar-code 101 is divided into plural portions and they are scanned and demodulated, the coincidence count checking can be performed according to the read-status of the bar-code 101 (information regarding the presence or absence of the bit-shift data). The same effect as that in the eighth embodiment can be obtained.

Figure 55:
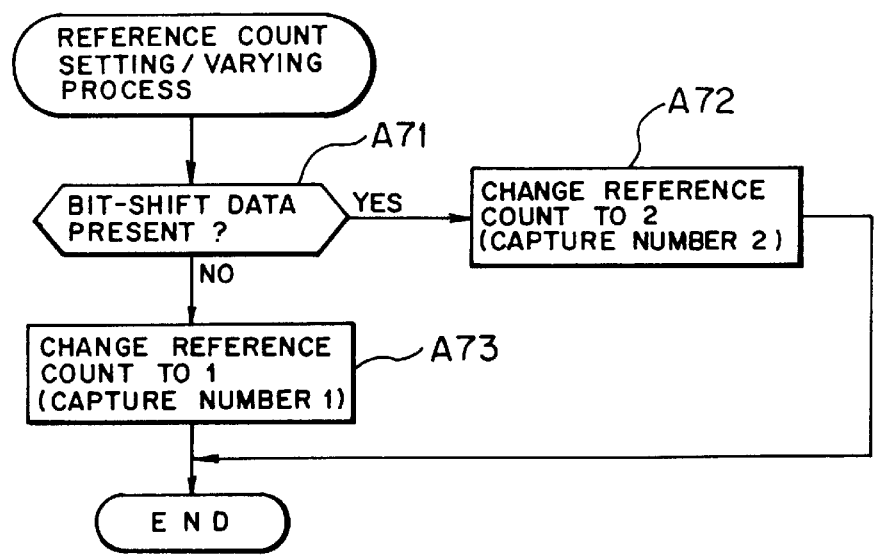
FIG. 55 is a flowchart used for explaining the reference count setting operation in the thirteenth embodiment according to the present invention.

In the explanation on the thirteenth embodiment, as shown in FIG. 55, the reference count varying unit 137E sets the reference count to 1 in the case of the absence of the bit-shift data, and sets the reference count to 2 in the case of the presence of the bit-shift data. In the present invention, the numerical values should not be limited only to those in the above-embodiment.

Figure 56:
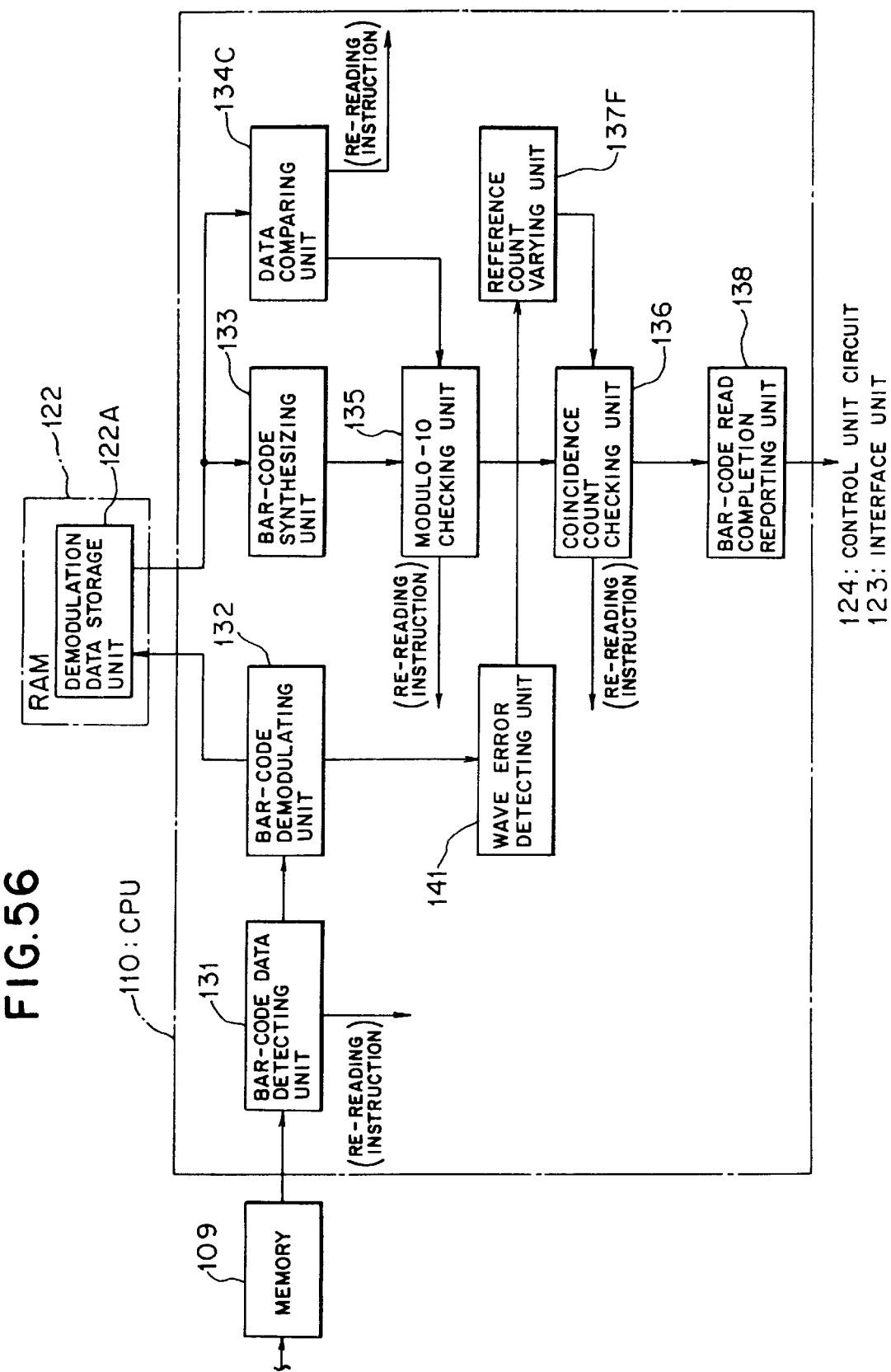
FIG. 56 is a block diagram showing the functional structure of a bar-code reader in the fourteenth embodiment according to the present invention.

(i) Fourteenth Embodiment:

The configuration of the hardware of the bar-code reader according to the fourteenth embodiment of the present invention is identical to the that of the eighth embodiment shown in FIG. 36. The functional configuration to he bar-code reader according to the fourteenth embodiment of the present invention, as shown in FIG. 56, is substantially the same as that in the eighth embodiment. However, in the fourteenth embodiment, the reference count varying unit 137F differs somewhat functionally from the reference count varying unit 137 in the eighth embodiment shown in FIG. 37. A wave error detecting unit 141 is newly-arranged. In FIG. 56, like symbols and numerals represent like elements. Hence the duplicate explanation will be omitted here.

According to the fourteenth embodiment, the wave error detecting unit (read-status information capturing means, the wave error detecting means) 141 detects as the read-status information of the bar-code 101 information regarding whether a wave error has occurred in plural pieces of demodulated data of bar-code 101, based on the demodulation result of the bar-code demodulating unit 132, and then outputs it to the reference count varying unit 137F (to be described later).

A brief explanation will be made here as to the wave error. In order to read the bar-code 101, the black edge signal and the whit edge signal are detected by subjecting an analog signal a brightness information corresponding to the whit bar 1W and the black bar 1B to differentiating process and a delaying process. Since the white bar 1W and the black bar 1B are alternately arranged in the bar-code 101, the black edge signal and the white edge signal appear alternately. However, if the brightness information includes noise components due to paper surface noises, the black edge signal and the white edge signal may not appear alternately. This phenomenon is called a wave error.

The reference count varying unit (reference count varying means) 137F according to the fourteenth embodiment, varies the setting of the predetermine reference count of the coincidence count checking unit 136, according to the information (read-status information of the bar-code 101) regarding the presence or absence of a wave error occurrence detected by the wave error detecting unit 141. The setting varying operation of the reference count varying unit 137F according to the fourteenth embodiment will be explained later in detail with reference to FIG. 57.

The entire operational flow of the fourteenth embodiment with the above-mentioned configuration of the present invention is identical to that in the eighth embodiment described with reference to the flowchart shown in FIG. 38. Hence the duplicate explanation will be omitted here.

The character that cannot be demodulated by the bar-code demodulating unit 132 causes a wave error due to paper surface noise, thus demodulated data cannot be regarded as valid data. Since there is a strong possibility that the character adjacent to a wave error occurrence portion is one obtained by erroneously demodulating letters or paper surface noises, the reliability of the bar-code 101 becomes low. Hence when a wave error occurs in demodulated data, it is desired to improve the reliability of the split-reading result by setting the predetermined reference count of the coincidence count checking unit 136 to a large value.

As in the eighth embodiment shown in FIG. 40, let us now consider the case where a sole bar-code 101 is divided into two portions and they are read using two scanning lines A1 and A2.

In the first pattern, it is assumed that the bar-code 101 includes characters A to F, G, H, and I demodulated by the scanning line A1 and the characters I, J, K, and L demodulated with the scanning line A2, and there is a wave error in the portion adjacent to the character I (or the portion duplicated with the character H of the demodulated data corresponding to the scanning line A1). In the second pattern, it is assumed that the bar-code 101 includes characters A to F, G, H, and I demodulated by the canning line A1 and the characters I, J, K, and L demodulated with the scanning line A2, and there is no wave error therein.

In the first pattern, where the following demodulating process cannot be performed because a wave error occurs after demodulating the character I among the characters of the demodulated data corresponding to the scanning line A2, there is a possibility that the character I has been erroneously demodulated due to letters or paper surface noises so that the reliability of the character I becomes low.

Since a wave error does not occur in the second pattern, the character I in the second pattern was higher reliability than the character I of the demodulated data obtained by the scanning line A2 in the first pattern.

In the fourteenth embodiment, if the wave error detecting unit 141 detects that there is an error in the demodulated data from the bar-code demodulating unit 132, the reference count varying unit 137F varies the setting of the reference count of the coincidence count checking unit 136 to a large value because of a strong possibility of an erroneous reading, thus improving reliability.

The operation of the reference count setting varying process of the reference count varying unit 137F is explained below with reference to the flowchart (steps A81 to A83) shown line FIG. 57. When an error detecting unit 141 detects a wave error (YES decision in step A81), the reference count of the coincidence count checking unit 136 is set to 2, or the data capture count of the bar-code 101 is set to 2 (step A82) while the wave error detecting unit 141 doses not detect any wave error (NO decision in step A81), the reference count of the coincidence count checking unit 136 is set to 1, or the data capture count of the bar-code 101 to be read is set to 1 (step A83).

As described above, according to the fourteenth embodiment of the present invention, when a wave error occurs in demodulated data there is a strong possibility of an erroneous reading, the reference count is set to a large value according to the information regarding presence or absence of a wave error being the read-status information of the barcode 101. When no wave error occurs in demodulate data there is a small possibility of an erroneous reading, the reference count is set to a small value.

Therefore, when a sole bar code 101 is divided into plural portions and they are scanned and demodulated, the coincidence count checking operation can be performed according to read-status (or information regarding the presence or absence of a wave error) of the bar-code 101. Thus the same effect as that in eighth embodiment can be obtained.

Figure 57:
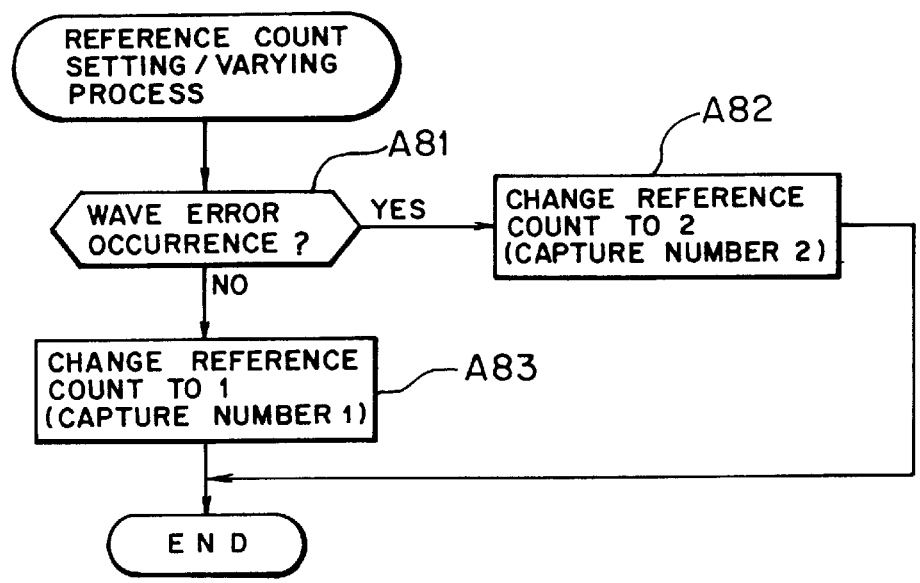
FIG. 57 is a flowchart used for explaining the reference count setting operation in the fourteenth embodiment according to the present invention.

In the fourteenth embodiment, as shown in FIG. 57, the reference count varying unit 137F sets the reference count to 1 in the case of the absence of a wave error, and sets the reference number of times to 2 in the case of the presence of a wave error. In the present intention and numerical values should not be limited only to those in the above embodiment.

In the fourteenth embodiment, as shown in FIG. 40, the case where a single bar-code 101 divided into a 2-split form with two scanning lines A1 and A2 is read has been explained. However, the present invention should not be limited only to the above embodiment, but is applicable to the case where a sole bar-code 101 is divided into 3 portions or more to be read. The same effect as that is the fourteenth embodiment can be obtained.

Figure 58:
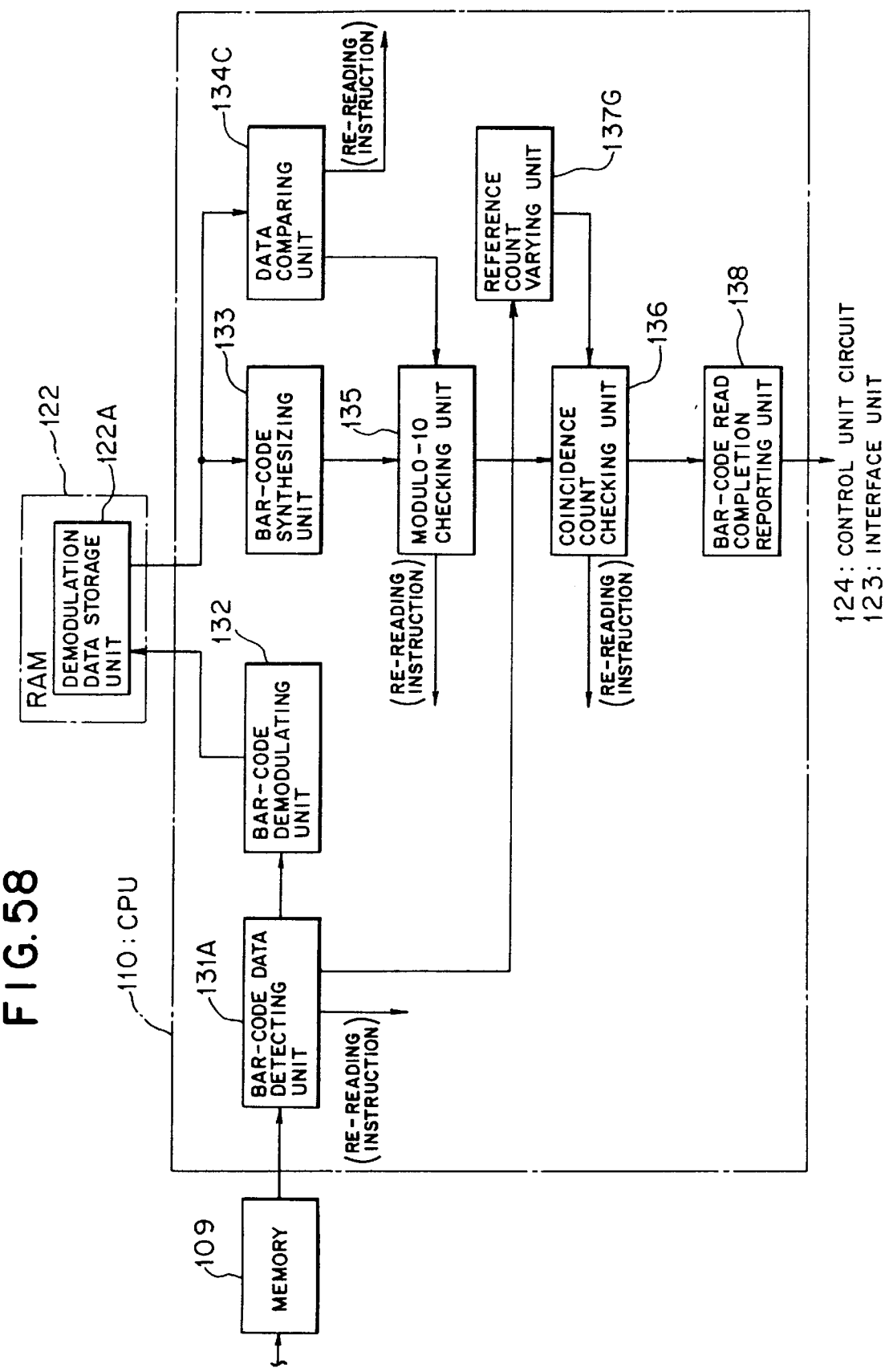
FIG. 58 is a block diagram showing the functional structure of a bar-code reader in the fifteenth embodiment according to the present invention.

(i) Fifteenth Embodiment:

The configuration of the hardware of the bar-code reader according to the fifteenth embodiment of the present invention is identical to that of the eight embodiment shown in FIG. 36. The functional configuration of the bar-code reader according to the fifteenth embodiment of the present invention, as shown in FIG. 58, is substantially the same as that in the eighth embodiment. However, in the fifteenth embodiment, the bar-code data detecting unit 131 A differs somewhat functionally from the bar-code data detecting unit 131 in the eighth embodiment shown in FIG. 37. The reference count varying unit 137G differs somewhat functionally from the reference count carrying unit 137. In FIG. 58, like symbols and numerals represent like elements. Hence the duplicate explanation will be omitted here.

That is, according to the fifteenth embodiment, the barcode data detecting unit (the read-status information capturing means or the guard-bar\center-bar detecting means) 131A functions as the bar-code data detecting unit 131 it the eighth embodiment. The bar-code data detecting unit 131A also detects as the read-status information of the bar-code 101 information regarding whether there is a portion including both the guard-bar and the center-bar of the bar-code 101 among plural portions of the bar-code 101 split-read, and then produces it to the reference count varying until 137F (to be described later).

The reference count varying unit (reference count varying means) 137G according to the fifteenth embodiment varies the setting of the predetermined reference count of the coincidence count checking unit 136, according to the information (read-status information of the bar-code 101) detected by the bar-code data detecting unit 131A. The setting varying operation of the reference count varying unit 137G according to the fifteenth embodiment will be described later in detail by the referring to FIG. 60.

The entire operational flow of the above-mentioned configuration according to the fifteenth embodiment of the present invention is identical to that in the eighth embodiment explained with reference to the flowchart shown in FIG. 38. Hence the detail explanation will be omitted here.

As described above, where the sole bar-code 101 is divided into a plurality of portions and they are read, data demodulate with the scanning line crossing only the guard bar or center bar has a strong possibility of being bit-shift data, as described in the sixth embodiment, but data demodulate with the scanning line crossing both the guard bar and the center bar has no possibility of the bit-shift data. Hence the demodulated data has a high level of reliability.

Figure 59:
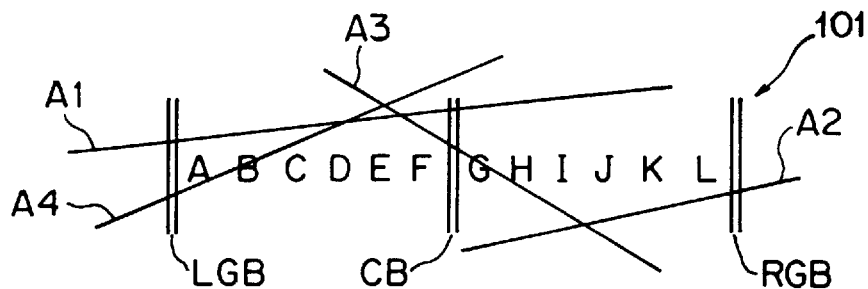
FIG. 59 is a diagram showing an example of a split scanning operation at a bar-code reading time.

As shown in FIG. 59, it is assumed that the characters A to F, G, H, and I of the barcode 101 are demodulated with the scanning line A1 (crossing both the left guard bar LGB and the center bar CB); the characters I, J, K, and L of the bar-code 101 are demodulate with the scanning line A2 (crossing only the right guard bar RGB); and the character E, F, G, H, and I of the bar-code 101 are demodulate with the scanning line A3 (crossing only the center bar CB); and the characters A, B, C, D, and E of the bar-code 101 are demodulate with scanning line A4 (crossing only the left guard bar LGB).

If the data is synthesized with characters demodulate with two scanning lines A1 and A2 in the first pattern and the data is synthesized with characters demodulate with three scanning lines A2 to A4 in the second pattern, the three pieces of demodulate data in the second pattern are data including only the guard bar or center bar. As described above, the three pieces of data have low reliability. However, of the demodulated data group in the first pattern, only the data demodulated with the scanning line A2 has a low reliability, but the data demodulate with the scanning line A1 has a high reliability. As a result, there is a small possibility of an erroneous reading.

In the fifteenth embodiment, where the bar-code data detecting until 131A does not detect the portion including both the guard bar and the center bar of the bar-code 101, there is a strong possibility of an erroneous reading. Hence in order to improve reliability, the reference count varying unit 137G varies the setting of the reference count of the coincidence count checking unit 136 to a large value.

The operation of the reference count setting varying process of the reference count varying unit 137G will be explained here with reference to the flowchart (steps A91 to A93) shown in FIG. 60. When the bar-code data detecting unit 131A detects the portion including both the guard bar and the center bar of the bar-code 101 (YES decision in step A91), the reference count of the coincidence count checking unit 136 is set to 1, other data capture count of the bar-code 101 to be read is set and varied to 1 (step A92). When the bar-code data detecting unit 131 A does not detect the portion including both the guard bar and the center bar of the bar-code 101 (NO decision in step A91), the reference count of the coincidence count checking until 136 is set to 2, or the data capture count of the bar-code 101 to be read is set and varied to 2 (step A93).

As described above, according to the fifteenth embodiment of the present invention, where there is a strong possibility of an erroneous reading in the demodulating process based on the data including only the guard bar or center bar, the reference count is set to a large value according to information regarding the presence or absence of the guard-bar/the center-bar being the read-status information of the bar-code 101. Where there is a small possibility of an erroneous reading in the demodulating process, based on the data including both the guard bar and the center bar, the reference count is set to a small value.

Where the scanning and demodulating operation is performed by dividing a slow bar-code 101 into a plurality of portions, the coincidence count checking can be performed according to the read-status of the bar-code 101 (information regarding the presence or absence of the guard bar/center bar). Thus the same effect as that in the eighth embodiment can be obtained.

Figure 60:
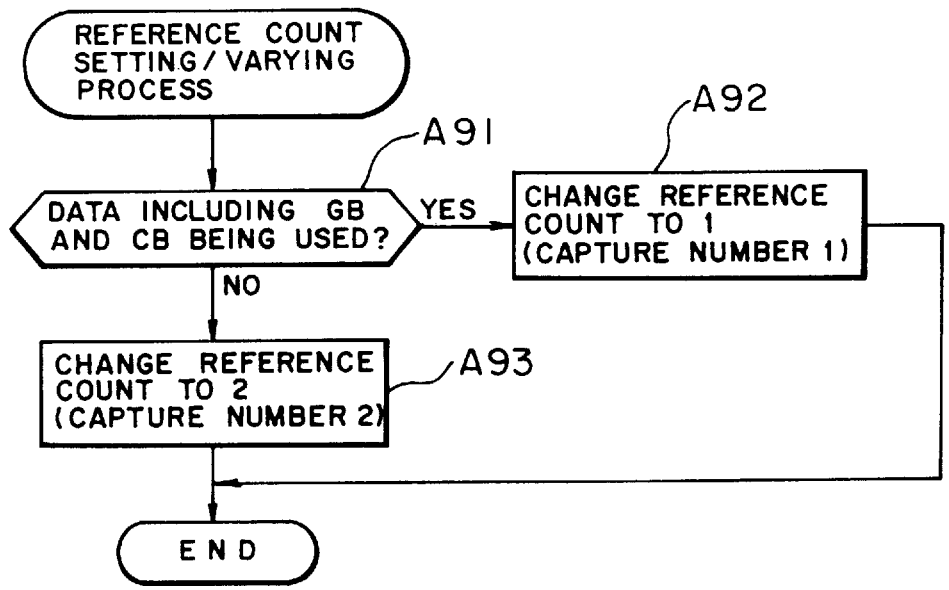
FIG. 60 is a flowchart used for explaining the reference count setting operation in the fifteenth embodiment according to the present invention.

In the fifteenth embodiment, as shown in FIG. 60, the reference count varying unit 137G sets the reference count to 1 when a demodulating process is performed based on data including both the guard bar and the center bar, and sets that reference count to 2 when a demodulating process is performed based on data including only the guard bar or center bar. However, in the present invention, the numerical values should not be limited to those in the above embodiment.

In each of the above-mentioned embodiments, the case where the bar-code to be read is of the type (including the left guard bar LGB and the right guard bar RGB, the center bar CB there between, and 6 characters arranged between the guard bar LGB and the center bar CB and between the guard bar RGB and the center bar CB) shown in FIG. 40 has been explained. However, the present invention should not be limited only to the above-mentioned embodiments. The bar-code of the type including the special center bar SCB shown in FIG. 62 or various other bar-codes is applicable to the reading operation. The same function and effect as those in the above-mentioned embodiments can be obtained.

The reference count in the coincidence count checking until 136 may be set and varied by combining a plurality of pieces of read-status information of the bar-code 101 described in the eighth to fifteenth embodiments. The concrete and possible combinations are as follows:

(1) The method of varying the setting of the reference count of the coincidence count checking unit 136 according to three kinds of distortion amount: a distortion in character length, a distortion in 8 distance length, and a distortion of each bar itself, each explained as the amount of read-distortion in the twelfth embodiment.

(2) A method of varying the setting of the reference count of the coincidence count checking until 136 according to the duplicate position described in the tenth embodiment and the three kinds of read-distortion explained in the twelfth embodiment.

(3) A method of varying the setting of the reference count of the coincidence count checking unit 136 according to the number of duplicate characters described in the eighth embodiment and the duplicate position explained in the tenth embodiment.

(4) A method of varying the setting of the reference count of the coincidence count checking unit 136 according to the number of non-coincidence characters described in the ninth embodiment and the duplicate position explained in the tenth embodiment.

(5) A method of varying the setting of the reference count of the coincidence count checking unit 136 according to the number of duplicate characters described in the eighth embodiment and the information regarding the presence or absence of a bit-shift data explained in the thirteenth embodiment.

(6) A method of varying the setting of the reference count of the coincidence count checking unit 136 according to the duplicate position described in the tenth embodiment and information regarding the presence or absence of wave error explained in the fourteenth embodiment.

The bar-code readers in the first to seventh embodiments may be arbitrarily combined with the bar-code readers in the eighth to fifteenth embodiment. The bar-code reading methods in the first to seventh embodiment may be arbitrarily combined with the bar-code reading methods in the eighth to fifteenth embodiments. In this case, the bar-code can be read more accurately and quickly.

What is claimed is:

1. A bar-code reader comprising:

scanning and extracting means for scanning a bar-code with electromagnetic radioactive rays and then extracting data regarding a bar-width thereof based on the reflected rays;

demodulating means for demodulating said bar-width data extracted by said scanning and extracting means and creating the demodulated data;

combination judging means for judging the presence or absence of one of a plurality of possible bar-code reproducible combinations in demodulated data created by said demodulating means and for judging the type of combination when the reproducible combination exists;

delta-distance distortion evaluating means for evaluating a degree of deviation of a distance of every character of the bar-width data from a predetermined standard of the bar-width data extracted by said scanning and extracting means; and screening and synthesizing means for screening demodulated data or a character forming demodulated data, based on said degree of deviation determined by said delta-distance distortion evaluating means and then synthesizing said demodulated data screened or said character screened according to the type of combination judged by said combination judging means.

2. A bar-code reading method comprising the steps of:

scanning a bar-code with electromagnetic radioactive rays and then extracting data regarding a bar-width thereof based on the reflected rays;

determining a degree of deviation of a distance of every character of the bar-width data from a predetermined standard of said bar-width data and demodulating said bar-width data and creating demodulated data;

judging the presence or absence of one of a plurality of possible bar-code reproducible combinations in said demodulated data and judging the type of combination when the reproducible combination exists; and screening said demodulated data or a character forming said demodulated data, based on said degree of deviation and then synthesizing said demodulated data screened or said character screened according to the type of combination.

* * * * *